United States Patent [19]

Bean et al.

[11] Patent Number: 4,843,541

[45] Date of Patent: Jun. 27, 1989

[54] LOGICAL RESOURCE PARTITIONING OF A DATA PROCESSING SYSTEM

[75] Inventors: George H. Bean, Kingston; Terry L. Borden, Poughkeepsie; Mark S. Farrell, Pleasant Valley; Peter H. Gum, Poughkeepsie; Roger E. Hough, Highland; Francis E. Johnson, Poughkeepsie; Donald W. McCauley, Hopewell Junction; Mark E. Rakhmilevich, Kingston; John C. Rathjen, Rhinebeck; Casper A. Scalzi, Poughkeepsie; John F. Scanlon, Hyde Park; Leslie W. Wyman, Poughkeepsie, all of N.Y.

[73] Assignee: International Business Machines Corporation, Armonk, N.Y.

[21] Appl. No.: 79,314

[22] Filed: Jul. 29, 1987

[51] Int. Cl.$^4$ .............................................. G06F 15/16
[52] U.S. Cl. .............................. 364/200; 364/281.6
[58] Field of Search ... 364/300, 200, 900, 200 MS File, 364/900 MS File

[56] References Cited

U.S. PATENT DOCUMENTS

| | | | |
|---|---|---|---|
| 4,271,468 | 6/1981 | Christensen et al. | 364/200 |
| 4,399,504 | 8/1983 | Obermarck et al. | 364/200 |
| 4,456,954 | 6/1984 | Bullions et al. | 364/200 |
| 4,480,304 | 10/1984 | Carr et al. | 364/200 |
| 4,494,189 | 1/1985 | Bean et al. | 364/200 |
| 4,564,903 | 1/1986 | Guyette et al. | 364/300 |

Primary Examiner—Eddie P. Chan
Assistant Examiner—Paul Kulik
Attorney, Agent, or Firm—Bernard M. Goldman

[57] ABSTRACT

The embodiment discloses a method and means for partitioning the resources in a data processing system into a plurality of logical partitions. Host control code may be embodied in programming, microcode, or by special hardware to enable highly efficient operation of a plurality of preferred guest programming systems in the different partitions of the system. The main storage, expanded storage, the channel, and subchannel resources of a system are assigned to the different logical partitions in the system to enable a plurality of preferred guest programming systems to run simultaneously in the different partitions. This invention automatically relocates the absolute addresses of the I/O channel and subchannel resources in the system to their assigned partitions. Also the absolute and virtual addresses of the different guest programming systems are relocated into, as well as page addresses for any expanded storage, their assigned partitions. The guest programming systems generally will be different operating systems. The logical CPU(s) of the guests are dispatched on one or plural real CPUs in the system using the S/370XA SIE (start interpretive execution) instruction. Special operations are provided, including the CPU alerting of other guests in different partitions using I/O interruption signalling. Interception is provided to handle special circumstances.

27 Claims, 31 Drawing Sheets

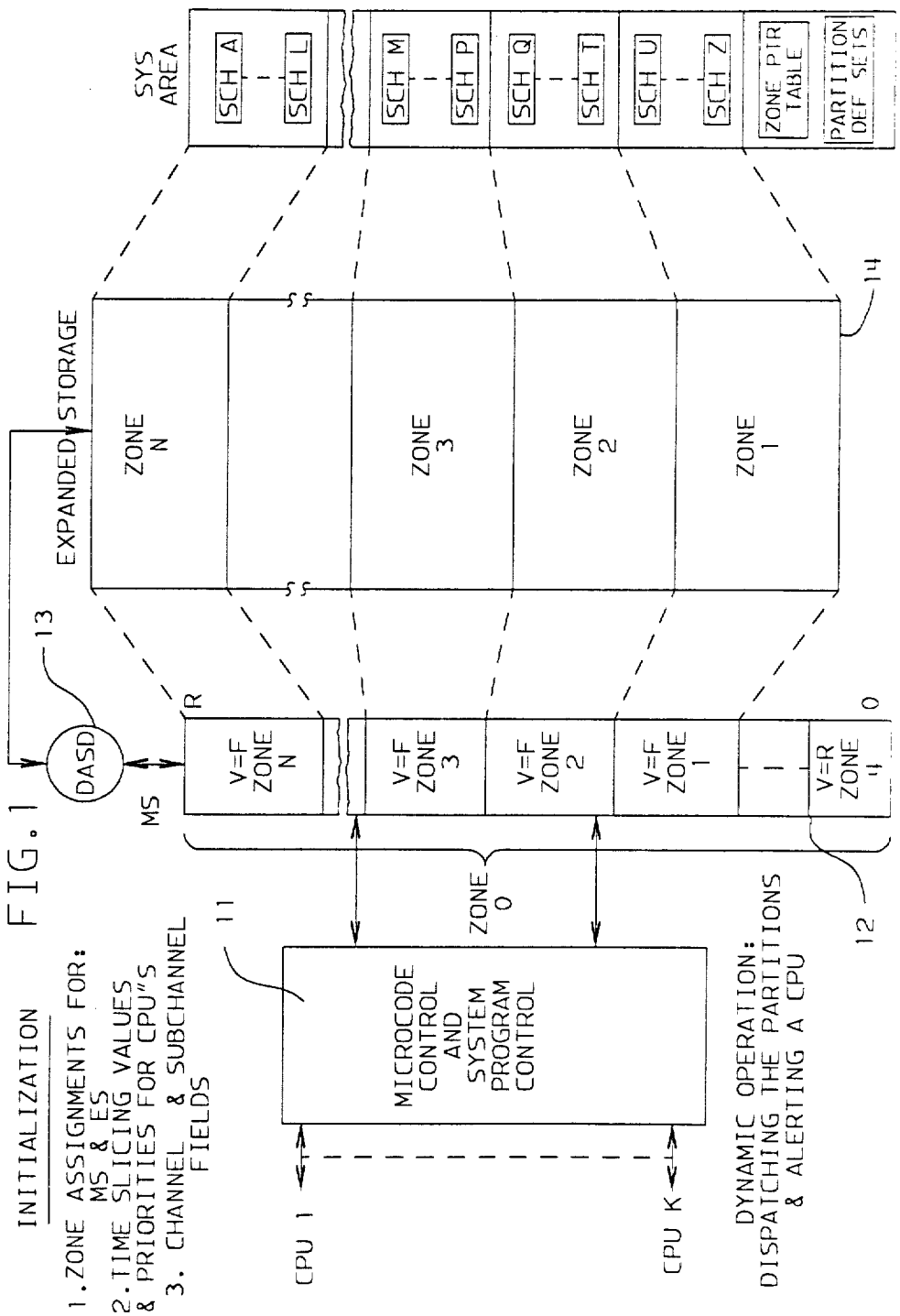

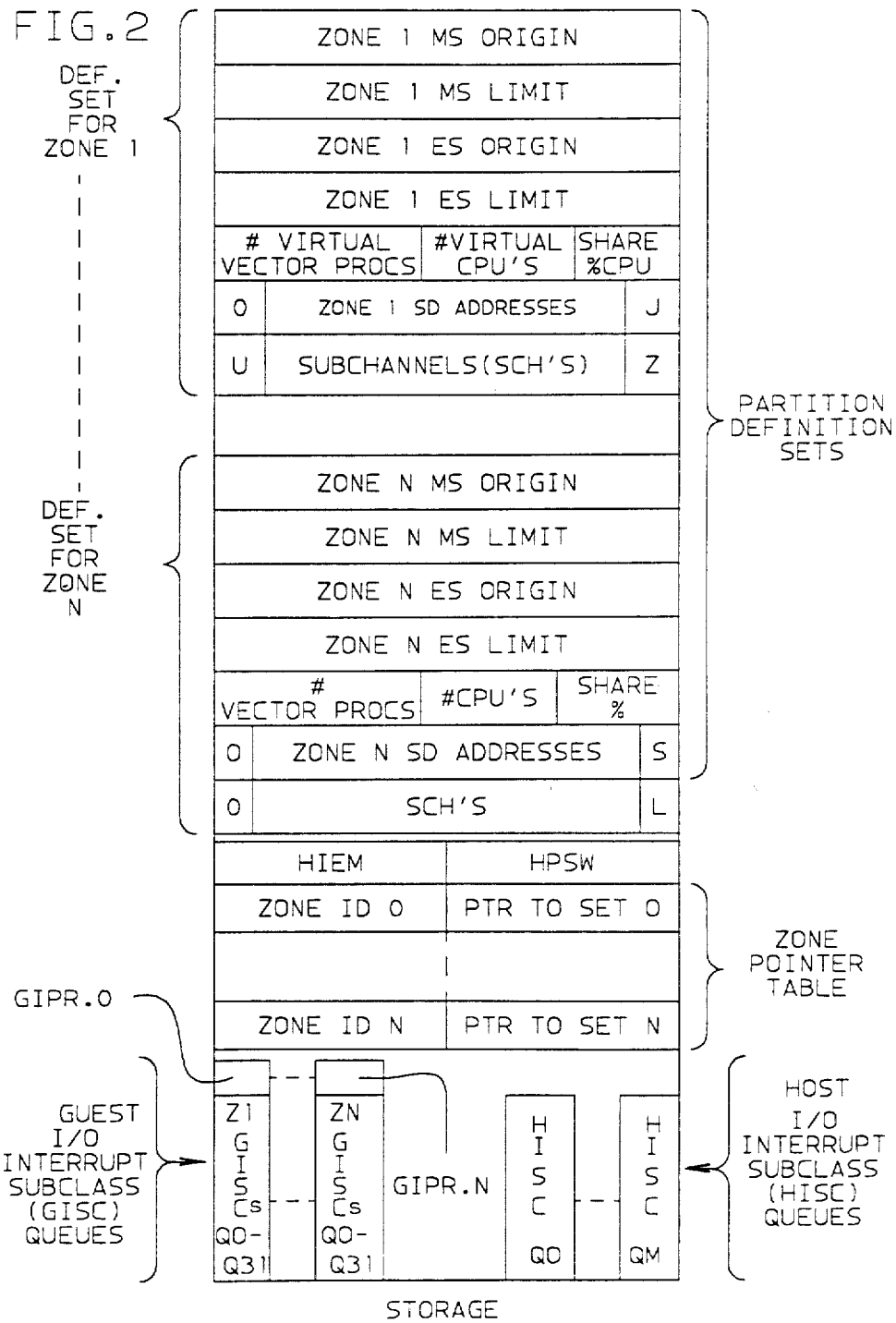

FIG.3A

```
┌─────┬──────┐
│ SIE │ OPD  │
│     │ ADDR │
└─────┴──────┘
         │
         ▼
```

STATE DESCRIPTOR (SD)

| GUEST MS ORIGIN | | GUEST MS EXTENT | |
|---|---|---|---|
| ASSIGNED ZONE NUMBER (AZN) | | INTERRUPTION AREA | |
| SQ (G.PEND. I/O IRPT) | D (SEL.DISABLE I/O IRPT) | INTERCEPTION AREA | I (ICPT.CODE) |
| ZONE 0 | ZONE 1 | ALERTING ZONE MASK (AZM) | ZONE N |
| ZONE MODE | EXECUTION CTRL AREA (ECA) | | ALERTING MODE |
| AZN OF CURRENT ALERT | | | |
| XA OR 370 MODE | GUEST PSW | | |
| ISC 0 | GUEST I/O IRPT ENABLE MASK (GIEM) | | ISC 31 |

FIG.3B

CPU

MS — ES

| CACHE | GRs | TLBs |
|---|---|---|

| DISPATCHED AZN | |
|---|---|
| HOST CURRENT PSW | GUEST CURRENT PSW |
| ZONE 0 | ZONE 1 | AZM | ZONE N |
| ZONE MS ORIG AA | ZONE MS LIMIT AA |
| ZONE ES ORIG PN | ZONE ES LIMIT PN |
| EMUL MODE | ZONE MODE | ALERTING MODE | |
| ISC 0 | ISC PENDING REG (IPR) | ISC M |
| ISC 0 | EFFECTIVE I/O INTERRUPT ENABLING MASK (EIEM) | ISC M |

GUEST CNTL REGS 0–15    HOST CNTL REGS 0–15

SUBCHAN. CONTROL BLOCK

| V | POINTER | |
|---|---|---|
| HOST ISC #(HISC) | | L (SCH LOCK) |
| GUEST ISC #(GISC) | | |
| ASSIGNED AZN # | ENABLE | |
| ZONE MS ORIG.AA | | |
| ZONE MS LIM.AA | | |
| DEVICE INTERRUPTION STATUS (SCSW) | | |
| SUBCHANNEL (SCH) # | ASSOC.DEVICE # | |
| CHAN#0 ⁞ CHAN#7 | X (STATUS PENDING BIT) | P (PASS THRU BIT) |
| GUEST IRPT PARAM.WORD | | |
| | | |

FIG.6
FORM OF MS ORIGIN & LIMIT ABSOLUTE ADDRESSES:
MS BOUNDARIES: 1 MB
FORM OF ES ORIGIN & LIMIT PAGE ADDRESSES:
ES BOUNDARIES: 256 PAGES

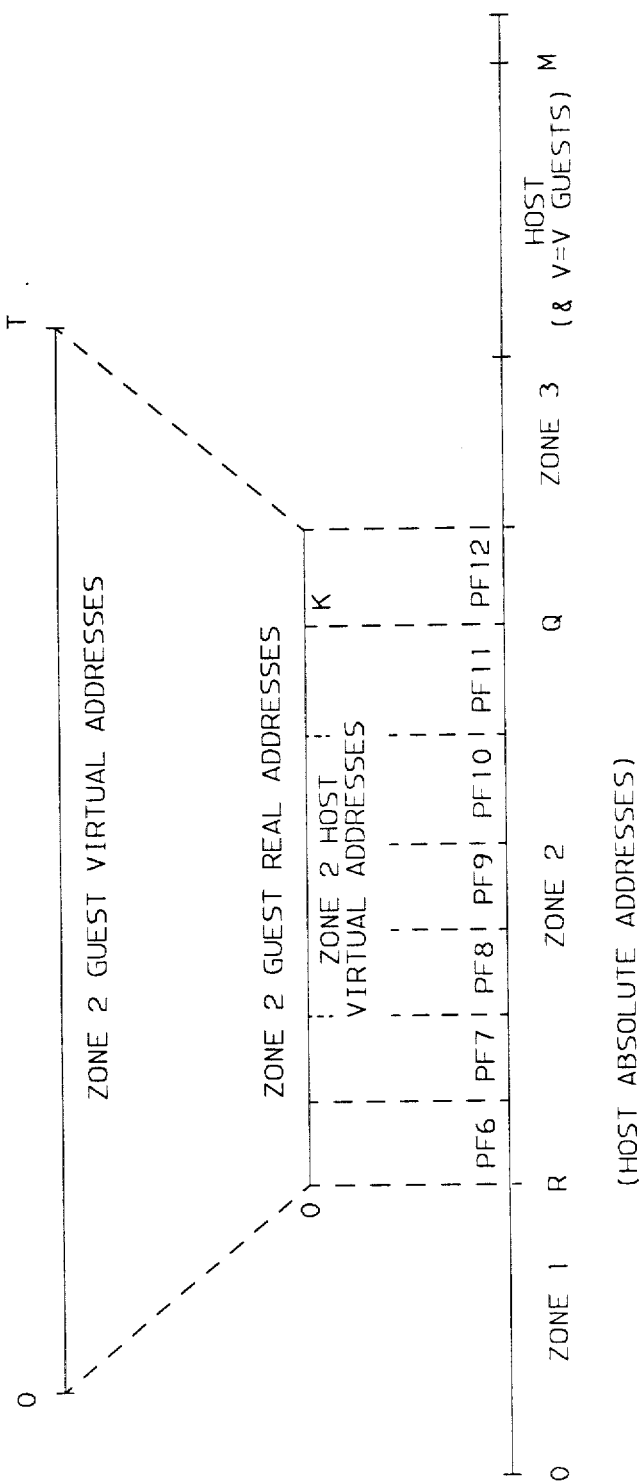
FIG. 7A (CPU ADDRESS TRANSLATION)

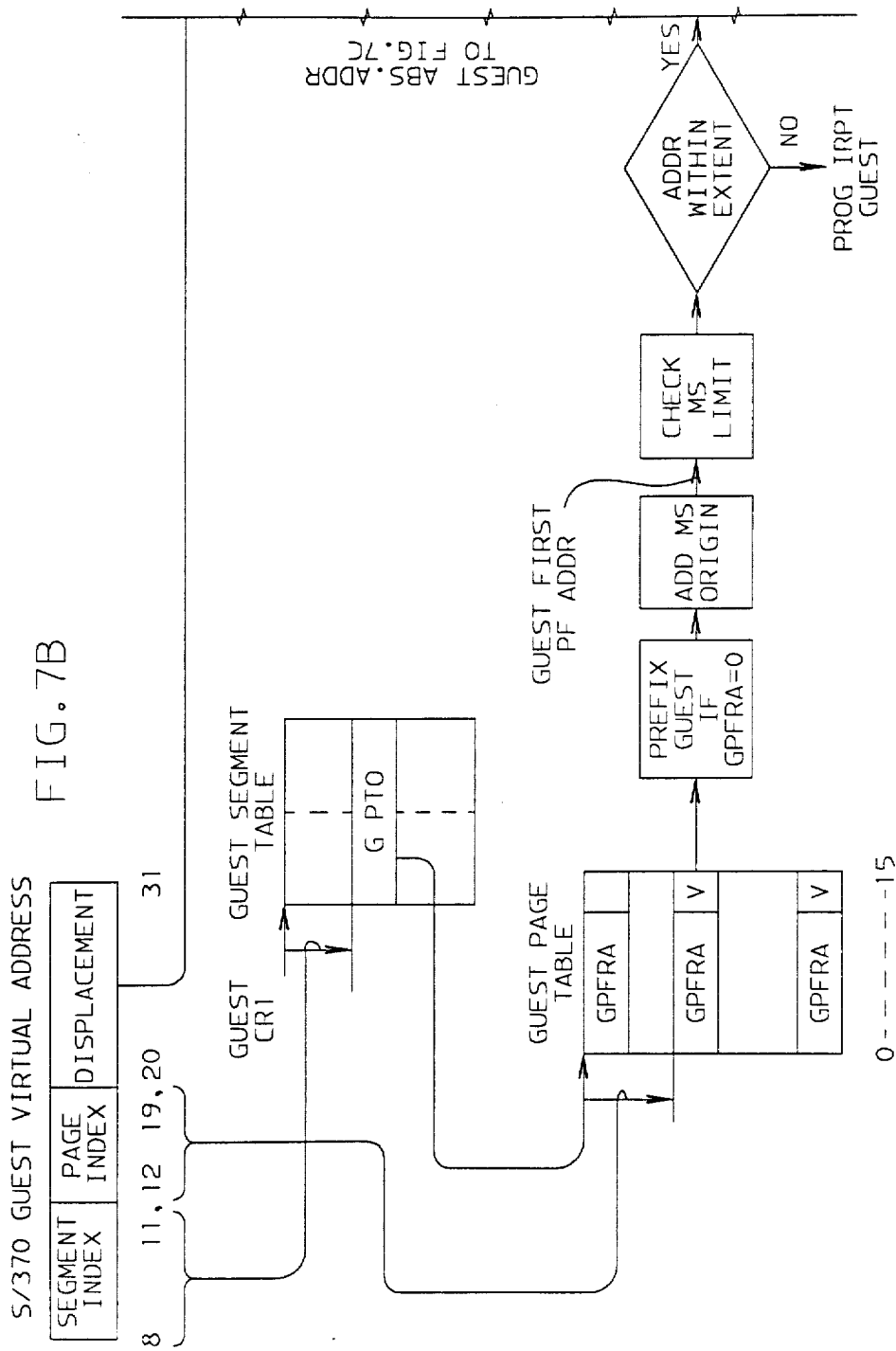

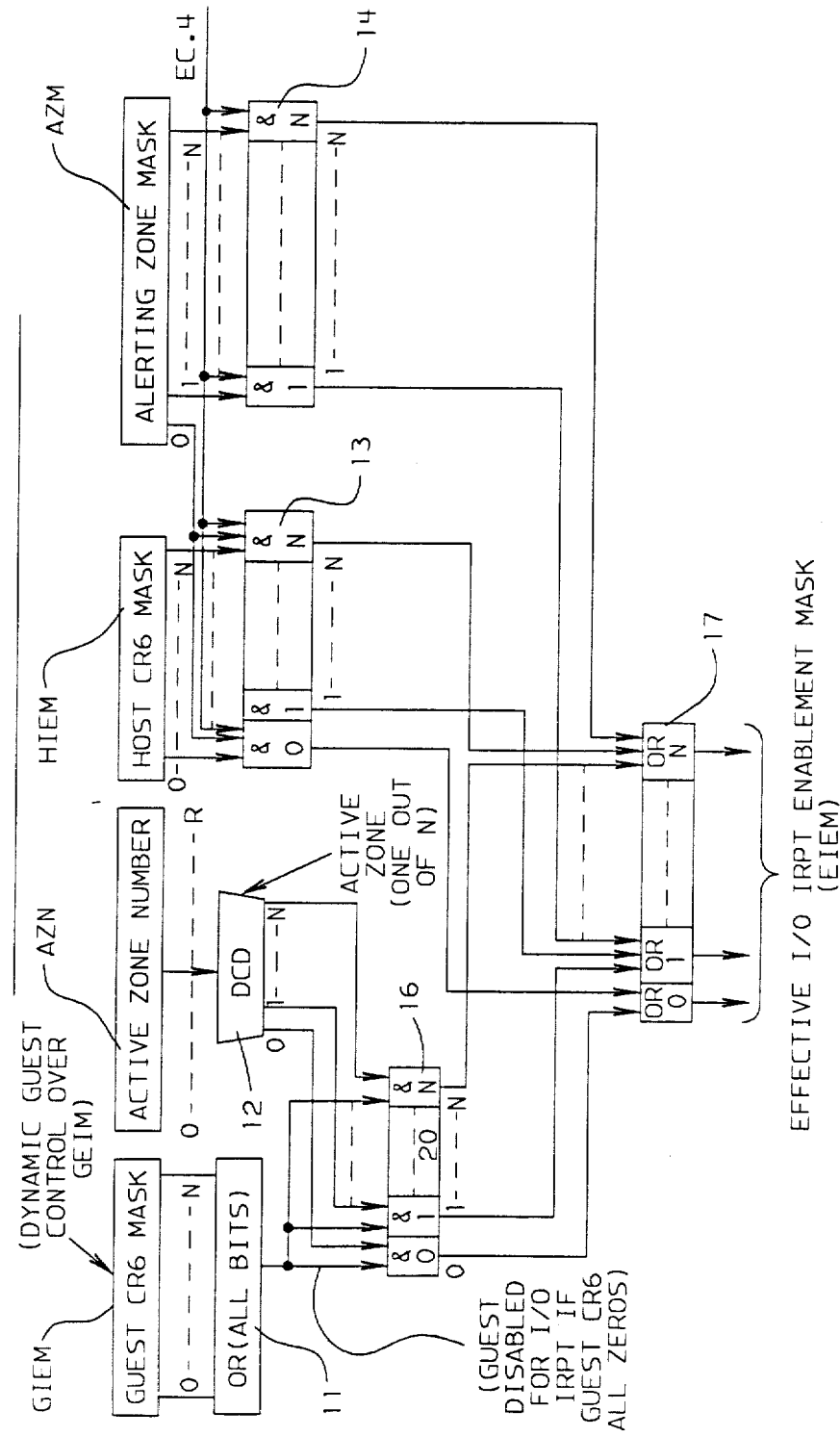

FIG. 11A  SIE INSTRUCTION MASK CONTROL
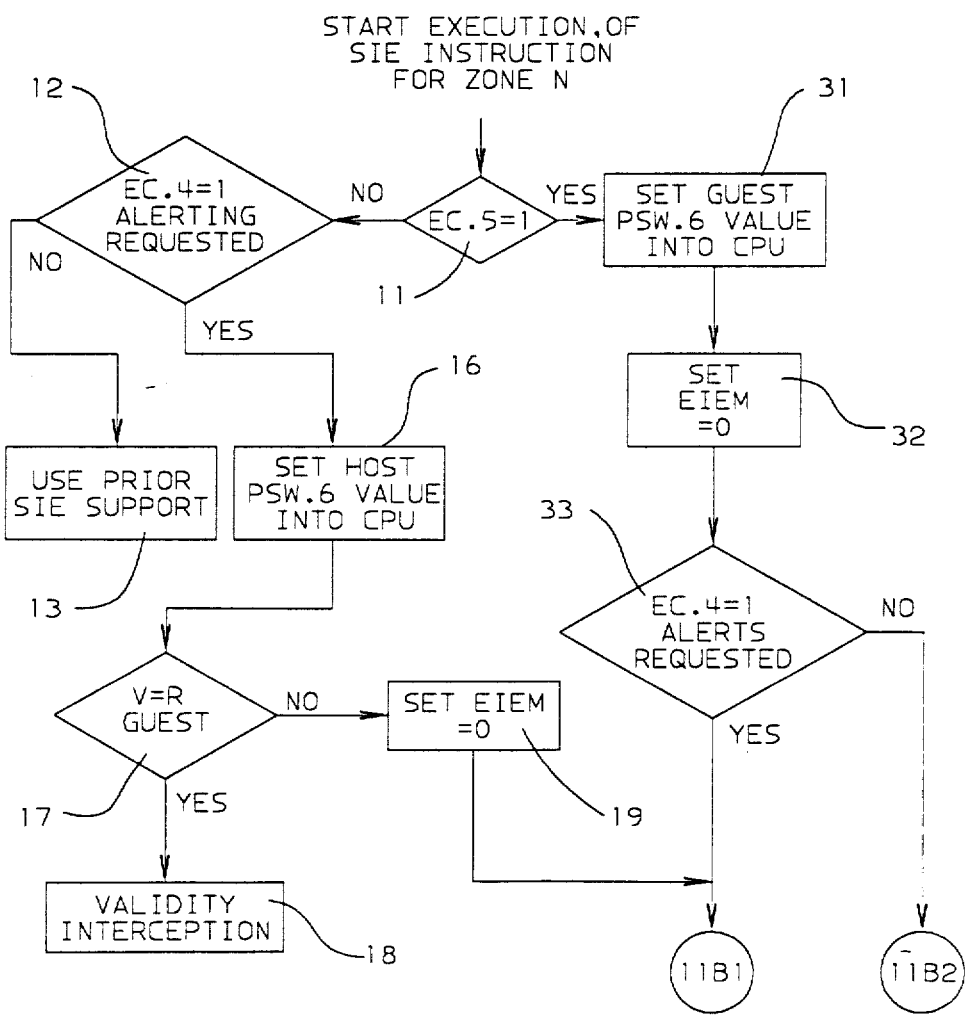

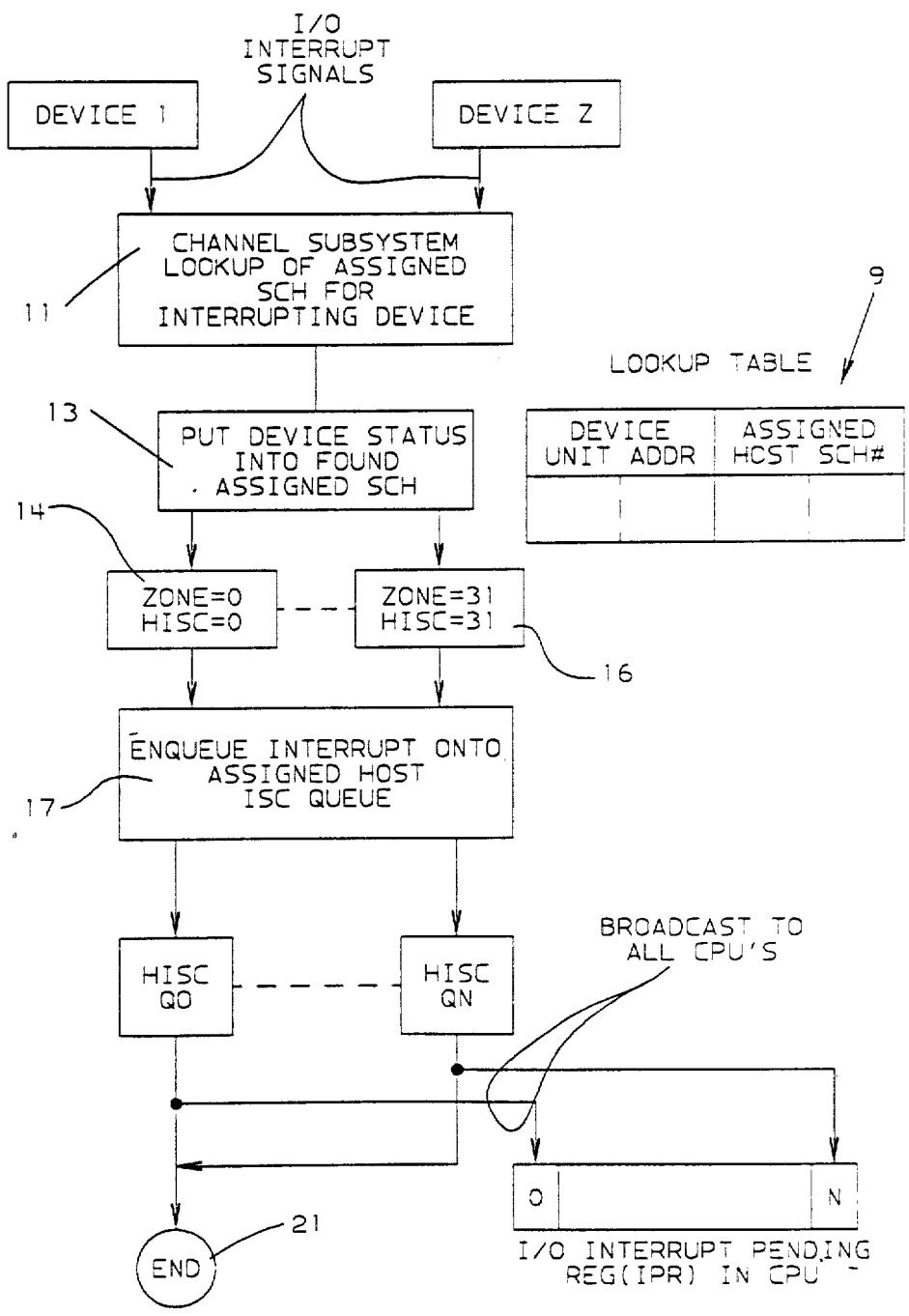

FIG.12B
GUEST SUBCHANNELS FOR ZONE 2
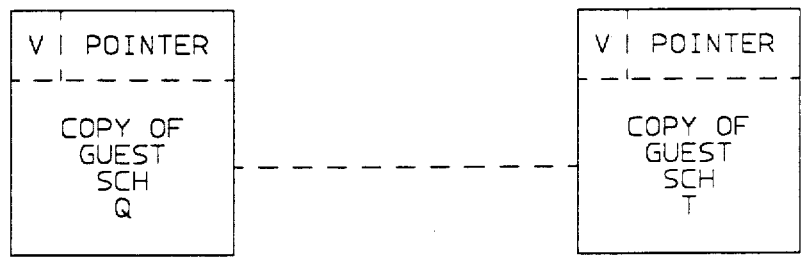
GUEST I/O QUEUES
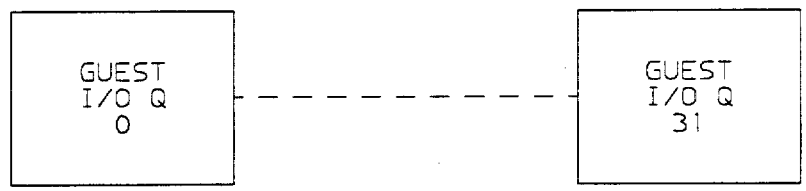

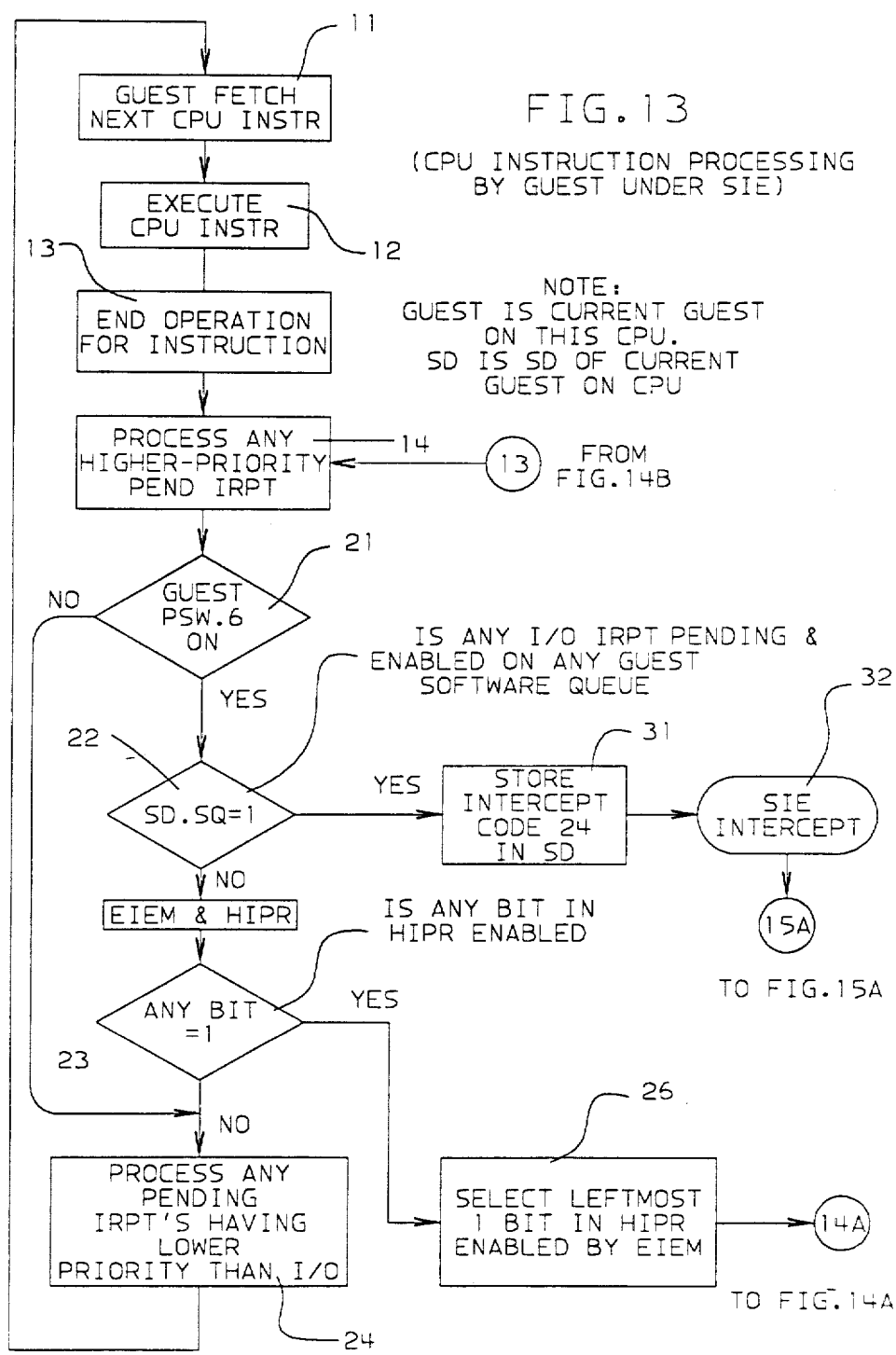

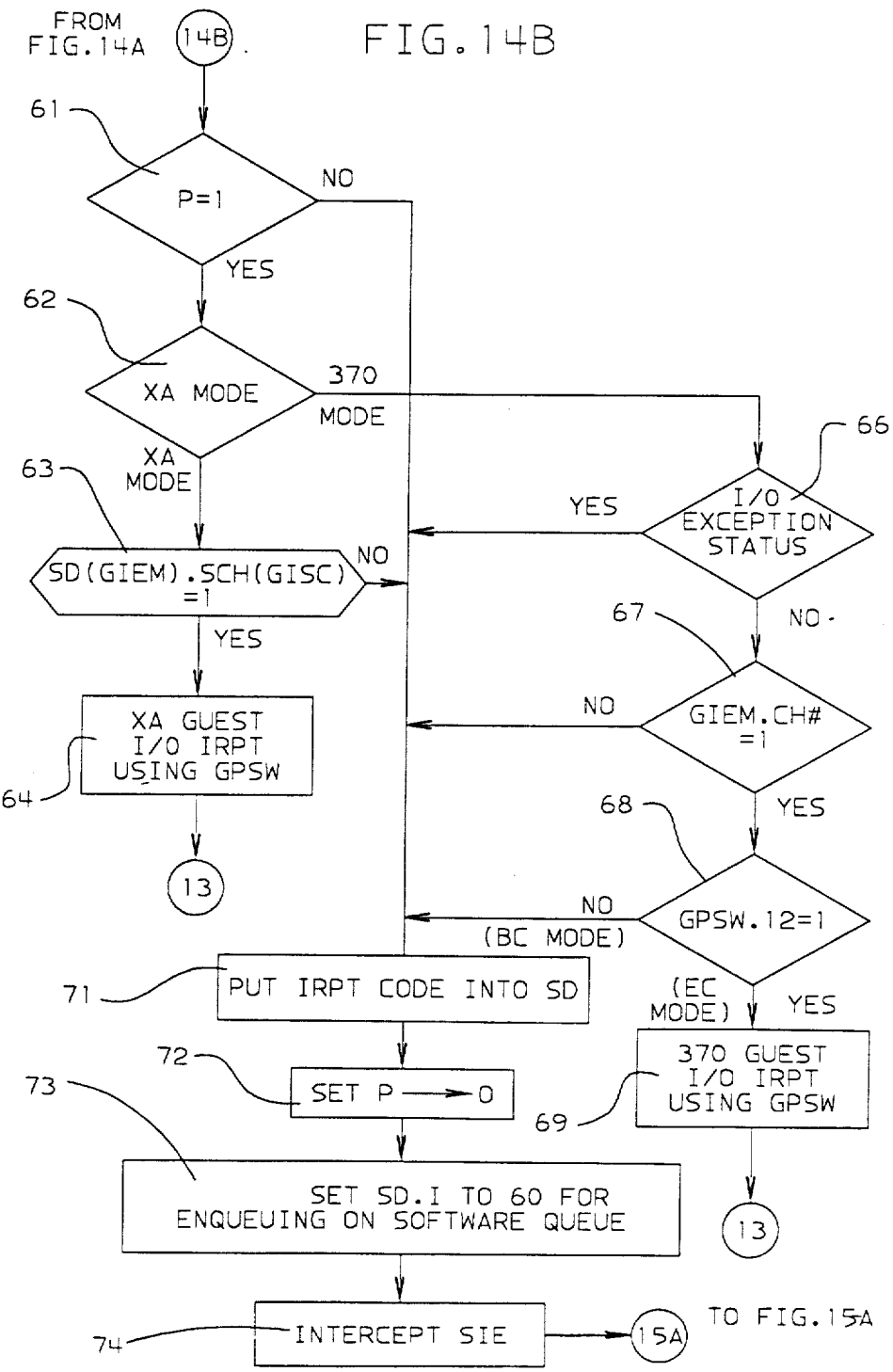

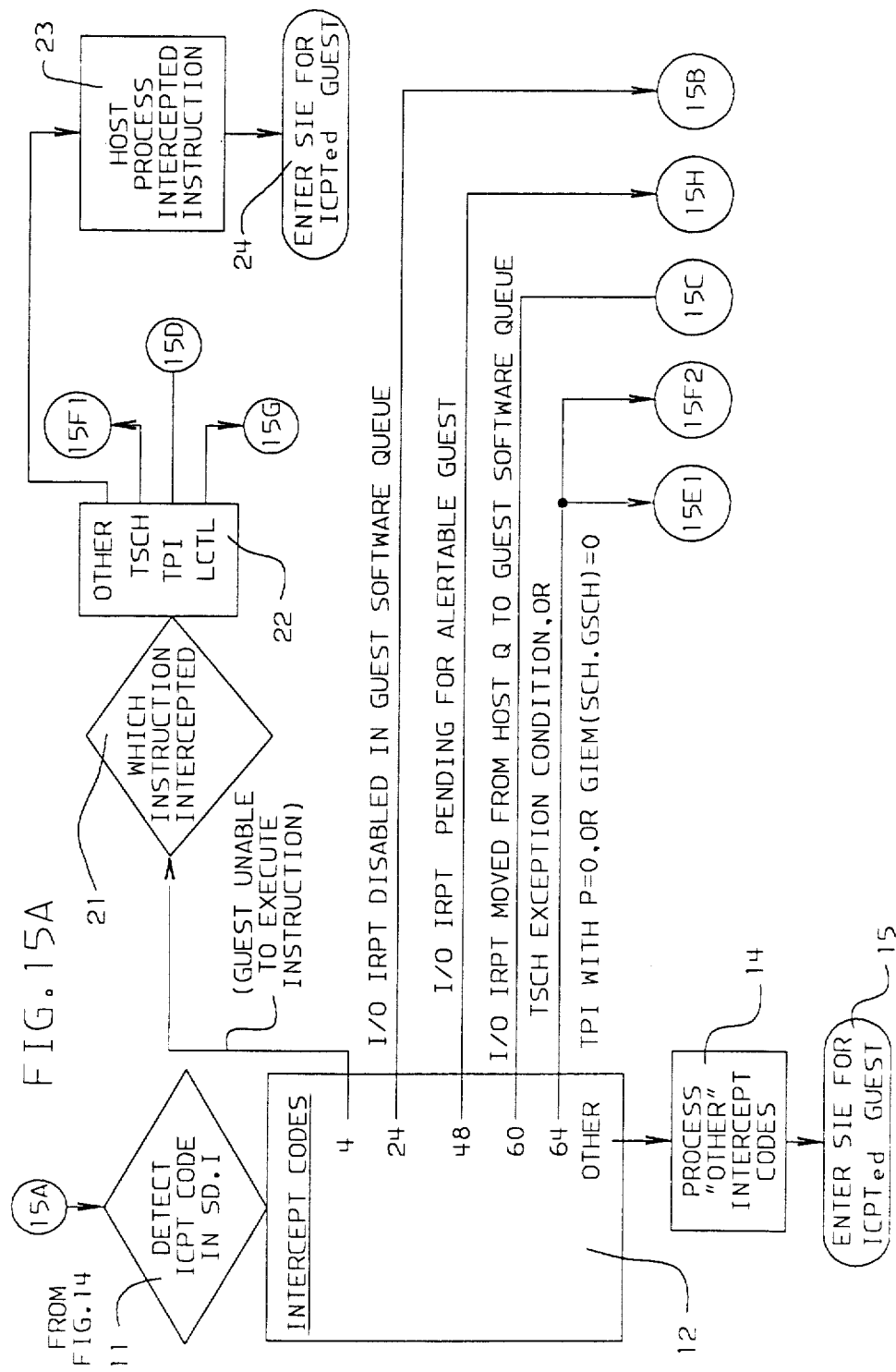

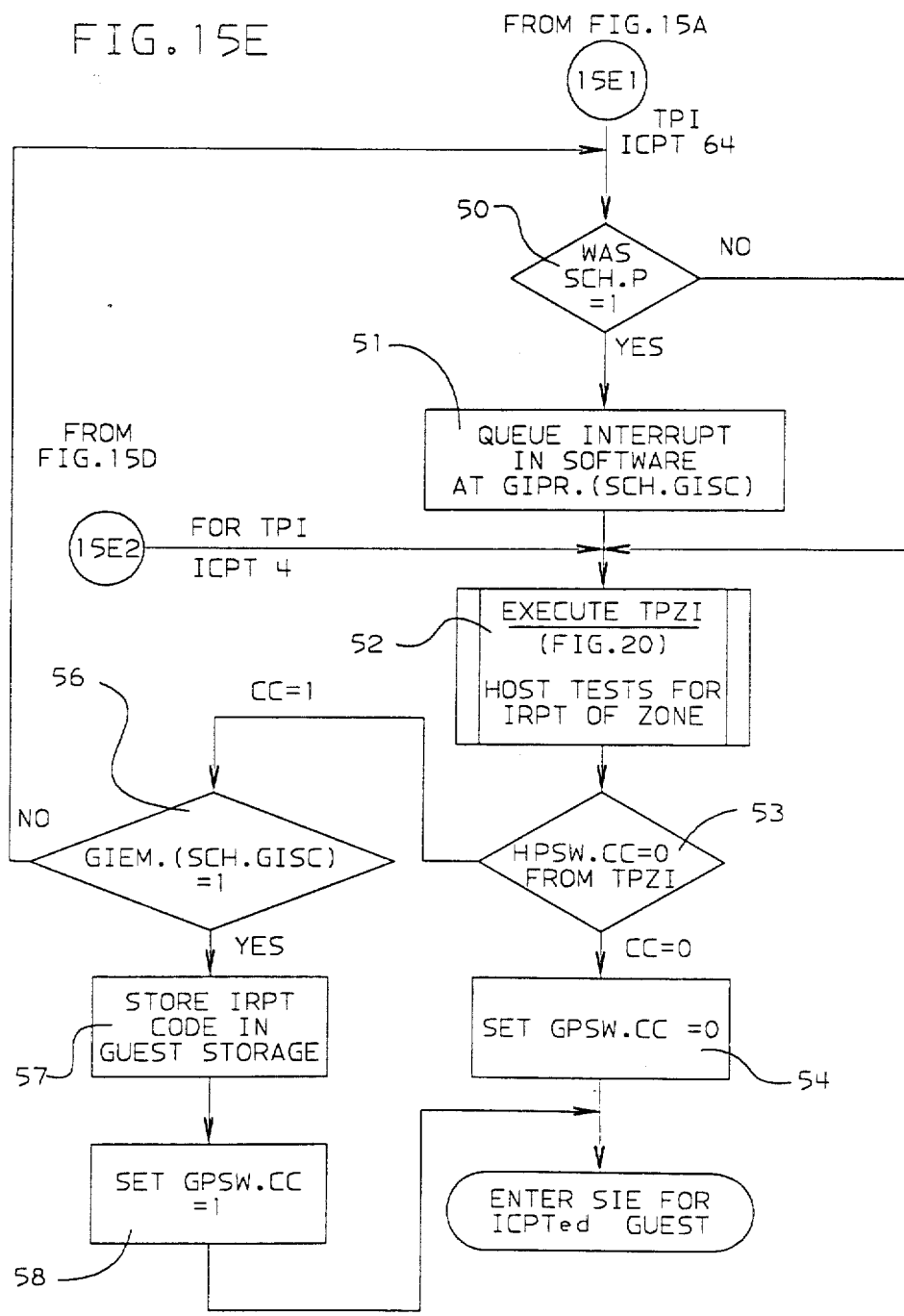

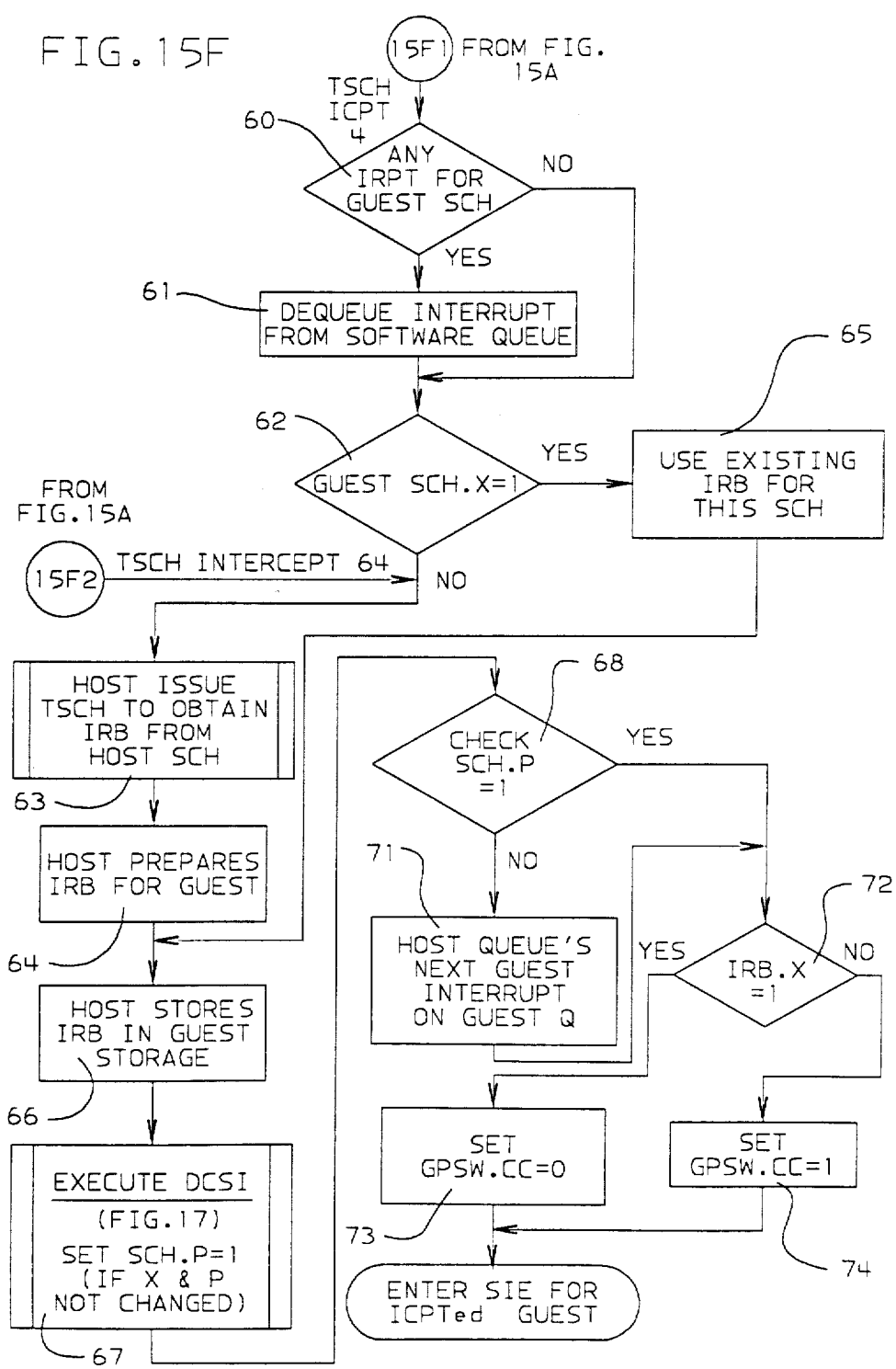

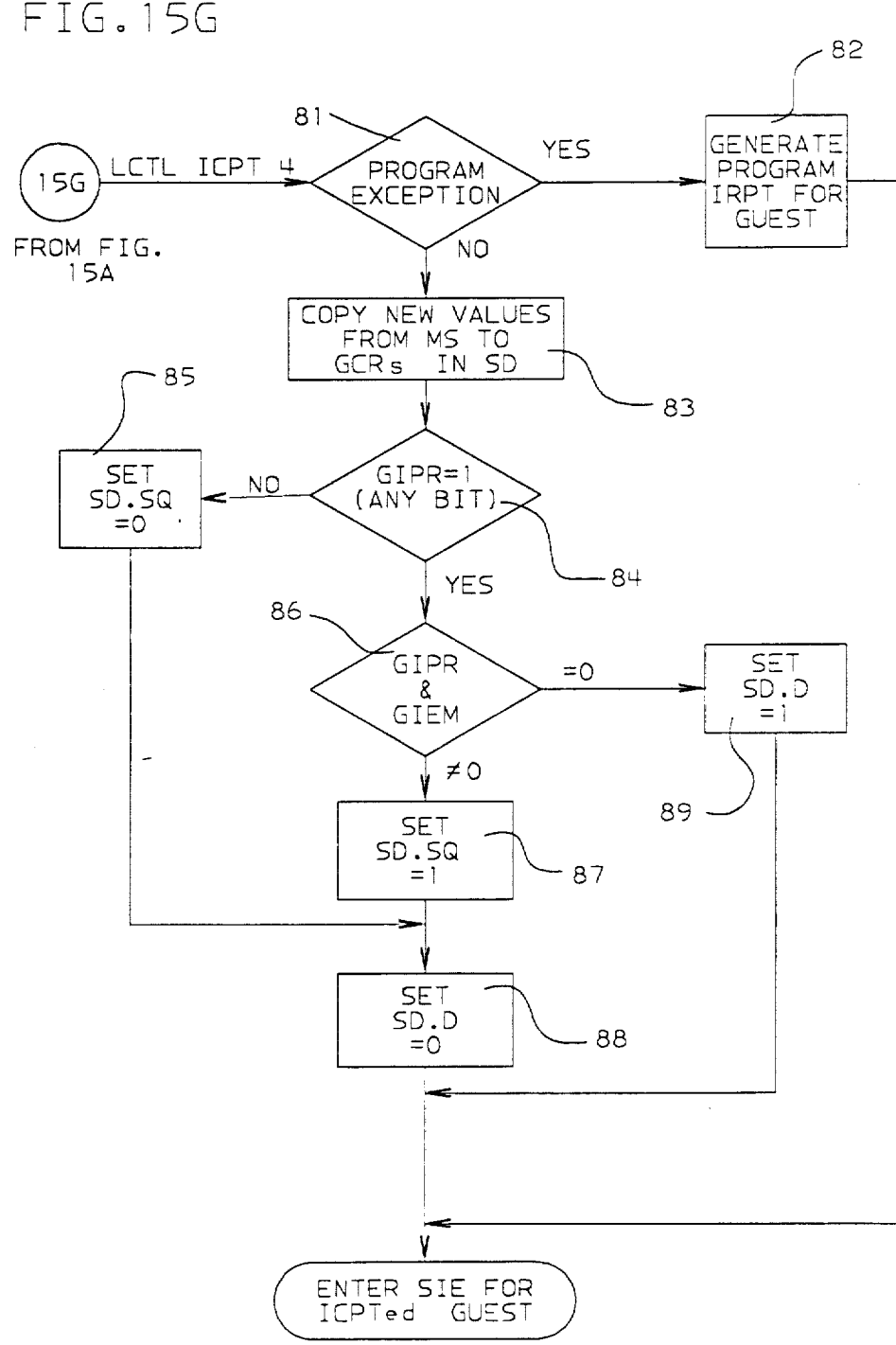

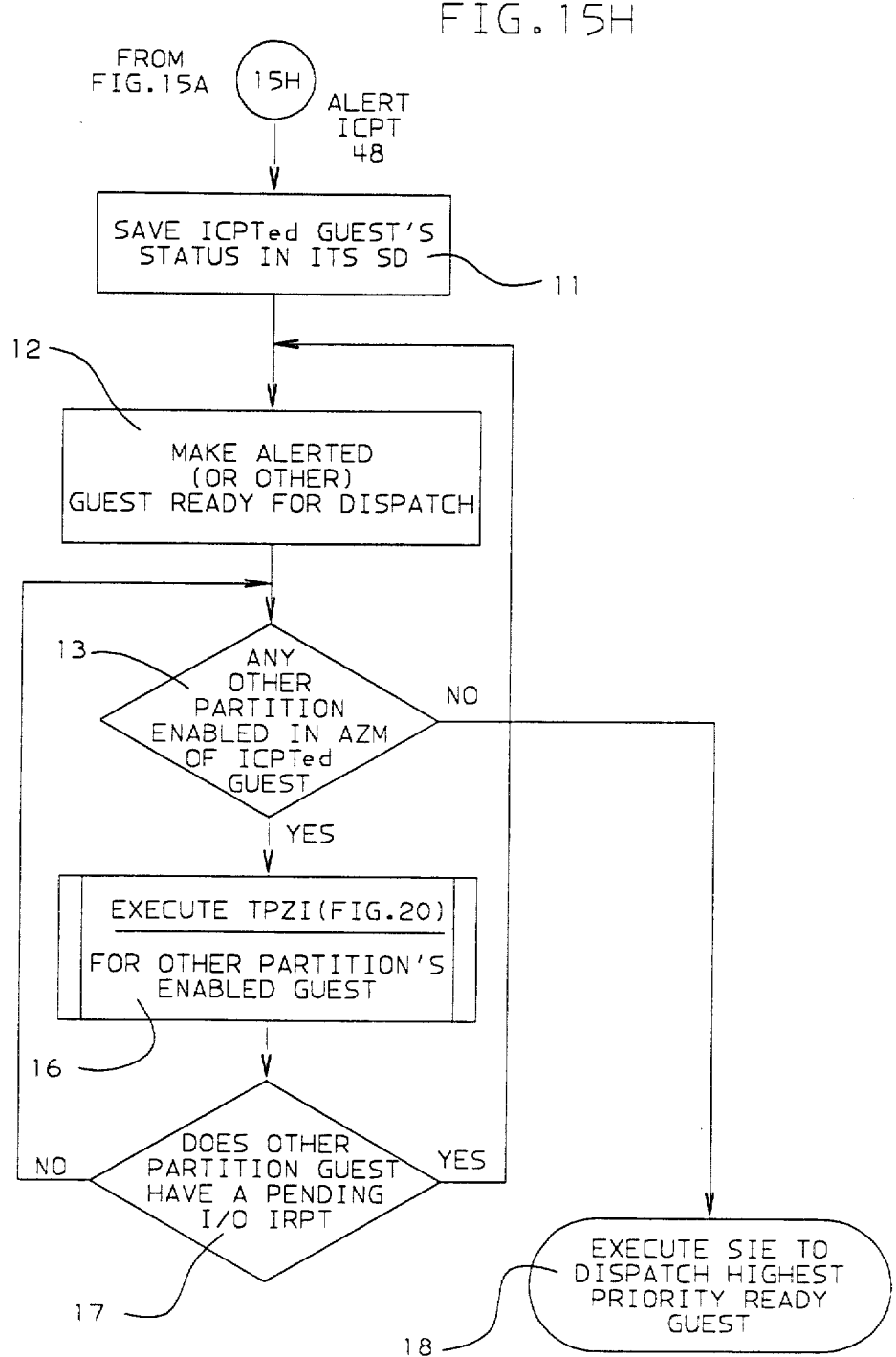

LOGICAL RESOURCE PARTITIONING OF A DATA PROCESSING SYSTEM

INTRODUCTION

This invention relates to a method and means for partitioning the resources in a central electronic complex of a data processing system into a plurality of logical partitions. The partitioning system may be embodied in programming, microcode, or by special hardware to enable highly efficient operation of a plurality of different programming systems in the different zones of the system. The invention provides a unique way of assigning subsets of the random access storage, central processor, the channel, and subchannel resources of a system to the different logical partitions in the system to enable a plurality of different preferred guest programming systems to run simultaneously in the different partitions. This invention also includes the partitioning of the I/O channel and subchannel resources in the system among the different partitions. The different guest programming systems in the different partitions generally will be different operating systems.

BACKGROUND

Virtual machine (VM) hypervisor programs have been in public use for many years, e.g. IBM VM/System Product (SP). VM/SP normally is loaded into the high address end of main storage and coordinates the running of programs by a plurality of users who respectively interface a data processing system from any of a number of keyboard/display terminals which are usually distant from the one or more central processing units (CPUs) and the main storage (MS) of the system.

The advantage of VM is that it gives each of its users the apparent data processing power of a large system by giving each user an apparent or logical CPU. Plural logical CPUs could share each real CPU resource(s) in the system. The VM users (who are sometimes called "guests" of the VM "host" control program) are assigned by the VM control program to different MS areas in which to operate as the user performs work on the system.

Any VM guest may run any type of program that is designed to interface the architecture of the connected real system, e.g. the S/360, S/370 or S/370XA architected instruction set may be used by any guest program running on a S/370XA hardware system.

Operating programming systems, such as MVS, have been run as one of plural guests under VM/SP, under which MVS/SP was often the preferred guest because it was used as the production system. The preferred guest managed its assigned part of MS, which is called the guest's real storage since to the guest operating system this is the system storage under its control. The preferred guest was run with its virtual storage addresses equal to and translating to the host's real storage addresses, and was sometimes called the V=R guest.

Other simultaneous guests under VM operation were, however, virtual guests (sometimes called V=V guests) since their real storage was actually a portion of the virtual storage assigned from the VM host's real storage as required. The virtual addresses of each V=V guest translated to real addresses which were different from its virtual addresses, unlike the V=R preferred guest. The result was better performance for the one preferred guest due to assigning the lowest address part of MS to the preferred guest operating system beginning at absolute address zero. Because the V=R guest had equal real and virtual addresses, I/O programs using real addresses would access the correct locations in real main storage even when they were translated, and this enabled the V=R guest to handle its own I/O starts and I/O interruptions and its own address translations, without host intervention, and the V=R guest had a performance efficiency approaching its standalone performance efficiency (i.e. when it was the only programming system in the data processing system).

But during V=V guest program execution, whenever the guest needs a main storage allocation, or requires I/O and tries to issue a start I/O instruction (SIO, SIOF or SSCH), the guest is not permitted to do so, because the guest's I/O program real addresses are not equal to the guest's assigned absolute addresses in MS. Hence, the guest's channel programs will not operate when the VM assigned location of the guest is not in the MS area addressed by the channel program.

Because of these storage address problems, the V=V guest's program requests for storage and SIO, SIOF or SSCH instructions were intercepted by the VM host control program, which then adjusted the I/O program and storage addresses for the guest so they would address locations within the MS area assigned for use by the guest.

To do the guest I/O in S/370, the VM host first must assign a part of the host's virtual storage space to each V-V guest. A guest needing to access guest real addresses (as occur for MS requests by guest I/O operations) must use each guest real address as a host virtual address, which must be translated (using the host segment and page tables) to a host absolute address. Consequently MS is accessed at this host absolute address in response to the guest's I/O channel request. Therefore, each guest I/O request accesses MS at a location obtained from a host address translation. Another page address translation is needed whenever the I/O requests cross a page boundary in MS.

Once a CPU page is translated (non-I/O address), the resulting page frame address is stored in a TLB in the CPU, which is referenced to avoid repeating the translation process for the same guest page. The address translation process previously used for V=V and V=R guests is explained in detail in U.S. Pat. No. 4,456,954 to Bullions et al. Other U.S. patent applications providing relevant prior art are Ser. No. 947,350, by P. H. Gum et al, filed Dec. 29, 1986, entitled "Selective Guest System Purge Control" and Ser. No. 651,491, by H. R. Brandt et al, filed Sept. 17, 1984, entitled "Fast Two-Level Dynamic Address Translation Method and Means", both of which are assigned to the same assignee as the subject application.

If the referenced guest storage is not resident in the host real storage, a page in operation must be performed.

When a page in guest storage is to be referenced for an I/O channel operation, its page frame must be "locked" in host storage for the duration of the I/O accessing operation.

The I/O operation initially finds a guest's S/370 channel program location by going to location 72 in the guest's PSA page frame (i.e. the guest's page zero) to obtain the channel address word (CAW) which contains the address of the first channel command word (CCW) in the guest's channel program. To start an I/O operation in S/370XA, a guest issues a start subchannel (SSCH) instruction which addresses an operation request block (ORB) located anywhere in MS to address the first CCW of a channel program. In order to relocate the channel program, VM translates the address of the obtained first CCW to an absolute address in MS. Then the VM host examines the channel program to determine which pages in the guest's area are needed for the data being transferred, and VM fixes page frames for these pages in preparation for the I/O data transfer. Then the VM host copies the channel program into the host's MS area and changes the addresses within its CCWs to the absolute addresses which are required by the I/O channel hardware to be accessed in the newly fixed page frames in the guest area for the I/O data transfer. Finally, the VM host starts execution of the I/O channel program it built in the VM host area to perform the I/O transfer for the guest. Hence, it is apparent that guest I/O operation under VM involves a significant amount of programming overhead before the channel program can start to run, which is overhead that does not exist when the guest program is executed as a program in the original MS area for which it was written; which is done for a V=R guest, or in a standalone environment where it is the only program in a system and has all of the resources in the system for its use.

In S/370XA, the host finds the guest channel program location by obtaining the guest start subchannel (SSCH) instruction and operation request block (ORB) operand address.

The added VM host overhead for V=V guest's to obtain real address relocation of guest I/O channel programs has been recognized as burdensome for production guests, i.e. highly active guests. The limited solution for the one V=R preferred guest, loaded at absolute address zero, is not available for other guests. As long as there is no need for more than one highly efficient guest, the conventional VM preferred guest solution is adequate.

The added burden of the conventional VM handling of non-preferred V=V guests becomes significant for non-preferred guests that have a large amount of I/O activity. The result is that V=V guest programs having large amounts of I/O activity cannot be efficiently handled by VM.

This conventional VM limitation occurs whether VM is being run on a UP or an MP, because the main storage of either has a single expanse of absolute addresses (absolute addresses are the same as real addresses in a UP). In some MPs, one of the plural CPUs may be dedicated to execute the preferred guest in the system. Then another CPU in the MP may execute the non-preferred guests.

It should be understood that a guest may be an operating system representing UP or MP operations. Hence, a guest may be a UP guest or a MP guest. An MP guest can be executed on a real UP system as well as on a real MP system.

In a real MP or UP, address translation requires a page frame assignment to each page of program requested logical addresses in order to translate program virtual addresses to main storage real addresses. In a MP, program requested real addresses are changed to absolute addresses by CPU hardware prefixing (which is not apparent to the user). Absolute addressing is required in a MP because each of the plural CPUs has its own control area (called a PSA, prefix save area) and each PSA is located at real address zero. MP main storage has only one physical address of zero (called absolute address zero); and each CPU's real address zero is located at a prefixed non-zero absolute address, so that the different CPU PSA (all at the real address of zero) are relocated at a different non-overlapping absolute address locations in the single range of absolute addresses in the MP machine's main storage. Normally the page frame located at absolute address zero is not used as a prefixed PSA page. Thus, the CPU real addresses provided for accessing the PSA pages are prefixed differently in the MS range of absolute addresses, but all other CPU real addresses provided for accessing main storage are the same as their corresponding absolute addresses. In a UP, all real addresses may also be absolute addresses. However, prefixing has been used in UPs (as well as in MPs) for locating the host PSA page outside of the area allocated to a V=R guest which includes the first page frame in MS.

A solution to the I/O burden for a MP using a programming system designed for UP operation is to redesign the program in read-only form with proper internal programmed locks so that a particular I/O program can only execute on one at a time of the plural CPUs. This involves having only one copy of the program in MS beginning at absolute address zero, and except for its locked parts, this copy is simultaneously and independently being executed on the plural CPUs with necessary program coordination being maintained by the internal programmed locks.

Unfortunately, the redesign of a complex UP program for MP operation is expensive and takes a long period of time to complete in a reasonably error free manner. Many existing uniprocessor programming systems (UPSs) were written with real addressing (rather than virtual addressing). These programs generally use 24 bit real addresses, and have very large amounts of I/O activity. They may not be designed with the internal locks required to maintain the integrity of the program on a MP.

Since there is only one set of absolute addresses in a MP between 0 and a maximum value (that can vary with each MP machine, for example 64 MB), only one copy of a program (written to start at address zero using real addresses) can be located in the main storage, when the program, or any part of it such as its I/O channel programs, is not relocatable. This may be the case with existing programs written with real addressing for execution on a UP. Inter-CPU locks (that may be needed in the programs to enable their use on a MP) may not exist in such a program.

Consequently in the prior art: (1) a program written for UP use may not be executable on more than one CPU of a MP, because of a lack of programmed locks in its internal program routines to assure against failure of execution caused by plural CPU contention for its writable parts; (2) indirect execution of plural copies of such programs on plural CPUs under VM (although operable) becomes economically impractical when they have very high I/O activity because of the VM host's I/O simulation burden, and (3) it is very expensive to rewrite such programs for plural CPU operation, since it would take a substantial amount of time and testing, although this can be done by those presently skilled in the MP programming arts.

As a result, the most efficient processing for such UP designed programs has been limited to single CPU operation in a standalone UP, even though faster and more reliable MPs are available.

It is of course possible to utilize separate standalone CPUs with independent main storages, but generally MP hardware provides a less expensive package for a given amount of processing power because of the sharing of the physical components of the system among the simultaneous programs being executed.

U.S. Pat. No. 4,564,903 to Guyette et al and assigned to the same assignee as this application, discloses and claims a unique multiprocessing environment that enables plural copies of the same uniprocessor programming system (UPS) not designed to run on a MP system, to execute simultaneously on a MP. That patent provides a hypervisor type of control program (called a partitioned multiprocessing program, PMP) that enables the simultaneous execution in a MP by its plural CPUs of respective copies of a UPS in the MPs main storage (MS) with the capability of sharing system resources, including a single I/O data base, e.g. on plural DASDs. Copies of the same UPS program are loaded into different areas in the MPs main storage (MS). Each area begins at a different MS location and comprises a contiguous byte area. PMP can provide any CPU in the MP with an affinity to a particular copy of the UPS in MS. The plural CPUs executing the different copies of the UPS run independently of each other, but they may share I/O devices. Such system runs with a virtual machine (VM) type of job entry and task dispatching control programming system preferably designed to operate on CPUs having an architecture disclosed in the "IBM System/370 Extended Architecture (S/370-XA) Principles of Operation" (IBM Publication No. SA22-7085-0), in the "IBM Assists for MVS/XA" (IBM Publication No. SA22-7092-0), and in an article entitled "System/370 Extended Architecture: Design Considerations" in the May 1983 IBM Journal of Research and Development, Volume 27, Number 3 on pages 198 to 205 by A. Padegs. These publications include SIE (start interpretive execution) architecture.

Program jobs are entered for execution by a respective UPS copy, and the jobs are controlled under PMP as tasks of the respective UPS guest.

PMP ensures MP integrity: (1) in its assignments of all tasks in the MP, and (2) in its assignment of each I/O device to any UPS operation. PMP ensures integrity of the physical and logical I/O paths in the MP shared by the multiple UPS copies by maintaining I/O queues to hold pending I/O operations issued to I/O units which are busy performing I/O operations requested by the different UPS copies. When any required I/O unit becomes free, PMP can issue the next pending I/O operation from the queues.

The PMP hypervisor is initially program loaded into MS, preferably at the high address end of MS. Thereafter, copies of the UPS can be loaded into the different MS areas. A next copy can be loaded into MS at any time by a log on process.

The size of MS must equal or exceed the number of areas provided for the respective copies of the same UPS plus the PMP hypervisor, and any other program areas. The UPS program uses an effective address range which only covers its respective area in MS, and its address range may be insufficient to address the absolute address size of MS. For example, the UPS might use 24 bit addresses, but MS absolute addresses may exceed 24 bit addressing, e.g. requiring 26 bits. PMP hypervisor runs independently on any one or more of the CPUs in the MP to dispatch all jobs on each respective CPU, including the dispatching of both UPS and non-UPS work. Non-UPS work may be executed on a CPU if a UPS has not been assigned to it, or the assigned UPS is not ready for execution. Non-UPS work may be VM work in which case PMP passes control to the VM like PMP control program, which then controls the CPU and I/O execution of VM work in the conventional VM manner. PMP therefore passes UPS and VM work to the CPUs for execution. Under PMP control, some or all of the CPUs may be dedicated solely to UPS work. VM work may be done on any CPU not dedicated solely to UPS work or on a CPU dedicated to VM work.

To enable I/O addresses in any UPS copy (i.e. I/O real addresses) to be handled in a simple manner that translates them to MS absolute addresses, each zone begins at a boundary byte address which is an integral power of the radix 2, i.e. 2 to the n power ($2^{}n$). The first UPS region may begin at absolute address zero. The $2^{}n$ byte boundary enables a MS absolute address to be easily generated by logically ORing a representation of the $2^{**}n$-boundary value and the low order part of the UPS I/O address to form a 31 bit absolute address. More general I/O address translation means (more complex and costly) may be used to enable the zone boundaries to be located more flexibly.

The lowest address in each MS area begins with the PSA page of the respective guest UPS copy which may be structured in accordance with S/370 architecture and begins with the guest's absolute address zero. The contents of each guest's PSA page is simulated, i.e. entirely written in with programmed instructions rather than by CPU hardware actions.

However, each CPU in the system also has a hardware controlled PSA page which receives hardware inputted contents, e.g. for hardware interrupts. Each CPU PSA page is preferably located in the PMP area of MS by the content of the respective CPUs prefix register. The new PSWs in the CPU PSA page point to routines in the PMP host area for the handling of respective hardware interrupts.

PMP is the host control program which enables the UPS copies to be executed as emulated guests on the respective CPUs by putting each CPU into emulation state for executing a UPS guest program. One method of having PMP put a CPU operating in 370XA mode into emulation state is to have PMP execute a SIE (start interpretive execution) instruction, which causes the CPU to emulate the S/360 or S/370 or S/370XA architecture. The SIE instruction is explained in an article in the Proceedings of the Spring Meeting 1986, SHARE European Association, Heidelberg, West Germany, Apr. 06–11, page 531, "SIE Architecture", by P. H. Gum, and SIE is discussed in U.S. Pat. No. 4,456,954, issued to R. J. Bullions et al and assigned to the same assignee as the subject application.

Each UPS copy in MS is handled by MP as a separate guest which may be emulated on a different one of the real CPUs in the MP by PMP executing a SIE instruction on each of such real CPUs to put it into emulation state to emulate thereon a logical CPU whenever a real CPU is available to execute a ready UPS guest not dedicated to another CPU.

The UPS guest emulation state (i.e. the dispatch of a logical CPU on any real CPU) is temporarily ended whenever a hardware interruption occurs or the UPS guest executes either: (1) a UPS start I/O instruction, or (2) a UPS instruction (e.g. set system mask) that sets on an I/O enablement field in the guest's current program status word (PSW). When the emulation state is exited, CPU control is transferred from the UPS guest to the PMP host, and then the host respectively: (1) starts the requested I/O device, (2) simulates a special instruction, e.g. SSM, causing interruption, or (3) handles the I/O or other interruption causing the exit from emulation mode. Then the PMP host again puts the CPU back into the emulation state when the CPU again becomes available to continue execution by a ready UPS guest.

European patent application No. 0 171 475 by R. S. Lent et al, recently published, discloses a host computer system (UP or MP) in which each central processor and each I/O processor (built to S/370 architecture) is provided with a hardware element called a logical processor facility (LPF). (This European application is believed to represent the currently marketed Amdahl MDF system.) In the application, the LPF has user and system states; and each state has problem and supervisor modes. The LPF hardware supports simultaneous operation of plural operating system programs (SCPs) located in different domains in main storage. When in system state, the CPU or I/O processor is working for the chief SCP; and when in user state, the central or I/O processor is working for one of the user SCPs. The chief SCP controls the dispatching of all user SCPs on the central processors. The user SCPs may be written for other environments and are unaltered for operation on the host computer system. I/O channel addresses are relocated into the domain of the SCP that started the channel, and a lock bit controls whether the I/O channel is to be controlled by the user SCP or by the chief SCP. LPF registers contain the domain number and the domain CPU number. Interrupt router hardware directs each I/O interrupt to its required central processor by comparing a domain number with the I/O interrupt and the domain CPU number in the central processor, and if they match, the router sends the I/O interrupt to that CPU. Also, a user supervisor state bit in the I/O processor and each central processor are compared, and if both are in user state the processor processes the interrupt; but if the I/O processor is in user state and the central processor is in supervisor state then the router will not transfer the interrupt until the required processor returns to user state. LPF permits only the central processor that started the I/O device causing the interrupt to receive and handle the interrupt, which prevents the LPF host from dispatching a guest on any available processor, and the LPF host can only dispatch a guest on the *same* central processor that issued the related start I/O instruction and therefore must await its availability, thereby preventing the LPF system from providing its processors with dispatching flexibility in being able to dispatch a guest on the first processor that becomes available.

SUMMARY OF THE INVENTION

The invention enables multiple high performance guests (e.g. which may be different operating systems) to operate simultaneously and very efficiently within a tightly-coupled data processing system, whether it is a uniprocessor (UP) or multiprocessor (MP) system. To accomplish this, partitioning is done for the system resources of: main storage (MS), extended storage (ES), channels (CH), and I/O subchannels (SCHs).

Partitioning is controlled through "partition definition sets" of entries in storage that specify the partitioning of the system hardware resources, as determined by a system administrator. A name or identifier is assigned to each specified partition, and such a name may be a value, for example, from 0 to 255. Each partition's subset of the MS, ES, CH, SCH and channel path resources is specified in its "partition definition set", which is accessed by using the partition name, which is herein called the "assigned zone name" (AZN). The specified partitions are controlled by a hypervisor host program/microprogram (called the host). Other programming systems (called guests) are limited to the specified subset of resources assigned to a specified partition, and each guest is identified through the use of its assigned partition name. A partition may be dedicated to one guest, or be shared by a plurality of guests, such as by time slicing the use of a partition among the plural guests. Also, some of the resources in one partition may also be shared by being also specified in the partition resource set of one or more other partitions.

A guest may be any programming system compatible with the architecture of the system. When a guest is assigned to a respective partition, the guest has use of the resources specified for that partition name in the partition resource entries during the time period the partition is allocated to the guest.

This invention enables the use of one or more V=F (virtual=fixed) guests in a data processing system to operate in the manner of the one preferred V=R guest used in prior VM systems without the addressing restraints of a V=R guest. The term "preferred guest" is used to include the V=R guest as well as the one or more V=F guests in a data processing system. This invention is directed to enabling plural preferred guests to concurrently operate in separate partitions within a system.

Not all of the MS, ES, CH, SCH and channel path resources in a system need to be assigned to the preferred guests. System resources not assigned to the preferred guests are reserved to the host, which can parcel out some or all such "host reserved resources" to one or more "virtual guests" (that are similar to the virtual guests, called V=V guests, in the prior IBM VM/System Product).

Furthermore, overlapping of resources is permitted to the partitions by this invention, e.g. part of MS, or certain I/O devices, may be assigned to plural zones.

The maximum number of preferred guests (which may be specified to a system) is limited by the number of bits provided in a field for containing the partition name, AZN, as well as by the amount of resources in the system and reserved to the host. Resources provided to V=V guests are taken from resources reserved to the host. The efficiency of operation of a guest is affected by the amount of resources assigned to the guest. Any amount of available resources (subject to the maximum then available) may be assigned to any preferred guest. The amount of resources assigned to different preferred guests may be made equal or unequal according to the determination of a system administrator.

Each preferred guest and each V=V guest is provided with one or more "logical CPUs". A logical CPU can be dispatched on any real CPU in the system. Logical CPUs for V=V guest(s) have previously been provided using the prior IBM S/370 XA SIE architecture. However logical CPUs for preferred guests with this invention use the SIE architecture to allow such logical CPUs to handle their own I/O operations and related I/O interruptions without host intervention (herein sometimes called I/O pass-through). Under prior SIE architecture, the dispatch of a logical CPU was ended (called SIE interception) by any event that could not be handled by the SIE operation for that guest. For V=V guests, this included I/O start instructions and I/O interrupt signals; the host control program then handled the special instructions as interception events, and the I/O interrupts. The V=V guests could not handle their own I/O interrupts for a number of reasons, such as not being able to distinguish their own I/O interrupts from the I/O interrupts of other guests and the host. The V=V guests are not provided with the required channel relocation addresses or the required identification of their own I/O interrupts.

A prior SIE assist provided that the single V=R preferred guest in the system could issue a subset of I/O subchannel instructions and do its own I/O handling, since the V=R guest must be located at main storage origin 0, occupies contiguous real storage from there, and does not do any MS relocation for its guest absolute addresses. In this invention, any V=F guest must have relocation of its guest absolute addresses because the V=F guest cannot be at absolute address zero. By providing separate partitions for the plural preferred guests, they can not compromise each others integrity.

In this invention, an I/O interrupt is owned by the guest that is assigned the I/O subchannel providing the I/O interruption. No SIE termination is caused to V=F guests handling their own I/O interrupts. Each preferred guest handles its own I/O interrupts on whichever real CPU in an MP the zoned guest's logical CPU happens to be dispatched and enabled at the time of the I/O interrupt.

I/O pass-through is provided herein for plural preferred guests by enabling their logical CPUs to identify and handle their own I/O interrupts. A V=F guest can handle its own I/O interrupts much more efficiently than having the host handle I/O interrupts for the guest, which would require many additional operations.

Each logical CPU is defined to the system by a State Description (SD). An SD is a control block constructed in main storage for each respective guest to represent the logical CPU of that guest. Each guest's logical CPU is connected to a specified partition by placing in the guest's SD the assigned partition name, AZN, which through the partition definition set connects that guest to the system resources assigned to that partition name, i.e. a subset of MS, ES, CH, SCHs and channel paths to I/O devices.

A guest is dispatched for execution by the host assigning a real CPU to the logical CPU (i.e. SD) of the guest after the guest has at least one program task ready for execution. During a single "real CPU dispatch" of a logical CPU, the logical CPU may perform one or more dispatches of several different programming tasks. Real CPU dispatching is done by the host program issuing a start interpretive execution (SIE) instruction to a real CPU, which then loads certain parameters from the respective SD addressed by that instruction into registers in the assigned real CPU, which then is ready to start the first logical CPU dispatch of the guest-specified sequence of guest tasks.

The real CPU dispatch of a preferred guest's logical CPU may continue until terminated by any of predetermined conditions, which may include (1) the timeout of a guest time slice, or (2) having all tasks of a dispatched guest go into guest wait state, or (3) having the real CPU on which a guest is dispatched be alerted by a slumbering higher-priority guest that has become ready due to arrival of an I/O interrupt, which cause the host to dispatch the higher-priority guest on this CPU which then handles its I/O interrupt and may continue executing.

The ready state of a guest's tasks is usually controlled by the I/O operations requested by that guest. For example, any executing guest task may issue a start subchannel instruction, which may cause that program to go into the well-known I/O wait state due to waiting for the I/O response, and I/O is slow relative to CPU operations.

The guest logical CPU may (or may not) then give up its real CPU resource to end (or continue) its real dispatch, depending on whether the guest has not (or has) any other program task in a ready-to-execute state. If the guest has another program task in ready state, it then logically dispatches it to continue the guest's dispatch. When a guest has no program task in ready state, its real CPU dispatch ends; and the guest then goes into a slumber state, awaiting to be awakened when any of its program tasks changes to a ready state, which for example may be signalled by an I/O interrupt indicating the end of a requested I/O operation, which allows the host to put the guest into a ready state, and may alert any real CPU currently enabled for being alerted by the I/O interrupt of such guest. Then that slumbering guest may be dispatched on whichever CPU was alerted by its I/O interrupt. Also, some external interrupts may awake a slumbering guest, such as some timer interrupts.

The invention includes an alerting facility put into each real CPU, which enables and prioritizes the preferred guests to that CPU, so that an I/O interrupt of a preferred guest having a higher priority than the preferred guest currently executing on the CPU can alert the host to dispatch the higher priority guest and terminate execution for the CPU's current guest.

Accordingly, a slumbering preferred guest may be awakened by the CPU alerting facility when an I/O interruption arrives for the CPU to handle.

Independently of the alerting facility, host dispatching functions may seize control of a CPU when its guest goes into the wait state and may dispatch another guest. At this time, the host may enable (or disable) the CPU to notify (or not notify) it should an I/O interrupt arrive for the guest. If it does, it may (or may not), choose to give the CPU back to the original guest. This allows the host to enforce priorities and exercise sophisticated dispatching algorithms to maximize execution efficiency consistent with externally specified priorities.

One or more logical dispatches may be done within a single real dispatch of a guest's logical CPU. As soon as the guest's current task completes or goes into a wait state, the guest's logical CPU will dispatch another of its ready tasks, if it has any. If it has no ready task, the guest voluntarily ends its real dispatch, if it has not been ended by events external to the guest. All programs of a guest must be in a wait state for the guest to force itself to terminate its real dispatch.

External events causing a guest's real dispatch to be terminated include: the host assigning the real CPU to a higher priority guest which may result from an I/O interrupt for the higher priority guest, or completion of the time-out of a time-slice (given to the guest with each real CPU dispatch) when no earlier condition happens which ends the real dispatch.

Before any I/O interrupt is allowed to be accepted and handled by a preferred guest executing on any CPU, this invention requires an equal comparison between the AZN of the executing guest and the AZN of the subchannel having the I/O interrupt, so that the guest can only handle I/O interrupts of subchannels owned by that guest.

In order to obtain the above described type of operation, this invention modifies the subchannel hardware/microcode to enable each subchannel to store its assigned partition name, AZN, so that an I/O processor (the channel hardware) can use microcode to apply the MS zone origin address of the assigned partitions to compute the absolute MS address for all CCW (channel control word) addresses, IDAWs (indirect data address word) addresses and I/O data area addresses for the associated subchannel using the assigned zone name with each I/O interruption signal from any subchannel or I/O device. The invention can be superimposed on the floating channel concept described in U.S. Pat. No. 4,271,468 to N. T. Christensen et al and assigned to the same assignee as the subject invention. The floating channel concept provides an interrupt subchannel interface between plural subchannels and plural real CPUs in an MP to enable a program to be dispatched on a different CPU for handling an I/O interruption than the CPU which started the I/O operation that ended with the I/O interruption. Thus, the floating channel concept removed the prior relationship between the CPU starting an I/O operation and the CPU handling its resulting I/O interrupt.

A plurality of interrupt pending queues are provided in protected memory. When any started subchannel provides a pending interrupt, a pending-interrupt is put on a queue assigned to the subchannel by address chaining the interrupting subchannel into that queue. Each queue receives interrupts from one or more assigned subchannels. The assignment of a subchannel to an I/O interrupt queue is done by putting the ISC (interrupt subclass) number of the queue into the subchannel's control block.

U.S. Pat. No. 4,271,468 provides a pending register in the CPU memory-controller hardware which stores the pending state of each of the pending I/O interrupt queues. The pending register acts as an interface between the subchannel interrupts and the real CPUs to permit any CPU to service any interrupt queue, in accordance with a priority relationship among the interrupt queues. The bits in the pending register are associated with the respective subchannel queues to indicate the empty/non-empty state of pending interrupts for the respective queues. Any CPU can asynchronously test the bit states in the pending register to determine the highest priority queue currently having a pending interrupt, so that an interrupt handling program on any CPU can first service the pending interrupts on the highest-priority queue before that CPU, or another CPU, services interrupts on any other queue. The queues are referenced by their ISC numbers, the lower the ISC number, the higher is its I/O priority.

This floating channel concept is used in the IBM S/370XA architecture to enable logical CPUs to more efficiently be handled in a MP by enabling a logical CPU to be dispatched on the first available real CPU. In the prior S/370 architecture, a slumbering program task had to be redispatched on the same CPU which had started the I/O device providing an interrupt, in order to handle the I/O interrupt, regardless of whether another CPU was previously available. But, the S/370 XA floating channel concept enabled any available real CPU to be dispatched by a host program to handle all pending I/O interrupts regardless of which CPU in the system started the I/O device causing the interrupts.

This invention uses and modifies the subchannels I/O interrupt pending register (IPR) concept. The CPU hardware IPR is accessible only by the host of the system, as well as the hardware I/O interrupt queues associated with the respective interrupt subclasses in the host's IPR. But, different ones of the host owned queues are used by different preferred guests. Each preferred guest also has its own set of software supported I/O interrupt queues, which may be represented by a respective partition pending register. Any partition's set of software queues receives its pending I/O interrupts from the one or more host IPR queues assigned for use by the respective partition.

Normally, a preferred guest will handle its own I/O interrupts made available to it directly from the host IPR queues when the CPU and the guest are both enabled for selectively handling the I/O interrupt. The guest's software queues are only used if the guest is unable to handle its I/O interrupt from the host IPR queue, and then the host moves the pending interrupt from the host queue to a guest software queue assigned in the interrupting subchannel.

Accordingly, each subchannel has assignment fields that can assign the subchannel to a particular partition, and the I/O interruptions of that subchannel to a particular host queue and to a particular guest software queue. When any dispatched logical CPU of a guest requests to handle pending I/O interrupts, it is only permitted to look at subchannels having its own partition identification (AZN), and only to IPR queues assigned to the subchannel when the guest is enabled for I/O interruptions. An effective I/O interrupt enablement mask (EIEM) allows the CPU to only select the host queue(s) which is assigned to the respective guest. Thus, the logical CPU can only examine selected bits of the host pending register assigned for use by the respective guest to determine if any guest owned pending I/O interrupt(s) exist that need handling by the guests logical CPU.

The EIEM is generated when the guest is dispatched and the EIEM is a composite of the guests I/O interrupt enablement mask (GIEM) and the host's mask (HIEM) to control the guests use of the host I/O interrupt queues. A guest alerting mask (AZM) is also factored into the EIEM to control the guest's alerting capability.

When a start subchannel or other I/O instruction is issued by an S/370XA operating system preferred guest, the operation normally is passed through to the guest and executed without host intervention. However, the partition of the issuer will be checked by the host to be sure the addressed subchannel is part of the preferred guest's definition in the partition resource table.

I/O interruptions carry the name of the partition that started the I/O operation whose termination is causing the interruption. All pending interruptions are queued by partition so that the system can present them directly to the proper preferred guest. Each preferred guest has full use of the XA architecture facilities (as modified herein) within its partition definition. If an I/O interruption occurs for a preferred guest currently active on one or more CPUs, the I/O interruption will be passed through to the preferred guest's programming system (e.g. operating system) using the resources of that preferred guest if the state of that programming system allows such interruption under the XA architecture rules. If not, the I/O interruption will remain pending until the related preferred guest is later enabled for I/O interruption. Should the preferred guest owning the I/O interruption not be currently dispatched on any processor, the I/O interruption will remain pending on the guest's software queue until the guest is alerted and dispatched. Then, interruption can be handled by the programming system of the preferred guest just as if the interruption had just occurred while the guest was dispatched.

The alerting facility of this invention enables a preferred guest not currently dispatched to handle its I/O interruptions that have become pending. The guest currently using each CPU in the system has an EIEM that selectively specifies the preferred guests for which it can be alerted for. The alert signals the host to control the dispatching of the preferred guests on CPUs of the system receiving I/O interrupts enabled by their EIEMs. For example, a low-priority guest may be dispatched on a CPU during the idle or wait periods of a higher-priority preferred guest, and alerting the higher-priority preferred guest to be redispatched on that CPU as soon as the latter has an I/O interruption occur. When an alert occurs, the I/O interruption is not cleared, but remains pending until its preferred guest is dispatched on a CPU.

The alerting facility requires that the I/O interrupts with their zone identifiers be broadcast from the I/O processor generating an I/O interrupt to every CPU having an alerting facility. The CPUs receiving the broadcast of an I/O interrupt will use their EIEMs to detect the received preferred guest's AZN of the I/O interrupt for each enabled AZN in its EIEM. If a match is found, an alerting signal with the preferred guest AZN of the I/O interrupt is passed to the host, which may then dispatch the alerted preferred guest on that CPU.

This invention supports control over the real CPU resources in the system by allowing logical CPU priority control in the dispatching of the real CPU resources of the system. This is done by assigning different priorities to the partitions of the guests (e.g. plural operating systems). The dispatching priority may be represented by: (1) the AZNs themselves by having the order or value of the AZNs indicate their relative dispatching priority in the alert enablement masks, or (2) by providing a separate priority value associated with each AZN. The partition priority values may be stored in the guest's State Descriptions (SDs) constructed to represent the logical CPUs of the respective guests to indicate the dispatching priority for each logical CPU. For example, this may be done by placing in the SD a dispatching priority field containing a priority number. The dispatching priority associated with the assigned AZN is also contained in that SD to indicate its assigned subset of system resources. The relative dispatching priority of the guest to other guests also may be indicated in the hosts I/O interrupt enablement mask (HIEM) by providing therein a sequence of bits in the guest dispatching priority order. This manner of guest priority supports the host dispatching of any enabled guest having an I/O interruption. Each subchannel has a pass-through field which is controlled to enable executing preferred guests to handle their own I/O interrupts without terminating their dispatch on a real CPU.

Hence, an association is made by this invention between each guest, its assigned system resources, and its I/O interrupt signals resulting from the I/O devices started by that guest. The real dispatching of a logical CPU on any real CPU in the system is controlled by the dispatching priorities assigned to the guests (e.g. the different operating systems). When an I/O interrupt signal occurs, it can be sensed by the host for controlling the dispatching of guests on the real CPUs. It may be used by the host to terminate the I/O wait state for a slumbering guest (i.e. not currently dispatched) upon being alerted by an I/O interrupt for a slumberous guest. The host compares the dispatching priority associated with the partitions assigned to each I/O interrupt signal with the dispatching priorities of all guests ready for being dispatched, except for guest(s) solely assigned to another real CPU which may be called a "dedicated guest(s)". A guest selected for replacement on a real CPU will generally be a guest with a lower dispatching priority than the I/O interrupting guest, although the host could select any guest for dispatching replacement.

Hence, guests with high dispatching priority will get faster execution on the system than guests with low priority. The priority dispatching termination can be combined with time-slice dispatching termination and I/O wait state termination (whichever happens first during a guest's dispatch) to assure that guests will get reasonable execution service on the system when they are ready for execution.

With this invention, the host can be wholly or partly in software, in microcode and/or in hardware. The microcode and/or hardware implementation provides the unique advantage that the current dispatch of a guest programming system need not be terminated (intercepted) for host operation, when an I/O interrupt is pending and a host determination is needed regarding whether a current guest dispatch should continue. Each CPU contains the microcode/hardware required for the host to examine and respond to alerting signals caused by pending I/O interrupt signals without disturbing the execution of the current guest until any replacement guest is dispatched on the CPU.

With the software hosts in the prior art, a guest dispatch is disturbed by terminating (intercepting) it when the host software senses the existence of a pending I/O interrupt and responds by dispatching the host program on that CPU to examine the interrupt and determine the next course of operation.

Within this invention, coordination control may be done among the I/O interrupt enablement mask fields in the CPUs of the system to uniquely represent the alertable partitions among the CPUs in the system. When a preferred guest is dispatched on any CPU in the system, the alerting enablement field for that guest may be set off in all other CPUs in the system, so that only the CPU of that dispatched guest will be enabled to receive the I/O interrupts of the dispatched guest. This prevents any ambiguity among the CPUs in a system as to which CPU is to handle an I/O interrupt, when the zone of the interrupt is presently executing on one of the CPUs, i.e. it is not slumbering.

Each of the CPUs continuously senses for the occurrence of any I/O interrupt having its alerting mask field set on in the CPU's enablement mask register. Thus, when each CPU's host microcode/hardware examines the I/O pending register contents to determine if any pending I/O interrupt exists on any pending I/O interrupt queue that matches the currently executing partition for that CPU. When one or more pending I/O interrupts of an enabled partition are found to exist, the interrupt(s) is examined to determine if any such I/O interrupt is for the currently dispatched guest, or for a higher priority guest.

If any pending I/O interrupt exists for any partition of lower priority, the current dispatch is not disturbed on the respective CPU, and the I/O interrupt(s) remains pending on its queue unless accepted by another CPU. If any pending I/O interrupt is found for the current partition, the current dispatch handles and clears the interrupt, and may continue. If any pending I/O interrupt is found for any slumbering guest of higher priority, the current dispatch is terminated on that CPU and the slumbering guest having the higher priority is dispatched on that CPU, which handles and clears the I/O interrupts(s) for its respective partition, and may continue for executing any ready work it has.

The expanded store (ES) is an electronic access memory separate from main storage (MS) and is used under program control to receive page units of data from MS when the operating system needs to free space in MS. When pages of data are stored in ES, they can be moved back into MS whenever the data is again needed for execution. This type of operation is often called "page swapping". DASD has been used for page swapping, but its electromechanical operation does not have the speed of ES which is entirely electronic. The largest of the currently marketed IBM large systems have ES. For systems using this invention that do not have ES, the partition specification in the resource definition table does not specify any ES parameter, or specifies it as zero. Also, if a system operates with ES, but does not wish to include ES in a partition, the resource definition table can specify zero ES for that partition.

System integrity is enhanced by having the above defined partition concept also apply to the ES resource, as well as the MS and subchannel resources, to provide partition protection to each of these resources.

Thus, in the partition resource definition table, each partition may be specified with respective MS and ES base and limit values by their absolute addresses. The MS base and limit values need have no numerical relationship to the ES base and limit values.

With this invention, each respective preferred guest's logical CPU is restricted to only operating within its own partition. Any guest that attempts any operation outside of its specified partition will cause a program specification interrupt on its real CPU, as if the requested resource were not in the system. The interrupt causes the host to intervene and it may stop operation of that guest and may terminate that guest's dispatch and dispatch another guest's logical CPU on that real CPU. Thus, a specification interrupt is another condition (in addition to those designated above) that can terminate a guest's real CPU dispatch.

However, the partition specifications for any preferred guest can be made to partly or wholly overlap with the partition specification of another guest, e.g. in their MS or ES areas or have one or more subchannels in common. A partial overlap enables communication between the overlapping guests through their common resources. For example, two guests may have a partial overlap in their MS specification, and then they can communicate with each other in their common MS area. If their partition specifications wholly are the same, then both guests wholly share the same resources, and they must have the programming support that prevents interference between themselves, such as time slicing.

Some of the objects and features of this invention are:

1. This invention enables the flexible partitioning of the hardware resources in a closely-coupled data processing system among plural partitions which are logically associated with and controlled by use of a unique name or identifier.

2. The partition name for the resources in any single partition is used to assign the partitioned set of system resources to a programming system, e.g. an operating system. Then the entire operation for that programming system is solely within its assigned partition, and the partition name then becomes the name for that programming system.

3. The system resources in each identified partition are easily specified and easily changed. An identified partition provides a set of system resources handled as a unit for a program to be dispatched.

4. Each of the hardware resources in the system, including definable portions of any resource component, can be tagged with one or more partition names, e.g. blocks within MS. A single partition name for a resource assigns it to one partition; and plural partition names for a resource assigns it in common to each of the named partitions.

5. The system hardware resources which may be assigned one or more partition names are blocks of storage in main storage, CPUs, page frames in expanded storage, I/O channels, and I/O subchannels. One partition name may be reserved for a host having global use of all resources in the system, and it may use resources in common with all partitions. If a CPU is assigned one or more partition names, the CPU is useable only with those partitions, e.g. dedicated CPU. Generally, CPUs will not be assigned to any partition to allow any partition to be dispatched on any CPU.

6. When a programming system is assigned to run on the resources in a partition, it runs as a "preferred guest". The assigned partition name then becomes the "preferred guest's identifier". The resource control operations of the invention then will use that identifier to exclude the preferred guest from using any resource in the system not comprehended within the set of resources defined for its assigned partition.

7. The invention requires that before any guest can use the system, that all of the guest's real and absolute addresses be changed to relocate them within the guest's assigned partition. This may be done for guest MS absolute or real addresses by adding them to the partition's MS origin absolute address and by checking the resulting address against the partition's limit absolute address.

8. The invention allows any CPU in a system (where the CPUs are not assigned to any partition) to be dispatched by a host entity to any preferred guest in the system as determined by the host. The host entity may be embodied in software, microcode, hardware or a combination of some or all of them.

9. The invention prevents the dispatching of a CPU (where the CPU is assigned to one or more partitions) to any partition to which the CPU is not assigned.

10. The invention stores the partition identifier into each subchannel (SCH). The partition identifier may be retained in the SCH control block, and it is provided with each pending I/O interrupt. The provided identifier is used by the system for determining which preferred guest in the system will handle the I/O interrupt and which real CPU will perform an alerting operation that signals the host entity to dispatch the guest which can handle the I/O interrupt when that guest is not then dispatched on any real CPU.

11. The S/370XA interrupt pending register in each CPU is used for communicating the existence of pending I/O subchannel interrupts.

12. The I/O interrupt subclass bit positions in the S/370XA interrupt pending register in each CPU may be assigned to different partitions in the system to communicate the pending interrupt state of I/O subchannels for respective partitions in the system.

13. The invention enables a guest currently dispatched on a CPU in the system to handle each I/O interrupt from a subchannel having the partition identifier of the guest.

14. The invention can enable a CPU to alert a host dispatching entity by receiving an I/O interrupt signal having a partition identifier that identifies which guest must handle the I/O interrupt. The host entity receives the alert signal and determines the dispatching priority of the I/O interrupting guest in relation to other guests currently executing on the CPUs in the system. The host may then replace an executing guest with the I/O interrupting guest on the CPU, in which case the replaced guest will generally have lower priority than the I/O interrupting guest.

15. The invention enables the host entity (when dispatching a preferred guest) to disable only for that guest the alerting function in the other CPUs in the system, so that I/O interrupts for the preferred guest will be handled only by the one CPU on which the preferred guest is executing.

16. This invention enables I/O interrupts to be handled on any CPU currently executing a preferred guest, regardless of which CPU was executing the preferred guest at the time it started the I/O device causing the interrupt.

17. The host may terminate the dispatch of an executing guest on a CPU receiving an I/O interrupt if the guest associated with the I/O interrupt has a higher dispatching priority than the executing guest.

18. When the host is alerted to an I/O interrupt, it need not stop execution by any guest dispatched on any CPU in the system when the dispatching priority of the partition associated with a received I/O interrupt is lower than the dispatching priority of the currently dispatched guest.

19. The host generally selects the particular CPU on which a preferred guest is currently dispatched to handle an I/O interrupt from an I/O device started by that guest, so that the execution on any other CPU in the system is not disturbed by that I/O interrupt.

20. The alerting of a slumbering guest (i.e. not executing on any CPU) is done by any CPU enabled for handling the alerts of the slumbering guest.

21. A slumbering guest uses its I/O interrupts to alert a CPU that is enabled for being alerted by the slumbering guest.

22. A plurality of CPU's may be enabled for alerting the host that a particular preferred guest has provided an I/O interrupt. Then the host determines the dispatching priority of the interrupting guest for selecting a CPU and dispatching the interrupting guest, which may be a different CPU than the CPU generating the alert signal, or the CPU on which the guest issued a start subchannel (SSCH) instruction that started the I/O device from which the I/O interrupt occurred that caused the alerting of the guest.

23. When plural CPUs are enabled to alert a guest, any of such CPUs may be a candidate for the dispatch of the slumbering guest causing the I/O interrupt.

24. When any guest that is executing on any CPU goes into the wait state, the host may dispatch another guest on the idle CPU in response to any alert signal, or without waiting for any alert signal.

25. An MP guest may execute on a single CPU, and the logical CPU's on which MP guests are running need not be dispatched to real CPU's at the same time.

The foregoing features and advantages of the preferred embodiments of the subject invention will be described in the accompany drawings.

BRIEF DESCRIPTION OF THE DRAWINGS

FIG. 1 illustrates primary parts of the system containing the embodiment of the invention.

FIG. 2 is an example of the contents of system storage used for defining the partitions and I/O queues used by the system host and its guests.

FIG. 3A is an example of modifications to a state descriptor (SD) used to represent preferred guests in the embodiment of the invention.

FIG. 3B illustrates relevant parts in each of the plura CPUs found in the preferred embodiment of this invention.

FIG. 6 illustrates the form of addresses used in the relocation process of the illustrated embodiment for main storage (MS) and expanded storage (ES).

FIGS. 7A, 7B and 7C represent the CPU address translation process for obtaining zone relocation for original guest MS addresses into assigned MS zones in the embodiment.

FIG. 10 represents a circuit arrangement for obtaining the encoding of an effective I/O interruption enablement mask (EIEM) used in this embodiment.

FIGS. 11A and 11B represent the CPU dispatching process for starting a preferred guest under the S/370XA start interpretive execution (SIE) instruction in the embodiment.

FIG. 12A represents the process used in the embodiment to relate I/O device interruption signals to subchannels, to assigned zones and to host I/O interrupt queues.

FIG. 12B represents an example of copies of a subset of subchannels and a set of I/O interruption queues assigned to any preferred guest in the embodiment.

FIG. 13 illustrates a CPU process for executing instructions under the SIE instruction for supporting I/O interruption pass-through to preferred guests and alert dispatching for preferred guests in the embodiment.

FIG. 14B shows a process for controlling the pass-through of I/O interruptions to preferred guests in the embodiment.

FIG. 15A represents guest interception-code detection by the host intervening in guest processing to have the host process I/O interrupt related events that may intercept the CPU processing by a guest in the embodiment.

FIG. 15E represents a host intervention process for a guest attempted TPI or TSCH (test subchannel) instruction in which the guest is selectively disabled for I/O interruption.

FIG. 15F represents a host intervention process for a guest attempted TPI or TSCH (test subchannel) instruction in which the subchannel pass through state is off for a guest having an I/O interruption.

FIG. 15G represents a host intervention process for a guest executed LCTL (load control) instruction in which the guest changed its selective I/O interruption enablement mask in a control register to disable itself from handling an I/O interruption.

FIG. 15H represents a host intervention process in the embodiment for handling a guest alert interception that signals the host to make ready for dispatching on the CPU each currently alertable guest having a pending I/O interruption.

Figures 4, 5:
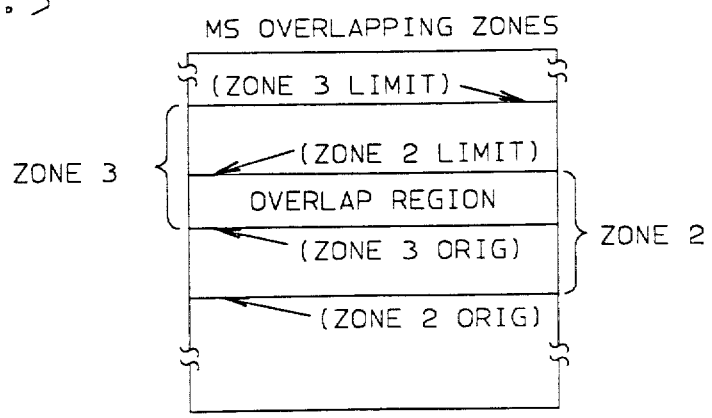
FIG. 4 illustrates relevant parts in each of the plural subchannels found in the preferred embodiment of this invention.
FIG. 5 represents overlapping zones in the main storage of a system having this invention.

The reference numbers in the drawings are made unique in each drawing by being prefixed with the figure number. For example, in FIG. 16 the item shown as 11 is referenced as 16-11, while in FIG. 17 the item shown as 11 is referenced as 17-11.

DETAILED DESCRIPTION OF THE EMBODIMENT

FIG. 1:

An overall system containing the invention is represented in FIG. 1. It is an MP having CPUs 1 through K, some or all of which contain features of the invention. The invention also may be utilized in an UP, which is represented in FIG. 1 when the only CPU in the system is CPU 1.

Each CPU utilizing this invention contains microcode 11 which is designed according to features of this invention and which operates as a subset of the conventional microcode in the CPU. Since the microcode will be contained in each CPU, it will not be shared among the CPUs.

Software system program control is also available which is part of a host program and resides in a main storage 12 and in direct access storage devices (DASD) 13.

In FIG. 1, the main storage (MS) 12 is divided up logically by absolute address assignment into a plurality of zones 0 through N, of which zone 0 comprises all of MS, and the other zones are shown in mutually exclusive areas, except for overlapping zone 0. Zone 0 is assigned to the host hypervisor program, which resides in a zone 0 area exclusive to zone 0, so that only the host (and no guest) can have access to the host control program. The zones 0 through N are respectively assigned to system resource partitions 0 through N.

An expanded storage (ES) 14 is optionally provided in the system to support the operation of programs which require ES page storage support. The partition for any zone in MS may have a corresponding zone in ES, but a corresponding ES zone is not required if ES is not used by any program operating in the corresponding MS zone.

A plurality of subchannels (SCHs) are provided to support respective I/O devices (not shown) in the system. The SCHs are assigned SCH numbers A through Z. The subchannels are assigned to the host and to the partitions in the system in any order. Subsets of I/O devices assigned to the subchannels may be exclusively used by one partition or may be exclusive to the host. But some or all I/O devices may be shared by two or more partitions. Each partition is shown connected by dashed lines in FIG. 1 as having an exclusive SA area which contains the subchannels assigned to the respective zone. All subchannels are automatically assigned to the host in zone 0 even though they are assigned to zones 1–N. The partitions 1, 2 and 3 represent V=F preferred guests. Partition 4 represents a V=R preferred guest having its MS zone start at absolute address zero. It will be noted in the example of FIG. 1, that partition 4 is assigned only an MS zone and is not assigned any ES zone or any subchannels.

The system memory hardware that contains MS may also contain a system area (SA), which is not addressable by guest programs in the system, but is addressable by the microcode and by the host control program.

In a host storage area not assigned to any of zones 1–N are "partition definition sets" and a "zone pointer table" which are shown in more detail in FIG. 2.

FIG. 2:

Partition definition sets 1 through N are shown in FIG. 2 in a part of the host storage. Each partition definition set is comprised of a plurality of entries which contain information defining a subset of system resources that together define a respective partition of the system. Any program assigned to operate in any of partitions 1-N is restricted to using only the system resources defined in its respective partition definition set.

Entries in each partition definition set contain:

a. The boundary absolute addresses for a contiguous zone in MS that is assigned to the associated partition, which includes an MS origin address, and an MS limit address.

b. The boundary absolute addresses for a contiguous zone in ES that is assigned to the associated partition, which includes an ES origin page number, and an ES limit page number.

c. The number of guest CPU's dispatchable for work requested by programs operating within the associated partition.

d. The number of guest vector processors dispatchable for work requested by programs operating within the associated partition.

e. The percent share of system CPU resources that the respective programs operating within the partition can use when contention for CPU resources exists with another partition.

f. The addresses in MS of SIE state descriptors (SDs) that represent the respective guest OS programs that may operate within the partition and are limited to using the resources within the partition. The guest OS operating within a respective partition controls the dispatching of work done by programs operating under the OS within the associated partition.

g. The subchannels (SCHs) owned by the respective partition.

The zone pointer table contains a plurality of entries, each of which has a zone identifier (ID) and a pointer (i.e. address) that locates an associated partition definition set which defines the respectively identified zone. Thus, the identifier of any of zones 1-N can access its respective partition definition set through the zone pointer table by a lookup of the zone ID therein. Only the host program assigned to zone 0 is able to access any entry in the zone pointer table and can thereby gain access to any partition in the system. Accordingly, each zone ID is actually a "partition identifier" because it identifies the entire partition of system resources associated with an identified zone number and with a respective zone in MS and ES.

Host I/O interrupt subclasses (HISCs) correspond to queues Q0 up to QM. The HISCs are considered hardware queues because they are not accessible to any guests.

HISC queue 0 is assigned only for the use of the host of the system, and the other HISC queues 1 through M are respectively assigned for the use of up to M respective guests in the embodiment. Each host HISC queue is assigned to a guest having a queue number the same as the guest's assigned zone ID number AZN in the embodiment. Any host HISC queue assigned to a guest cannot be used by any other guest in this embodiment.

Each of the N partitions in the system has its set of guest I/O interrupt subclasses (GISCs); each zone ID is assigned its unique set of GISCs having its own I/O interrupt queues numbered 0 up to 31 provided in the host storage area. Each active partition may use any one or more of its guest queues and need not use all 32 of its queues.

Each guest also has a 32 bit position GIPR (guest I/O interrupt pending register) representation in storage. Each GIPR bit position corresponds to a respective one of the guest's queues, Q0-Q31. Each bit position respectively represents whether or not an I/O interrupt is pending on the correspondingly numbered guest queue.

Also in the host storage area there is provided an "active CPU list for MP" which indicates the identifiers of CPUs that are currently operating in the system. There are numerous other conventional entries in the host storage area that are not essential to this invention, regarding which their description would distract the learning process of the reader from the subject invention.

FIG. 3A:

The start interpretive execution (SIE) instruction in the IBM S/370 or S/370 XA architecture is used to dispatch a virtual (or logical) CPU within a real UP or MP system. The logical CPU is represented by a state descriptor (SD) which is the only operand of the SIE instruction. The SIE instruction and its SD are in the prior art to this invention, and therefore only the fields in the SD which are important to the definition of features found in this invention are represented in FIG. 3A.

Each SD represents a different logical CPU of a guest. Accordingly each SD represents a logical CPU of a guest.

This invention provides a new type of SIE controlled guest, called a "preferred guest" or a "V=F guest". Preferred guests can be provided in a system along with the prior types of SIE controlled guests, called V=V guests and one V=R guest.

One and only one V=R guest was allowed by the prior SIE controlled systems, because of the absolute addressing mapping constraints existing in such prior systems.

In this invention, a preferred guest is assigned one of the zone identifiers of partitions 1-N by placing the assigned zone identifier in the zone identifier table in FIG. 2 and in an active zone number (AZN) field in the SD of each logical CPU of the guest in FIG. 3A. Each zone identifier may be assigned to a plurality of SDs that will use the resources in one system partition for this set of guest CPUs. Also, multiple SDs assigned the same zone identifier may time share a real CPU.

The host program provides system control over all of its guests. Initially all resources in the system are assigned to zone 0 until they a reassigned to one of the zones 1-N, and its resources are taken from zone 0. The host allows the reassignment of resources between the host and any preferred guest dynamically after any preferred guest has been created, as long as a resource is not needed exclusively by the host, such as the part of MS where the host program must reside.

A human system operator controls the assignment of system resources to the partitions as well as the assignment of a programming system to any partition, such as assigning an operating system like the IBM MVS/370 or MVS/370XA programming system that may operate with real or virtual addressing.

The host program uses the host dispatching function to select one of the real CPUs 1-K in the system, and the host dispatches one of the guest's logical CPUs in the system on the selected CPU. A logical CPU may be dispatched on one CPU at one time; and the same logical CPU may be dispatched on another CPU at another time, generally depending on which CPU becomes available at the time a guest is ready for being dispatched.

However, a real CPU may be dedicated to one logical CPU.

Once a particular programming system is assigned to any SD, it will continue to operate with that particular programming system until that SD is destroyed or has its fields totally reinitialized to another programming system. Interruptions and interceptions to the operation of the guest CPU of that SD will not affect its assignment to the programming system, since on each interception the SD will store all necessary addresses to its programming system to assure its continued operation. Then subsequent execution of the SIE instruction after its interception will redispatch the guest and its previously assigned programming system.

The operation of a guest in an assigned partition with its initialized programming system under a SIE instruction is controlled by circuits, microcode and software provided by this invention, and by the prior art. This invention limits the operation of any preferred guest (including all of its programming operations) to the resources defined in the associated zone definition set identified by the zone identifier assigned to the guest in the guest's SD field, which is the AZN (active zone number) shown in FIG. 3A.

The SIE instruction issued for a guest is considered to be executing for the guest (which includes the continuous operation of its initialized programming system and of all system and application programming tasks operating under that programming system), until the occurrence of any of a plurality of events, any one of which will terminate the SIE instruction execution for that guest. The termination of the SIE execution, which may be temporary, is called "SIE interception". Upon the occurrence of a SIE interception event, the real CPU (upon which the SIE instruction has been executing its associated logical CPU) is released from that SIE instruction so that the CPU can be reassigned (redispatched) by the host issuing another SIE instruction for another guest SD to load the CPU with the parameters of another logical CPU. Examples of some SIE interception events are: I/O interruptions, I/O instructions, external requests, I/O requests, CPU wait state, validity exceptions, and operations exceptions.

This invention allows longer SIE execution without an interception, than what would have occurred under some of the prior SIE implementations.

A primary source of SIE interception has been I/O interrupts, which have previously been handled mostly by the host redispatching to simulate I/O interruption handling for all guests, although previously direct I/O interruption handling has been allowed by V=R guests. This invention extends direct I/O interruption handling to the new V=F guests provided by this invention.

"I/O pass-through" is a term sometimes used to mean that I/O interrupt handling may be passed through to a guest for handling, instead of being handled by the host. The pass-through guest is the guest which started an I/O operation and handles the resulting I/O interrupts. A pass-through enablement bit P is provided in each subchannel to indicate whether pass-through is currenty enabled or not.

The fields in the SD in FIG. 3 include the following:

a. A "guest MS origin" field which provides the absolute address in MS for the guest origin (i.e., where the guest's absolute address zero is located). The guest MS origin is automatically relocated into any zone assigned to the guest.

b. A "guest MS extent" field which provides the maximum size of contiguous MS that can be used by the guest. This invention automatically maintains this extent within the zone assigned to the guest.

c. An "assigned zone number" (AZN) field which indicates the zone identifier of the partition assigned to the guest represented by this SD.

d. An "interruption area" field which has data related to any interruption of the operation of this logical CPU, and can receive parameters regarding interruption events.

e. A "SQ" field is set on to indicate when any guest software queue, Q1-Q31, has a pending I/O interrupt.

f. A "D bit" field which is set on whenever the guest is disabled from handling I/O interruptions.

g. An "interception area" which has data relating to the interception of the operation of this guest CPU to terminate its SIE operation, and call a responding host operation.

h. An "I code" field which receives an intercept code which has a value that indicates the condition causing the current interception. The host responds with some type of operation.

i. An "alerting zone mask" (AZM) field that indicates which other zoned guest(s) can have their I/O interruptions alert the host. The bit positions set on in this AZM select which other AZNs are enabled for an alerting operation while the guest of this SD is dispatched. Alerting occurs for an enabled other AZN when it has an I/O interrupt. Upon this CPU being alerted, the "AZN of current alert" field in this SD indicates the AZN of the alerting interrupt, which intercepts this guest to permit the host to determine if it will dispatch that other guest on the real CPU on which the current guest is running.

j. A "zone mode" field that may be a single bit that indicates whether this SD represents a preferred guest or a preexisting type guest.

k. An "execution control area" (ECA) field which contains different mode state bits that control operation under the SIE instruction that issued this SD.

l. An "alerting mode" field that may be a single bit which indicates whether the alerting feature of the invention is on or off for this virtual CPU.

m. A "AZN of current alert" field that indicates the zone ID of another preferred guest causing a current alert signal on this CPU which must be interpreted by the host for making the alerted guest ready for dispatching.

n. A "XA or 370" field indicates whether the CPU (on which this guest is to operate) must use S/370XA or S/370 architecture.

o. A "guest program status word" (GPSW) field which contains the PSW initialized, or saved after the last interruption of this logical CPU to determine the next instruction the guest will execute.

p. A "guest I/O interruption enable mask" (GIEM) field that indicates the enablement by the logical CPU of the guest I/O interruption subclasses under the S/370XA floating channel architecture i.e. CR6, or under the S/370 channel architecture i.e. CR2.

FIG. 3B:

A real CPU is represented in FIG. 3B, as opposed to a logical (i.e. virtual) CPU represented by the SD in FIG. 3A. The illustrated fields in FIG. 3B are the fields important to the definition of different features of the invention that are found in the CPU registers, circuit arrays, local store, and microcode in a real CPU. The illustrated CPU fields are:

a. A cache, general purpose registers (GRs), and translation lookaside buffers (TLBs), all of which are conventional fields in large CPUs that are used for controlling data transfers between the CPU and storage (MS and ES).

b. An "AZN" field which receives the content of the AZN field in the SD currently dispatched on the real CPU.

c. A "host current PSW" (HPSW) addresses the next instruction to be executed by the host when the host is executing on this CPU, or when the host is next dispatched but is not currently executing on the CPU. An important bit in the HPSW is in its bit position 6 which if in a zero state disables the host on this CPU from handling any I/O interrupt; but if bit position 6 of the HPSW is in a one state, it enables this CPU for handling any I/O interrupt for which selective enablement exists in the host CR6 I/O enablement mask for the S/370XA architecture mode, or in the host CR2 I/O enablement mask for the S/370 architecture mode.

d. A "guest current PSW" (GPSW) addresses the next instruction to be executed by the guest when the guest is executing on this CPU. An important bit in the GPSW is in its bit position 6 which if in a zero state disables the guest on this CPU from handling any I/O interrupt; but if bit position 6 of the GPSW is in a one state, it enables this CPU for handling any I/O interrupt for which selective enablement exists in the guest CR6 I/O enablement mask for the S/370XA architecture mode, or in the guest CR2 I/O enablement mask for the S/370 architecture mode.

e. An "alerting zone mask" (AZM) that indicates the alert enablement of this CPU for the alerting the host upon an I/O interruption by any of the other zones enabled in this alerting mask. The AZM is obtained from the SD of the guest currently dispatched on this CPU.

f. A "zone MS origin AA" is the main storage (MS) origin absolute address (AA) that defines where a contiguous MS region begins in the partition assigned to the guest currently dispatched on the CPU.

g. A "zone MS limit AA" is the main storage (MS) limit absolute address (AA) that defines where a contiguous MS region ends in the partition assigned to the guest currently dispatched on the CPU.

h. A "zone ES origin PN" is the expanded storage (ES) origin page number (PN) that defines where a contiguous ES region begins in the partition assigned to the guest currently dispatched on the CPU.

i. A "zone ES limit PN" is the expanded storage (ES) page number (PN) that defines where a contiguous ES region ends in the partition assigned to the guest currently dispatched on the CPU.

j. An "emulation mode" field that may be a single bit which indicates whether the CPU is in emulation mode or not. The CPU is put in emulation mode by executing the SIE instruction and continues while any guest is executing on this CPU.

k. A "zone mode" field that may be a single bit that indicates whether the CPU represents a preferred guest or a guest of the preexisting type.

l. An "alerting mode" field that may be a single bit which indicates whether the alerting feature of the invention is on or off for the CPU.

m. An "ISC pending reg" (IPR) is the I/O interruption subclass pending register in the CPU provided under the S/370XA architecture. The bit positions 0–M in the IPR correspond to respective respective I/O interrupt subclasses, ISCs, that correspond to hardware I/O interrupt queues, Q0 up to QM, maintained for the host by the I/O processor. ISC bit position 0 is assigned to the host, and any bit position from 1 up to M in the IPR may be assigned to any preferred guest corresponding to the guest's AZN in the described embodiment.

The lower the bit position in the IPR, the higher is the CPU handling priority for the corresponding queue. An IPR bit position, i.e. ISC, is set to a one state by the I/O processor when the respective I/O queue has a pending I/O interruption. A zero state for an IPR bit position indicates the corresponding queue does not have any pending I/O interrupt.

n. An "effective I/O interrupt enabling mask" (EIEM) which is contained in CPU control register 6 (GCR6). This mask is constructed in a manner described later herein for the preferred embodiment. The bit positions 0–M in this mask enable/disable the CPU to handle I/O interrupts indicated as existing by corresponding bit positions 0–M in the IPR. A one bit mask state in a respective mask bit position enables I/O handling by the CPU of pending interrupts in the corresponding I/O interrupt queue, and a zero bit mask state for the respective mask bit position disables the CPU from handling any I/O interrupt pending in the corresponding queue.

o. A set of "guest control registers" GCRs 0–15 which are like the control registers CRs 0–15 defined in the S/370XA or S/370 architecture.

p. A set of "host control registers" HCRs 0–15 which are like the control registers CRs 0–15 defined in the S/370XA or S/370 architecture.

FIG. 4:

A S/370XA subchannel (SCH) is represented by the SCH control block shown in FIG. 4, which shows fields important to features described herein for the subject invention. Prior used fields in the subchannel are described in prior publications of the S/370XA architecture.

A SCH control block is provided for each I/O device in the system. Where an I/O device can be reached by switching between more than one hardware connection path to a device, such as through different channels, this invention provides a separate copy of the device's SCH control block representing its subchannels for each path.

A plurality of interruption subchannel subclasses are provided in the S/370XA architecture, and each subclass may correspond to a respective I/O interrupt queue. A subchannel control block is put onto a queue by being address chained into the queue by settng a pointer field in the subchannel control block to address the next subchannel block in the queue. A subchannel is removed from a queue by rechaining its prior subchannel block in the queue whereby the prior block changes its pointer to address the block following the block being removed, and setting invalid the pointer in the removed block.

The illustrated fields in each SCH control block include:

a. A "V" field and a "pointer" field, in which the former is a one bit field indicating the validity of pointer contents in the latter field.

b. A "host ISC #" (HISC) field content is assigned by the host to the subchannel. It contains the host's I/O interruption subclass number for indicating which of the host's I/O interruption queues will receive the I/O interruptions of this subchannel, i.e. this assignment identifies the host interruption queue into which this subchannel block will be chained upon its associated device causing an interruption signal.

c. A "guest ISC #" (GISC) field coneent is assigned by the guest to the subchannel. It contains the guest's I/O interruption subclass number for indicating which of the guest's I/O interruption queues will receive the I/O interruptions of this subchannel, i.e. this is the guest interruption queue into which this subchannel block will be chained before the guest is able to handle the interruption.

d. An "assigned AZN" field identifies the preferred guest assigned to use this subchannel. This field is basic to the operation of the invention, because it identifies the particular partition of the system to which the subchannel is assigned.

e. The "zone MS origin AA" field is set by copying the content of the zone MS origin AA field from the partition definition set for the assigned AZN.

f. The "zone MS lim AA" field is set by copying the content of the zone MS limit AA field from the partition definition set for the assigned AZN.

g. The "subchannel status word" (SCSW) field contains a large number of subfields in the S/370XA architecture that indicate various subchannel status conditions, which are read out at the time of executing certain I/O instructions, e.g. test subchannel or store subchannel.

h. The "subchannel (SCH)#" field is set to a number that uniquely represents the subchannel in the data processing system.

i. The "associated device #" field contains the system assigned number of the device represented by this subchannel.

j. The "channel #" field assigns up to eight designated channels to the subchannel to provide plural paths for data transfers between the MS zone in the assigned AZN partitions and the I/O device represented by the subchannel.

k. The "X" field is a single bit field set on to indicate when this subchannel has an I/O status pending.

l. The "P" field is a single bit field set on to indicate that a pending I/O interruption for this subchannel can be directly handled by the assigned guest, and allows guest I/O instructions to execute without host intervention. (i.e. passed through the host which will not handle the interrupt).

m. A "guest I/O interruption parameter word" field receives a value assigned by a S/370XA guest to contain the address of a guest control block, and by a S/370 guest to contain the 370 I/O address of the I/O device.

FIG. 5:

The MS zones assigned to the various partitions need not be mutually exclusive as shown in FIG. 1. Adjacent zones may be overlapping in their MS origin and/or limit address assignments, such as is represented by the overlap region for zones 2 and 3 shown in FIG. 5.

A reason for having overlapping MS zones is to provide a common communication area between the programming systems assigned to different partitions.

FIG. 6:

Special forms of the origin and limit addresses in MS and ES are provided for this embodiment as shown in FIG. 6. The MS address forms support the assignment of MS storage in 1 megabyte units using the 31 bit addressing found in the S/370XA architecture. The field at bit positions 1-11 represents the origin or limit address on 1 megabyte boundaries. The field at bit positions 12-31 is all zeros for the MS origin address, and is all ones for the MS limit address to represent the beginning and the end, respectively, of the first and last 1MB regions in an assigned MS zone.

The ES address forms support the assignment of ES storage in 1 page units (of 4096 bytes per page) using the 32 bit paging addresses found in the S/370XA architecture, in which the field at bit positions 0-23 represents the origin or limit address on 256 page boundaries. The field at bit positions 24-31 is all zeros for the ES origin address, and is all ones for the ES limit address to represent the beginning and the end, respectively, of the first and last 256 page units in an assigned MS zone.

FIG. 7A:

Guaranteed address relocation is an essential part of enabling independent operation by plural programming systems as guests in the plurality of respective partitions provided by this invention. Previously written, as well as newly written programming systems, must be runable in any partition of a system built according to this invention; and such programming system must be able to operate totally in an assigned partition within the constraints of the general architectures for which a machine is built using the principles of this invention. It is essential that any partition be able to accommodate an assigned prior programming system without requiring that such programming system be changed in any way.

Each guest programming system provides guest real addresses and any guest program may initially use either guest virtual or guest real addresses, which are the only addresses known to the guest. On the other hand, the partitioned system MS only recognizes MS absolute addresses, which are known to the host but are not known to the guest. Accordingly, all guest addresses must be reduced to a host absolute address form in order to access MS. Any guest-provided address will not be a host absolute address, and it must therefore be changed to relocate it into the guest's assigned MS zone of host absolute addresses at a relative address position therein which is equivalent to the location it would have had in a standalone system. Hence, the guest continues to use the same addresses that it used before being assigned to a partition; but unknown to the guest, every one of its addresses is being changed for relocation by this invention to a proper place in its assigned zone.

Each of the MS zones in the different partitions of the invention is assigned a contiguous expanse of host absolute addresses which may begin at any absolute address in MS. The different guest zones are usually assigned a different non-overlapping sequence of absolute addresses in MS as illustrated in FIG. 1. But an MS overlapping region may be provided in the assignment of the respective sequences of host absolute addresses between any adjacent zones in MS as illustrated in FIG. 5 for those partitions having programming systems requiring a common communication area in such overlapping region in MS.

Each partition has assigned to its zone a set of contiguous MS page frames, which begin at the host absolute address assigned in its "zone MS origin AA" field of its partition definition set. The zone ends at its "zone MS limit AA" field in its the partition definition set. FIG. 6 illustrates the form of these assigned absolute addresses.

The real and absolute addresses of guest CPU instructions and guest CPU instruction operands are relocated to the assigned zone of the guest using the host's segment and page tables.

However, the host's page tables for each guest are set up in a unique manner. After setup these tables operate in a conventional manner.

Figure 7C:
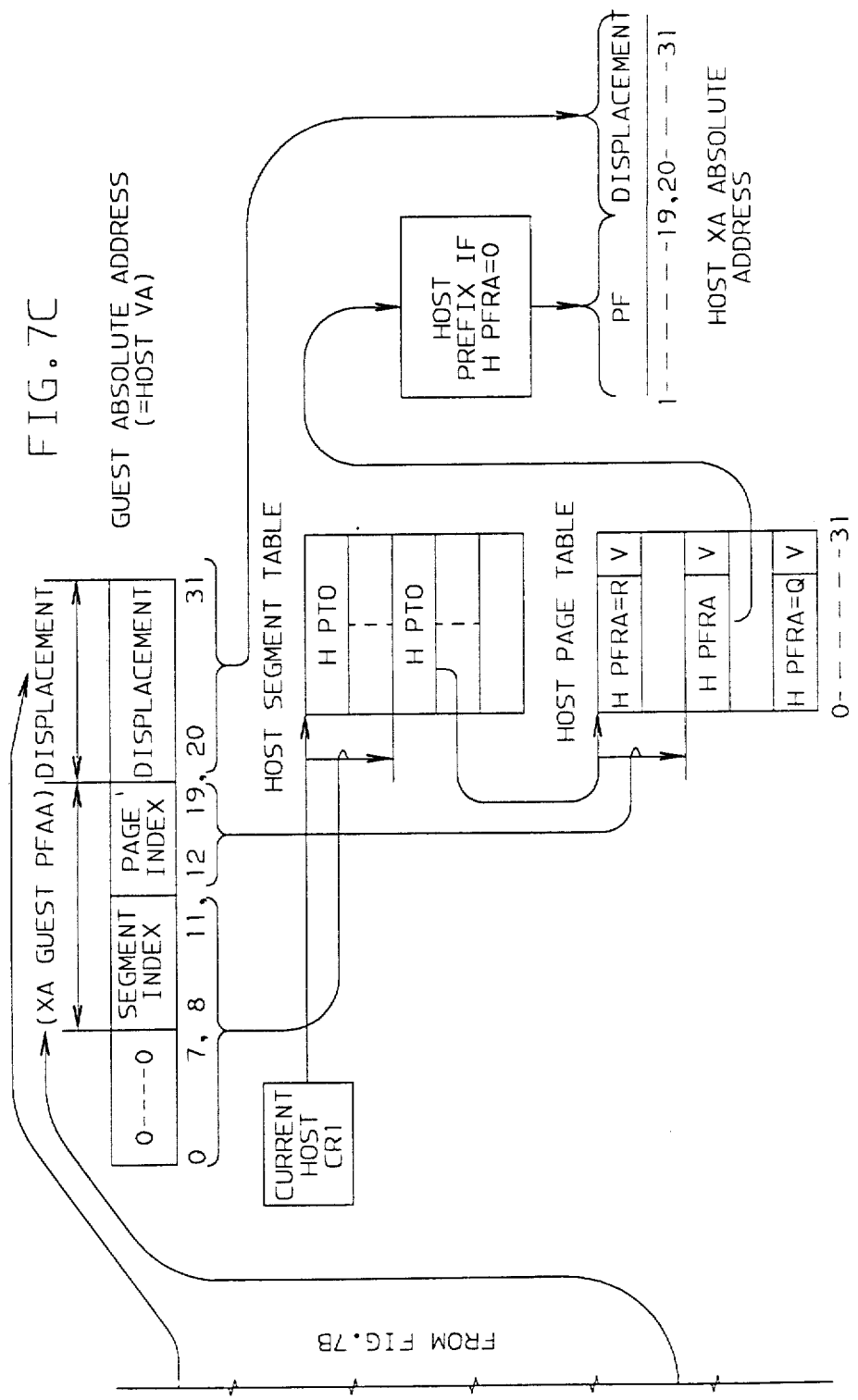

The unique manner of setting up the page tables is to provide a host page table with a number of entries equal to the number of page frames assigned to the zone. The first entry in this page table is set to the first page frame and starts with the "zone MS limit AA" and corresponds to the relocated guest real address zero. The page table entries are contiguously set with the host absolute addresses of the respective page frames in the sequence of page frames in the zone. The last entry in the host page table ends with the assigned "zone MS limit AA" which corresponds to the highest guest real address relocatable in the guest's zone. All of these set up entries are set to a valid state. The valid state settings of these page entries continues throughout the partition's operation. Such a host page table for a guest is illustrated in FIG. 7C.

An example of zone 2 is shown in FIG. 7A, in which any guest real address from zero to the end of its last page K will map to a corresponding zone 2 absolute address between the beginning of host page frame R and the end of host page frame Q. The guest may, of course, prefix its page at the guest real address zero to provide guest absolute addresses, which are then mapped in this manner to the assigned host page frames for being zone relocated. In this manner, the zone 2 guest pages are relocated to host page frames (PFs) 6 through 12 in FIG. 7A.

FIG. 7A shows a zone 2 guest virtual address expanse from 0 to T to illustrate the manner in which guest CPU addresses are translated and relocated in this embodiment. The guest virtual addresses are translated to guest real addresses that are placed into the zone 2 assigned contiguous sequence of host absolute addresses from page frame R through page frame Q which is located in the total host expanse of absolute addresses from 0 through M. When the assignment of host page frames to the guest zone is done through the host's segment and page tables in the special manner described above, the guest pages have a one-to-one relationship to the assigned host page frames, and the assignment remains valid throughout the existence of the page frame assignment to the respective partition. The page frame assignment to a zone can be dynamically increased or decreased by a user request at a later time, but this one-to-one relationship is always maintained whenever any host page table is changed for a preferred guest.

Hence, page boundaries in MS are a constraint in assigning the zone boundaries to the "zone MS origin AA" field and to the "zone MS limit AA" field in each partition definition set. A common page size is 4096 bytes. A further constraint on the location of zone boundaries in MS is that the MS allocation for zone assignment may be constrained to a much larger size unit than a page, such as in a 1 megabyte (MB) unit, which is assumed in this embodiment. Then each zone expanse is selected as being one or more 1 MB units. The 1 MB unit boundaries are also on page boundaries. The larger the zone assignment unit (as long as it is a power of 2), the fewer are the number of bits in the zone boundary addresses that need to be varied, since the other bits in the address are known to be all zeros and all ones on the opposite boundaries of any zone.

Each guest address is initially provided as a guest real address or a guest virtual address (each of which is called a "logical address" in S/370 and XA architectures). Each guest virtual address is first translated by the guest to a guest real address in the conventional manner shown in FIG. 7B.

The guest may then do prefixing, when necessary, and any further adjustment to the guest real addresses defined in the guest's SIE SD as its SD origin and extent. In this manner, each guest real address is converted to a guest absolute address, before it uses the host segment and page table for this guest shown in FIG. 7C to relocate the resulting guest absolute address to a host absolute address that can be accessed in MS.

Hence, any guest virtual address is address translated and relocated to a host absolute address in a host page frame via the host's segment and page tables for the guest. Then the resulting host page frame real address is prefixed, if necessary, and the resulting host absolute address is put into the CPU's conventional TLB (translation lookaside buffer), from which it is accessed for each subsequent unit access is to be made into that page frame in MS, as long as that entry is valid.

Thus, the host segment and page tables that previously have been used to translate guest real or absolute addresses to host real addresses are uniquely set up by this invention to relocate guest program provided real and absolute addresses into assigned zones, whether or not the original program address was a virtual address requiring translation into a guest real address.

Because of the unique manner of host page table set up in this invention, the real or absolute address being relocated into a zone need not be checked against the zone's MS limit absolute address in the zone's partition definition set in order to assure that the guest address has been relocated within the assigned zone. No guest address can exceed the assigned zone's limit address because only the host page frames within the assigned zone can be in the host page table of that guest.

Figure 8:
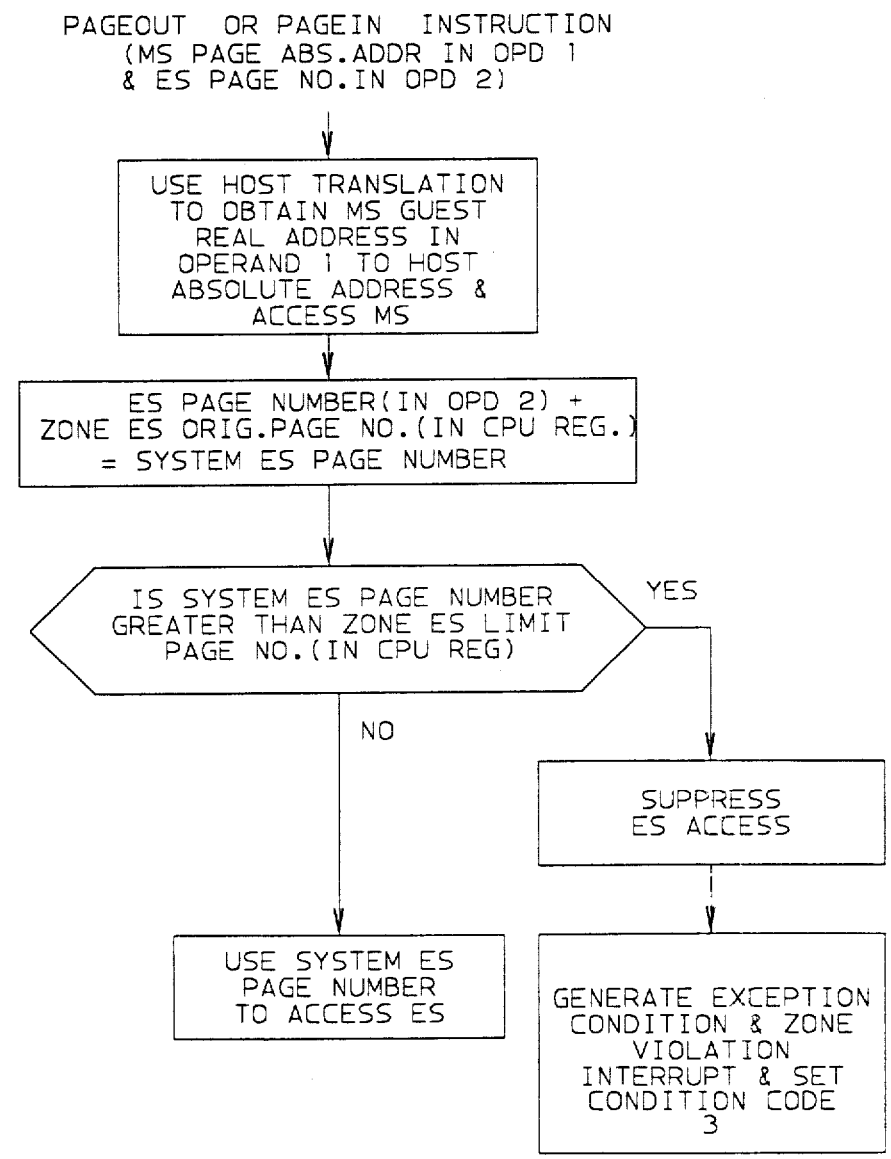
FIG. 8 represents the process used in the embodiment to/obtain zone relocation and checking for original guest expanded storage addresses into assigned ES zones in the embodiment.

FIG. 8:

The expanded storage (ES) is accessed with the S/370 pagein and pageout instructions, each of which has an operand address for MS as well as ES. Accordingly, both ES and MS accesses must be within the respective boundary addresses for the requesting zone. The relocation and check operations are shown in FIG. 8, where the MS address operand 1 of a pagein or pageout instruction is translated and relocated to an MS host absolute address as previously described in regard to FIGS. 7A, 7B and 7C.

The ES operand 2 address is a 32 bit page number address which is added to the zone ES origin address in the zone's partition definition set to obtain a "system ES page number" address in ES, which should be an ES address within the required zone. The ES address check is made by a comparison between the system ES page number and the 32 bit zone limit address (when ES storage allocation is on page boundaries) in the zone's partition definition set.

The ES relocation addition and the check comparison each may be done with less than 32 bit values if the ES zone allocation is on multiple page boundaries, such as if ES allocation is on 256 page boundaries only the 28 high order bits of each ES address need be used.

If the check comparison compares unequal, the ES access is suppressed and a zone violation address exception signal is generated, and usually a program interrupt results to the program providing the address. If the check comparison compares equal, the ES access is allowed, and the system uses the relocated system ES page number to make the ES access.

Figure 9:
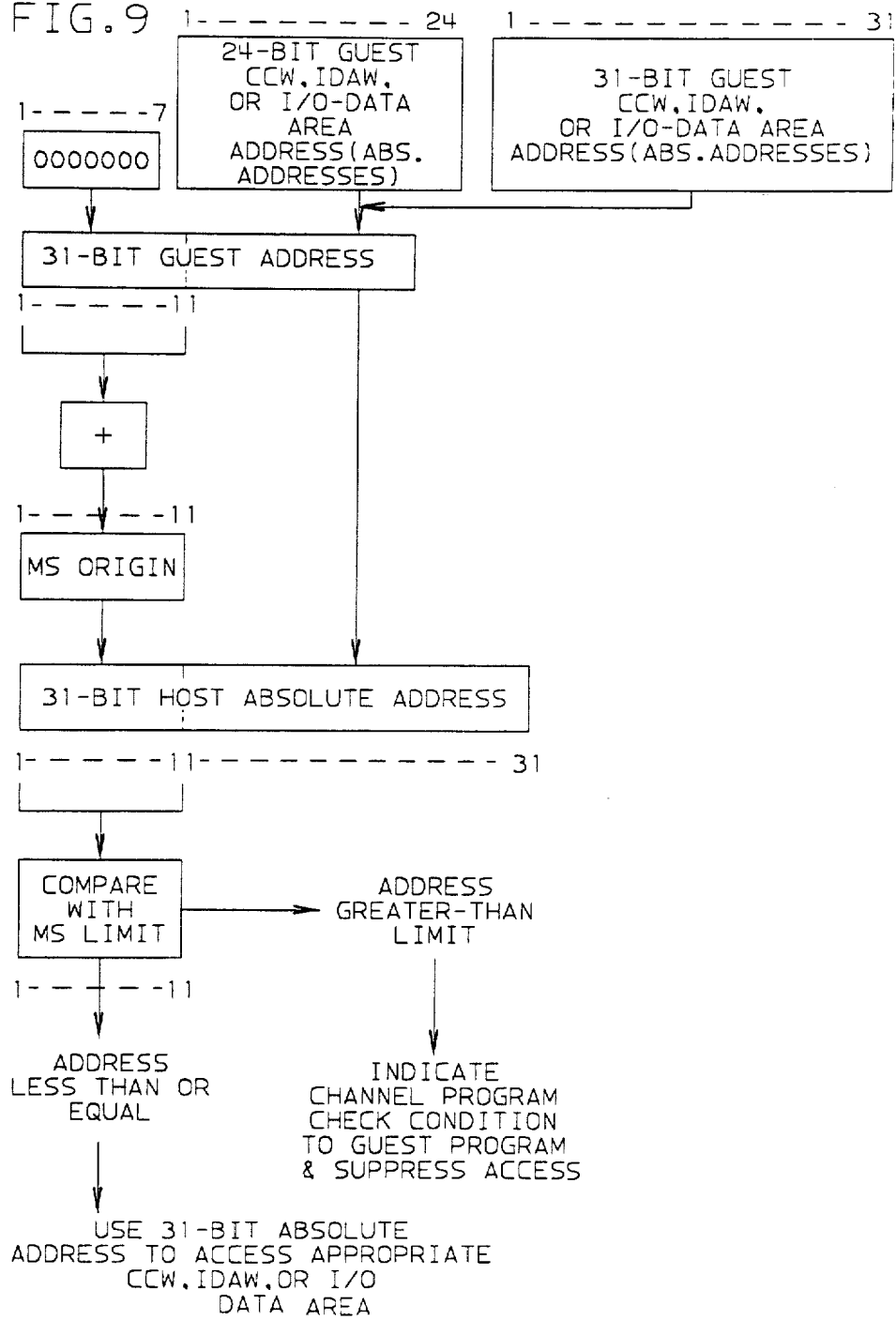
FIG. 9 represents the process used in the embodiment to obtain zone relocation and checking for original guest channel real/absolute addresses into assigned MS zones in the embodiment.

FIG. 9:

FIG. 9 shows how I/O channel absolute addresses to MS are relocated. As previously stated, 1 MB zone address boundaries are assumed in this embodiment which constrains the allocatable component of the guest address to 11 bit positions 1 through 11 in the 31 bit address shown in FIG. 9). Channel address relocation is done by adding the 11 bit allocatable component of the guest address (at guest address bit positions 1 through 11 in FIG. 9) to the zone's MS origin absolute address expressed in 11 bits, which is the form of the MS origin AA found in a control block of the subchannel requesting the access. This is done for each channel access to MS.

Also, unlike the guest handling of CPU addresses, a guest's I/O channel addresses to MS are checked against the zone's MS limit absolute address, which also is an 11 bit field in the control block of the subchannel requesting the access. Hence, the I/O channel address relocation and check operations are each done by comparing 11 bit values rather than the 31 bit values comprising the entire addresses. If either comparison compares unequal, the channel MS access is suppressed and an address exception signal is generated, and usually a program interrupt results to the program providing the address.

FIGS. 10 and 11:

The operation of this embodiment is dependent on an "effective I/O interrupt enablement mask" (EIEM), which is put into the CPU hardware. The content of the EIEM directly controls the enablement of the I/O interrupt subclasses (ISCs) defined in the S/370XA architecture. Indirectly, the EIEM content controls the guest interrupt enablement, and the alerting for other CPUs feature.

The enablement state of this CPU's program status word (PSW) bit 6 enables or disables the overall operation of the EIEM.

The respective bit positions of the EIEM directly control the selective enablement of the respective I/O subclass queues (represented by the ISCs in the I/O interrupt pending register (IPR) of the CPU having this mask. Thus, this CPU can then handle enabled pending I/O interruptions in enabled ISCs only while the CPU is also enabled by bit 6 in the current PSW for this CPU.

The EIEM mask is generated for a preferred guest when the guest is dispatched on a CPU in the system by issuance of the SIE instruction by the host program. The EIEM mask is then generated from a plurality of fields represented in FIG. 10, including from a field supplied by the host and from three fields obtained from the guest's state descriptor (SD).

FIG. 3A illustrates the SD. The fields obtained from the guest's SD are: an alerting zone mask (AZM), an active zone number (AZN), and a guest I/O interrupt enablement mask (GIEM). These guest fields are loaded into the local store of a CPU while the guest is being dispatched on that CPU.

The host field is obtained from the CPU control register 6 (CR6), which contains the "host I/O interrupt enablement mask" (HIEM).

The assigned zone number (AZN) identifies the current guest to the CPU on which a SIE SD has been dispatched. The AZN is taken from the SD, and it is decoded by the dispatching CPU into one out of N bit field in which all bits are zeros except the bit position representing the AZN to provide the AZN field stored in the CPU.

The alerting zone mask (AZM) has N bit positions that correspond to the potential AZN numbers in the system. The AZM bits are set on for the one or more zones other than the zone of the current guest (whose SD contains the alerting zone mask), whereby the set on bit positions indicate which of the other zone(s) will have alerting done whenever an I/O interrupt is discovered for such other guest. The affect of alerting is to enable such other guests to have a higher dispatching priority than the current guest. That is, an alert signal will be provided by the current guest's CPU whenever an I/O interrupt is available for such other guest.

The host dispatching program will determine how it will respond to any alert signal, and although the host response will generally be to dispatch the alerting guest on that CPU, the host need not do so, but could instead take some other action.

The guest I/O interrupt enablement mask (GIEM) provides the ISC enablement control in the guest program.

The "host I/O interrupt enablement mask" (HIEM) provides the ISC enablement control in the host program.

The EIEM combines all of these masks for the current guest in any CPU to control the CPU operations of I/O interrupt handling by the current guest, and of alerting for other preferred guests that are currently enabled for being alerted.

Figure 11B:
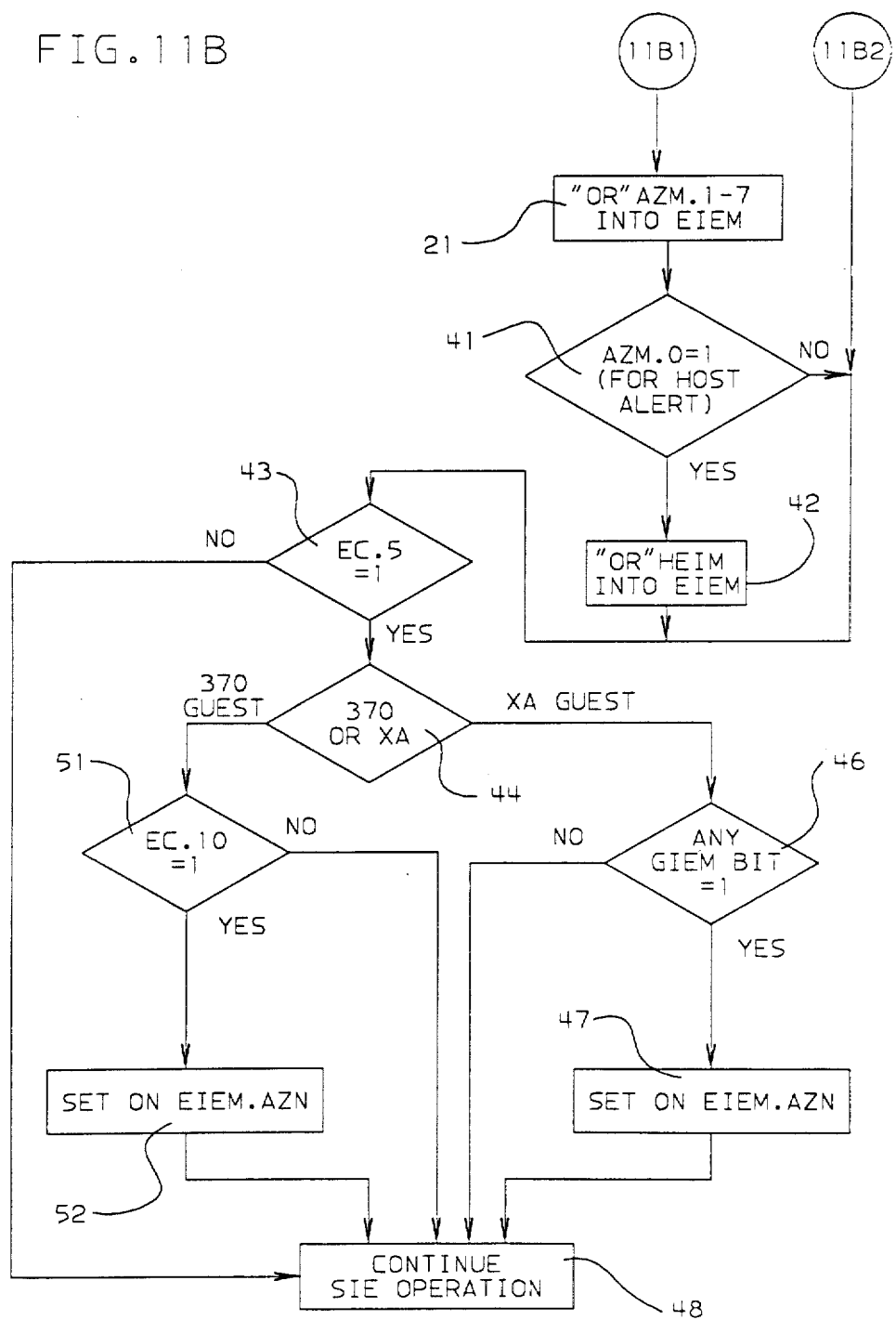

An example of how an EIEM is generated in the XA mode is illustrated in FIG. 10. FIGS. 11A and 11B show a sequence of control signals that control the manner in which the EIEM is being generated in either the XA or 370 mode, and show the timing relationship used during the EIEM generation process.

The example in FIG. 10 shows an EIEM generated by the CPU ANDing and ORing respective bit fields provided for: the host I/O interrupt enablement mask (HIEM), the alerting zone mask (AZM), the active zone number (AZN), and the guest I/O interrupt enablement mask (GIEM).

FIG. 10 shows N bit fields in which up to N−1 preferred guests can be represented, in which N is the maximum number (as represented in other figures herein) of preferred guests. Bit position 0 is used for the host.

FIGS. 11A and 11B represents the sequence of how the generation of the EIEM may be done by any CPU while it is dispatching any type of guest. FIGS. 11A and 11B are more general than FIG. 10, because FIGS. 11A and 11B also shows how the EIEM can be generated with microcode or a software program.

The EIEM is used to control the CPU operations of I/O interrupt handling and the alerting for another CPU. These functions are determined independently for each guest while it is being SIE dispatched on any CPU in the system. Hence, the EIEM is newly generated by the host process each time it dispatches a preferred guest on any CPU in the system with a SIE instruction.

The GIEM is held in a CPU control register during operation of the respective preferred guest. When the CPU operates in S/370 mode, CR2 is used; in which case the GIEM may be referred to as a guest "CR2 mask". When the CPU operates in S/370XA mode, CR6 is used; in which case the GIEM may be referred to as a guest "CR6 mask".

In FIG. 10 operating for XA guests, the GIEM (provided from the guest's SD) is tested by OR circuit 11 for being in an all-zeros condition, in which case a zero state output is provided that inhibits all AND gates in a set 10-16. The all-zeros condition indicates that the guest is currently disabled for handling any I/O interruption. If GIEM is not all-zeros, OR circuit 11 will provide a one state output to condition each of the eight AND gate circuits 10-16.

A decoder circuit 10-12 receives a R bit AZN value (being provided from the guest's SD), and decodes it into a one-out-of-R AZN code, in which the bit position corresponding to the AZN value is the only bit set to a one state. The respective R outputs of decoder 10-12 are provided to an input of each respective AND gate in a set 10-16. As a result of this operation by decoder 10-12, the AND gates in set 10-16 can provide either: (a) a zeros output from all of its N positions when the AZN bit position is disabled in its GIEM; or (b) only its AZN bit position will have a one state signal, while its other bit positions will have zero states, when the AZN position is enabled in its GIEM.

Also, the AZM (alerting zone mask provided from the guest's SD) has its host bit position zero provided to condition every input of a set of N AND gates 10-13.

The other inputs of AND gates 10-13 receive the setting of a corresponding bit position from an N-bit HIEM (host CR6 mask). The HIEM is in the CPU's CR6 while the EIEM is being generated, and HIEM is replaced with EIEM when the EIEM generation is completed.

The other bit positions 1 through N in the AZM represent alerting states for potential preferred guests (there may be less than N preferred guests active at any time). The state of AZM bits 1–N is provided from the guest's SD respectively to inputs of AND gate 1–N in set 10-14, each AND gate having another input conditioned by a signal EC.4. The signal EC.4 is the 4th bit position in an execution control area (ECA) in the guest's SD and it it set on to indicate alerting mode enabled, which is sent to an input of each of N number of AND gates 10-14.

The EIEM (effective CR6 mask) is generated by the set 10-17 of N number of OR circuits. They respectively OR: (a) the corresponding N bit output from AND circuit 10-16, (b) the corresponding N bit output from OR circuit 10-13, and (c) the corresponding N−1 bit output from AND circuits 10-14.

If the HIEM to AND gates 10-13 is not enabled by bit 0 of the guest's AZM, the EIEM generated from OR circuits 10-17 will only be controlled by: corresponding preferred guest bit positions of the AZM from AND gates 10-14, and the AZN bit position from an AND gate in set 10-16 if enabled in the GIEM.

FIG. 11A shows the bit positions in the ECA field pertinent to the functions being currently described. Bit EC.4 is set on to indicate the existence of the alerting mode, and no alerting is recognized by a CPU when the EC.4 bit is off. Bit EC.5 is set on to indicate the existence of the zone mode, and EC.5 bit is off to indicate when a V=V guest is to be recognized by the CPU. Bit EC.10 is set on for the CPU to indicate the existence of the 370 pass-through mode, and set off to indicate no 370 pass-through interrupts. The modes determined by the EC.4, EC.5 and EC.10 bits are mutually exclusive; that is, any of these modes may be set on independently of the settings of the others.

The pertinent part of the execution of the SIE instruction is provided in FIGS. 11A and 11B, in which the EIEM is generated when the SIE instruction is for a zoned (V=F) guest. But, the alerting function of this invention may be applied to an otherwise conventional V=V guest which is also included in FIGS. 11A and 11B.

FIG. 11A begins with the start of execution of the SIE instruction: with box 11-11 testing the setting of bit EC.5 to determine if the CPU is in zoned mode. As previously stated, the alerting function may also be used with the conventional V=V type of guest, which operates differently herein than the novel V=F guests in this invention; for example, the address relocation provided by this invention for V=F guests is not done for a V=V guest.

Thus, the EC.5 bit is set off when a V=V guest is being dispatched, and box 11-12 is entered to test the state of the EC.4 bit to determine if alerting is requested, since the process in FIGS. 11A and 11B enables the alerting function to be done for a V=V guest as well as any V=F guest, but not for V=R guests.

If the EC.4 bit is off, box 11-13 is entered to enable the microcode to handle the SIE instruction as was done for the prior art IBM VM/370XA programming systems.

If the EC.4 bit is on, box 11-16 is entered to use the host PSW.6 bit for enabling the CPU to take I/O interrupts. Then box 11-17 tests if the guest type is V=R, which is indicated in the guest's SD. If not a V=V guest, it is a V=R guest and an output is provided to box 11-18, in which the CPU takes a validity interception which causes the host supervisor program to be entered, which determines that the cause of the interception is an alerting request for a V=R guest, which is not allowed in this embodiment.

But, if box 17 detects a V=V guest, Box 11-19 is entered in which the CPU sets the EIEM in CR6 to an all zero state that disables it. Then, box 11-21 is entered.

On the other hand, if box 11-11 detected that EC.5 is set to a one state, it would indicate the CPU is in zoned mode for a V=F guest, and its yes output is taken. Then box 11-31 is entered to use the I/O enablement bit (Bit 6) in the guest PSW (guest PSW.6). The next box 11-32 then sets to zero the content of the register or field in which the EIEM is to be generated.

Then the CPU tests EC.4 in box 11-33 for existence of the alerting mode to determine if it is to alert any other guest(s). If EC.4 is in a one state, the yes output is taken to box 21 to generate the EIEM with the alerting mask input; but if EC.4 is in a zero state, the no output is taken to box 11-43 to thereby skip the AZM steps 11-21, 11-41 and 11-42 used in the EIEM generation process, and no AZM is included in the EIEM generation process.

The AZM inclusion process begins when box 21 is entered. Box 21 ORs the AZM bits 1−N into EIEM bits 1−N, respectively, and box 11-41 tests AZM bit position zero (AZM.0) for a one state. If in a one state, the HIEM is ORed into the respective bit positions of the EIEM register or field by box 11-42.

Box 11-43 then again tests if the zone mode bit EC.5 is on. If not on, its no output is taken to box 48 which continues the SIE operation in the conventional manner. But, if EC.5 is on, box 11-44 is entered and tests if the guest is operating in 370 or XA mode.

If the guest is in XA mode, box 11-46 tests if all bits are zeros in the GIEM in the guest's SD, or if any bit has a one state. If any bit is in a one state, the yes output is taken to box 11-47 which sets on the bit in the EIEM at the AZN bit position (i.e. EIEM.AZN). The EIEM generation is then completed, and the remainder of the SIE operation is conventional. (For a XA guest, no test is made of the state of the EC.10 bit.) Box 11-48 is also entered from the no output of box 11-46 when all bits in the GIEM are zeros.

However, if box 11-44 found that a 370 guest is being dispatched by the SIE instruction, box 11-51 is entered to test the state of the EC.10 bit to determine if the 370 guest is in pass-through mode. If in pass-through mode, box 11-52 is entered to sets on the bit in EIEM at the AZN bit position (i.e. EIEM.AZN). The EIEM generation is then completed, and the remainder of the SIE operation is conventional, so box 48 is entered.

I/O Interruption Pass-Through and Alert Dispatching

I/O interruption handling and alert dispatching control is done independently for each CPU in an MP system using the EIEM set into the CPU for its current guest. It is done while the CPU is running a zoned or V=V guest under the SIE instruction by using the following atomic microcode sequence of operations in response to the broadcast of each I/O interruption signal (setting on one or more Interrupt Pending Register (IPR) bits in each CPU):

I. If the CPU is enabled for interruption (i.e. guest PSW.6 enabled), then save the current CPU status, and determine the highest priority IPR (IPR.N) with IPR.0 being highest.
   A. Determine if the I/O interruption is for the host, by testing if:
      1. EC.4 is on, and
      2. the AZM.0 bit is enabled, and
      3. the host CR6 mask bit N is enabled.

II. If the I/O interruption is not for the host, it is for a guest, and:
   A. Determine if the I/O interruption is for an alertable guest, i.e. a guest other than for the preferred guest currently dispatched on the CPU receiving the I/O interrupt, by testing if:
      1. The I/O interrupt is for another guest N indicated by the subclass bit IPR.N being on, and
      2. The guest N has its alert bit AZM.N on.
         a. If these alerting conditions exist, an alert intercept is given to the host, which may then dispatch the alerted guest on this CPU.
   B. But if the I/O interruption is not for the host or an alertable guest, it must be for the guest dispatched on this CPU. Test if interrupt is enabled by guest by:
      1. GIEM.(SCH.GISC)=1;
      2. SCH.P=1
         a. If these conditions exist for the dispatched guest, its I/O interrupt is passed through to the guest to handle during the guest's dispatch on this CPU.
   C. But if the I/O interruption is for the dispatched guest, but:
      1. The guest's I/O interrupt subclass bit in the effective CR6 mask is disabled while the guest PSW.6 is enabled or SCH.P=0, then:
         a. The host puts the guest's I/O interrupt on a guest software queue for the guest subclass indicated for this I/O interrupt, and
         b. The host issues the guest's next sequential instruction to continue the guest's dispatch on this CPU.
            (1) The guest will later handle the I/O interrupt when the guest's CR6 mask bit becomes enabled.

III. However, if the CPU is disabled for interruption (i.e. guest PSW.6 is disabled):
   A. This CPU does not take any I/O interruption, which remains pending on its hardware interrupt queue unless accepted by another CPU. I/O interruption handling and alert dispatching control is done independently for each CPU in an MP system. It is done while the CPU is running a zoned or V=V guest under the SIE instruction by using the following sequence of operations in response to any one or more Interrupt Pending Register (IPR) bits being found to be set on in the CPU after it completes its execution of any instruction, which is signalled in its microcode with an "endop" microinstruction.

The IPR has a plurality of I/O interrupt subclass (ISC) bit positions which correspond to respective I/O interrupt queues in the system area of storage managed by the I/O processor (IOP) in a hardware manner. Any ISC bit position is set on whenever its corresponding queue has any I/O interrupt pending. The ISC bit position is automatically set on in the IPR of each CPU in the MP by a broadcast of the ISC of each I/O interruption signal by the IOP to all CPUs in the MP. The ISC bit in the IPR remains set on until all I/O pending interrupts for that ISC are handled by any CPU.

Upon each endop microinstruction occurring at the completion of executing each instruction, each CPU in the MP that is enabled for handling I/O interruptions looks at its IPR for any ISC in an on state. If any ISC is in an on state, the CPU attempts to handle the pending interrupt. If any CPU finds more than one ISC in an on state, it handles the ISC having the lowest bit position in the IPR, which is the ISC with the highest priority in the IPR.

FIGS. 12A and 12B:

The manner of subchannel (SCH) operation with this invention is represented in FIG. 12. It shows I/O devices 1 through Z, which are respectively associated with subchannels 1 through Z.

Each subchannel is represented by an SCH control block like that shown in FIG. 4, which contains a unique subchannel number, and an associated device number that identifies the particular I/O device represented by the respective subchannel.

Other parameters in the SCH control block for a subchannel assign the subchannel to a host I/O interrupt subclass (HISC) and to a guest I/O interrupt subclass (GISC).

Also, if the guest is a preferred guest, its assigned zone number AZN is stored in the SCH control block. Then, the zone boundary addresses: zone MS origin absolute address, and zone MS limit absolute address are also stored in the SCH control block.

The subchannel further contains a P pass-through bit that is set on when the subchannel I/O interrupts are to be handled by the guest having its AZN value in the SCH control block. Another field, X, is set on whenever status for the associated device is pending in the SCH.

The above fields in the SCH control block are assigned by using the S/370XA modify subchannel instruction. Whenever the subchannel control block is accessed, its SCH lock field, L, is set on, and it is set off as soon as the changes to the subchannel are completed.

Whenever any I/O interrupt occurs for any of devices 1–Z, channel operation 12-11 does a lookup in a table 12-9 by using the device number to lookup the assigned subchannel number (SCH #), and the device status is put into that subchannel control block.

Then the I/O processor (IOP) examines the interrupting subchannel to find the assigned HISC number for this subchannel to determine which queue of the HISC queues Q0 through QN to chain this pending interrupt.

The next step 12-17 performs the enqueueing operation, which is to locate the queue anchor and locate the last element in the selected HISC queue (which is the anchor if the queue is empty), and change its pointer field to address the subchannel having the current I/O interrupt.

The IOP also broadcasts the ISC # to all CPUs in the MP to set on the corresponding IPR bit in the IPR of each CPU, if it is not already on. Then the I/O interrupt generation and pending indication process is ended by the hardware for the host at box 12-21. It is next up to the asynchronous I/O interruption handling operations of the host and guest processes dispatched on the system to generate any required guest I/O queues, such as those shown in FIG. 12B and used in the handling of the pending guest I/O interrupts, which is explained in more detail later in this specification starting with FIG. 13.

FIG. 12B shows a plurality of guest I/O interrupt queues from 0 up to 31 in this embodiment for the guest using zone 2. This preferred guest 2 is assigned I/O devices Q through T. These devices are being managed by the host using the hardware subchannel control blocks described using FIG. 4.

However, any preferred guest may also be involved in the management of the devices assigned to the guest by using its own copy of the hardware subchannel control blocks for the guest assigned devices (e.g. Q through T for preferred guest 2). The involvement of guest management of its I/O devices is determined by the guest software, which was generally written without consideration for the guest being run under the system of this invention.

The guest copy on a subchannel is herein called a "guest subchannel", and the hardware subchannel are also referred to herein as the "host subchannels". Hence, each guest subchannel has a corresponding host subchannel. The guest subchannels may, but need not be, an exact copy of their corresponding host subchannels.

The system management of its subchannels will also maintain guest I/O interrupt queues, from queue 0 up to queue 31 in the example of this embodiment. Thus, the host software can put any guest subchannel on any guest software I/O interrupt queue when that subchannel has an I/O interrupt pending, and the copy of the I/O interrupt pending bit X will be set on in that guest subchannel. When a guest subchannel is put on a guest queue, that subchannel's pointer is chained into that guest queue. When a subchannel is removed from any queue, its pointer is set to the address of the respective software control block in MS representing that guest subchannel. The preferred guest handling of I/O interrupts uses the pass-through function of this invention.

FIGS. 13 through 20:

The detailed process for handling I/O interruptions to control pass-through to preferred guests and the alerting from zoned and V=V guests is represented in FIGS. 13–20.

Figure 14A:
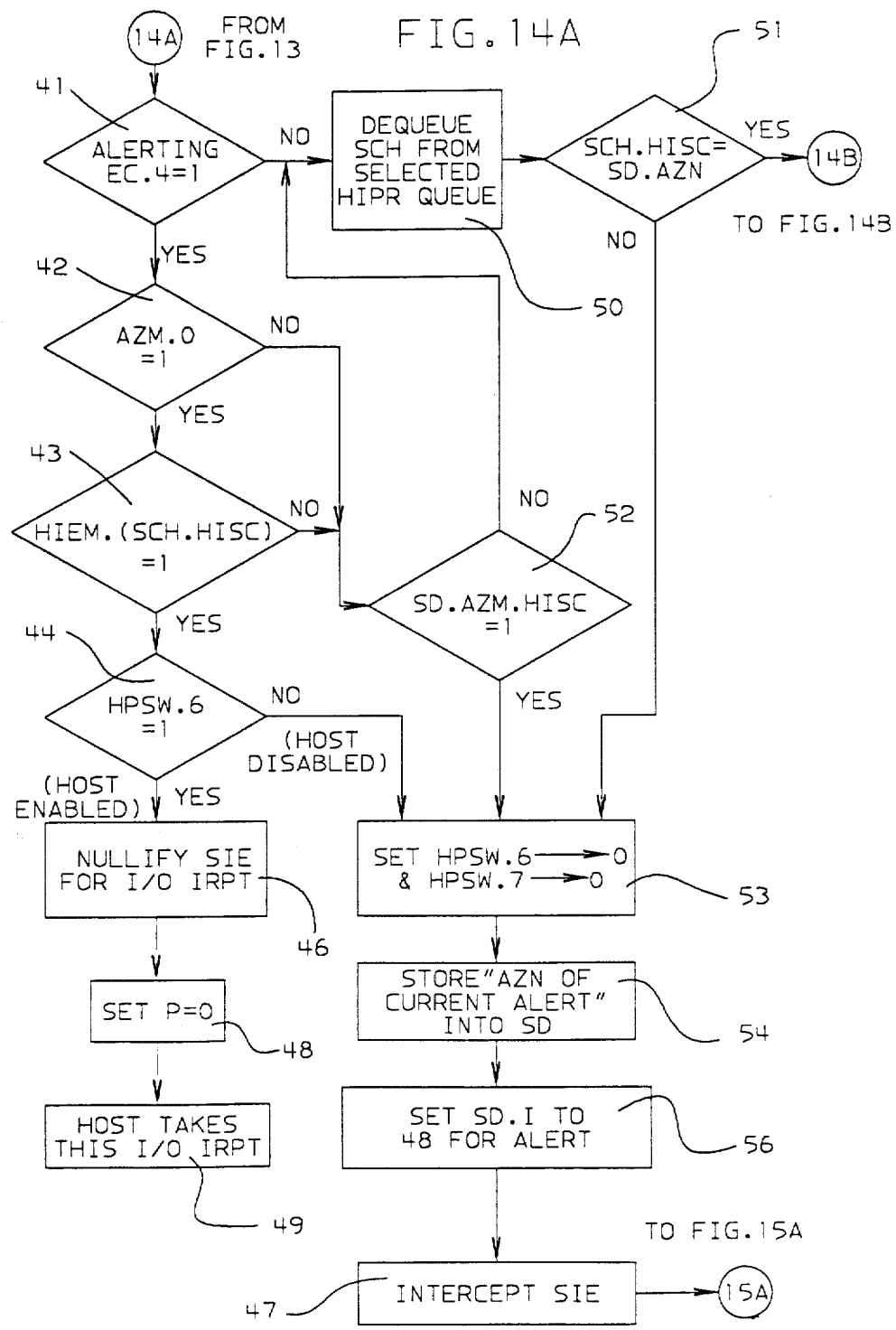
FIG. 14A shows a process for alerting the host for enabling the dispatching of other guests on the CPU in response to an I/O interruption in the embodiment.

FIGS. 13 and 14A and B show processing under the SIE instruction, which ends with a SIE interception.

FIGS. 15A through H show processing after a SIE interception.

FIGS. 17, 18, 19 and 20 show CPU instructions used in I/O processing that contain unique changes to enable their use in subchannel processing under this invention.

In FIG. 13, each CPU in the system is executing a stream of instructions, in which each next instruction is fetched in box 13-11, and it is executed in box 11-12. Then, in box 13-13 each instruction's execution completes with an "endop" (end operation) microinstruction, or its hardware equivalent that starts the following process for processing pending interruptions.

The next box 13-14 is not part of this invention, and in it the CPU handles any pending interrupts having a higher priority than the I/O interruption handled by the processes described in this specification.

Box 13-21 tests for I/O interruption enablement of the CPU by testing the state of bit 6 in the guest's program status word (guest PSW.6). If box 13-21 finds PSW.6 is not enabled, box 13-24 is entered to process any pending interruptions having a lower priority than I/O interruptions, and box 13-11 is reentered to continue the normal CPU operation.

But if box 13-21 finds PSW.6 is enabled, box 13-22 next tests the SQ bit (SD.SQ) in the state descriptor. The SD.SQ bit indicates if there are any pending interrupts on the guest's software queue(s).

If SD.SQ is on, it indicates that an I/O interrupt is pending in the guest's software queue(s), and they must be handled before any pending I/O interrupt is handled from any host (hardware) I/O interrupt queue. When a software queue pending I/O interrupt is indicated by SD.SQ being on, the yes output is taken to box 13-31 which stores intercept code 24 into the SD of this guest. Then a SIE intercept is taken, which invokes the host processing software for the SIE intercept represented in FIG. 15, and it will interpret the intercept code 24 to take the required action.

If the SD.SQ bit is off, it indicates that no pending I/O interrupt exists in the guest's software queue(s). Then the no output of box 12-22 is taken to box 13-23 which determines if there are any pending I/O interrupts on the host's hardware queue that should be recognized by this guest, e.g. for handling by this guest or for alerting the host. This is done by box 13-23 testing if any ISC bit enabled by the EIEM is on in the IPR of the CPU the guest is currently using. Then box 13-26 selects the leftmost ISC bit in a one state in the IPR that is enabled by the EIEM for CPU handling. Then, the process in FIG. 14 is entered to examine this selected ISC bit in the IPR. This selected ISC bit represents a pending I/O interrupt on a host queue, i.e. the selected ISC is a HISC value.

(Note: Each pending I/O interrupt for a guest is first put on the host I/O interrupt queue for that guest and sets the assigned ISC bit in each CPU's IPR; the host queue assignment is indicated in the interrupting subchannel control block.) The status pending bit, X, is then set on in the interrupting subchannel control block before it is queued.

Whenever a guest is selectively disabled by the respective GIEM bit being off, the SD.D bit is set on in the guest's SD. If the IPR indicates a pending I/O interrupt exists for the guest (i.e. IPR.AZN is on) in the host hardware queue while the guest is selectively disabled (i.e. SD.D is on), the guest's interrupt is then moved from the host's queue for the guest to a guest software queue. That is, during "selective disablement" of the guest in the GIEM, its pending I/O interrupts are moved from its initial host hardware queue to a guest software queue in host storage.

The process for controlling the setting of the SD.D bit on or off uses a load control instruction operation on CR6 (LCTL 6 instruction).

FIGS. 14A and 14B:

In FIG. 14A, box 14-41 is entered from box 13-26 to process the ISC bit selected by the process of box 13-26. Box 14-41 tests the alerting state bit EC.4 in the ECA (execution control area) in the SD of the guest to determine if the alerting controls in the CPU should be invoked.

The alert determination starts when box 14-42 is entered to test the state of the host's alerting enablement AZM.0. If off box 14-52 will be entered to examine the state of the AZM bit at the index of the selected ISC bit (i.e. AZM.ISC bit). If the AZM.ISC bit is enabled (i.e. equals one), box 14-53 is entered.

Box 14-53 sets off the CPU enablement for host I/O interruptions and external interruptions, respectively, in the host PSW bits 6 and 7 (i.e. HPSW.6 and HPSW.7 are set to zero).

Then box 14-54 is entered to store the selected ISC value into the "AZN of current alert" field in the guest's SD to indicate to the host program (when it later executes) the AZN of the other guest for which this alert signal is being made to enable the possible dispatching of that other guest by the host. The next box 14-56 sets intercept code 48 into the I field in the guest's SD to indicate to the host during its later processing of the need to examine the "AZN of current alert" field in the guest's SD to determine if it should dispatch that other guest. Then, an exit SIE interception is taken in box 14-47 from this SIE operation, and FIG. 15 is entered.

However, if box 14-42 finds the host alerting enablement bit (AZM.0) is on, box 14-43 tests the state of the HIEM.ISC bit to determine if the selected ISC is enabled in the host's I/O interrupt enablement mask. If HIEM.ISC is off, the host is disabled from handligg the interrupt and box 14-52 is entered to examine the selected AZM.ISC bit to see if the guest is enabled for alerting another guest. Then box 14-53 is entered, and the operations described above for boxes 14-53, 14-54, 14-56 and 14-47 are performed.

But if the HIEM.ISC bit is found on by box 14-43, box 14-44 is entered to test the CPU enablement for I/O interruptions in host PSW bits 6 (i.e. HPSW.6 set to one). If the CPU is enabled for host I/O interruptions, box 14-46 nullifies the SIE operation to return control to the host program for host I/O interruption processing.

But if box 14-44 found the case of the HPSW.6 bit indicating host disablement for handling host I/O interruptions, box 14-53 is entered which assures the setting off of the CPU enablement for host I/O interruptions and external interruptions, respectively, in the host PSW bits 6 and 7 (i.e. setting HPSW.6 and HPSW.7 to zero). Then box 14-54 is entered, and the operations described above for boxes 14-54, 14-56 and 14-47 are performed.

If box 14-41 finds the alert mode is set off (the EC.4 bit equals zero), box 14-51 is entered to test whether the selected ISC (the HISC value from FIG. 13) is for the current guest. This is done by testing if the host ISC number in the subchannel control block (SCH.HISC) is equal to the AZN in the guest's SD (i.e. SD.AZN).

If box 14-51 finds SCH.HISC is not equal to SD.AZN, box 14-53 is entered, and the following sequence of operations is as previously described for boxes 14-53, 14-54, 14-56 and 14-47.

If box 14-51 finds SCH.HISC is equal to SD.AZN, the selected HISC is for the current guest. Then exit L is taken to FIG. 14B for processing the selected HISC.

In FIG. 14B, test 14-61 determines if the pass-through bit P is set off in the SCH control block. If on, box 14-62 determines if the guest is operating in 370 or XA mode. If the guest is operating in XA mode with I/O pass-through, box 14-63 checks the guest's enablement in the GIEM of its bit position determined by the GISC number assigned in the subchannel. The GIEM bit is defined by a SD(GIEM).SCH(GISC) notation in box 14-63. If the GIEM bit is on, the yes output is taken to box 14-64 which induces an XA guest I/O interrupt using the GPSW swap for accessing the guest's interrupt handler program to handle the I/O interrupt.

If box 14-61 indicates no pass-through mode, or box 14-63 finds the SD(GIEM).SCH(GISC) bit off, then box 14-71 is entered which puts the I/O interrupt code into the guest's SD for later examination by the host, wherein the host can later transfer the pending I/O interrupt from the host's hardware queue to a guest software queue. Then the pass-through mode is set off in box 14-72, and the I intercept code field in the SD (i.e. SD.I) is set to a 60 intercept code value that also will be later interpreted by the host control program after the next SIE exit at box 14-74 to FIG. 15A.

However, if box 14-62 determines the guest is operating in 370 mode, box 14-63 is entered to check the current exception status returned for the SCH, since any existing exception will prevent the guest from handling its I/O interrupt until after the exception is cleared, and the delayed handling path from box 14-71 is taken, wherein the SIE exit at box 14-74 turns CPU control over to the host which will clear the exception status and then may either put the interrupt on a guest I/O interrupt queue from which the guest may later handle its interrupt, or return control to the guest via the SIE instruction.

If there is no exception existing for the device, box 14-67 tests the enablement in the GIEM for the particular channel providing the current I/O interrupt. This is done by accessing the channel number of the channel causing the interrupt, and indexing to the bit position in the GIEM at that channel number. If that GIEM bit position is on, a check is made of the state of the extended control (EC) mode bit in the guest's PSW (i.e. GPSW.12). If it is on, box 14-69 is entered and the 370 guest then handles its own I/O interrupt in the conventional manner involving a guest PSW swap to access the guest's interrupt handler program.

If either box 14-67 or 14-68 took its no output, the delayed interrupt handling path to box 14-71 is taken, which is described above.

NORMAL AND ABNORMAL SIE PROCESSING

Figure 16:
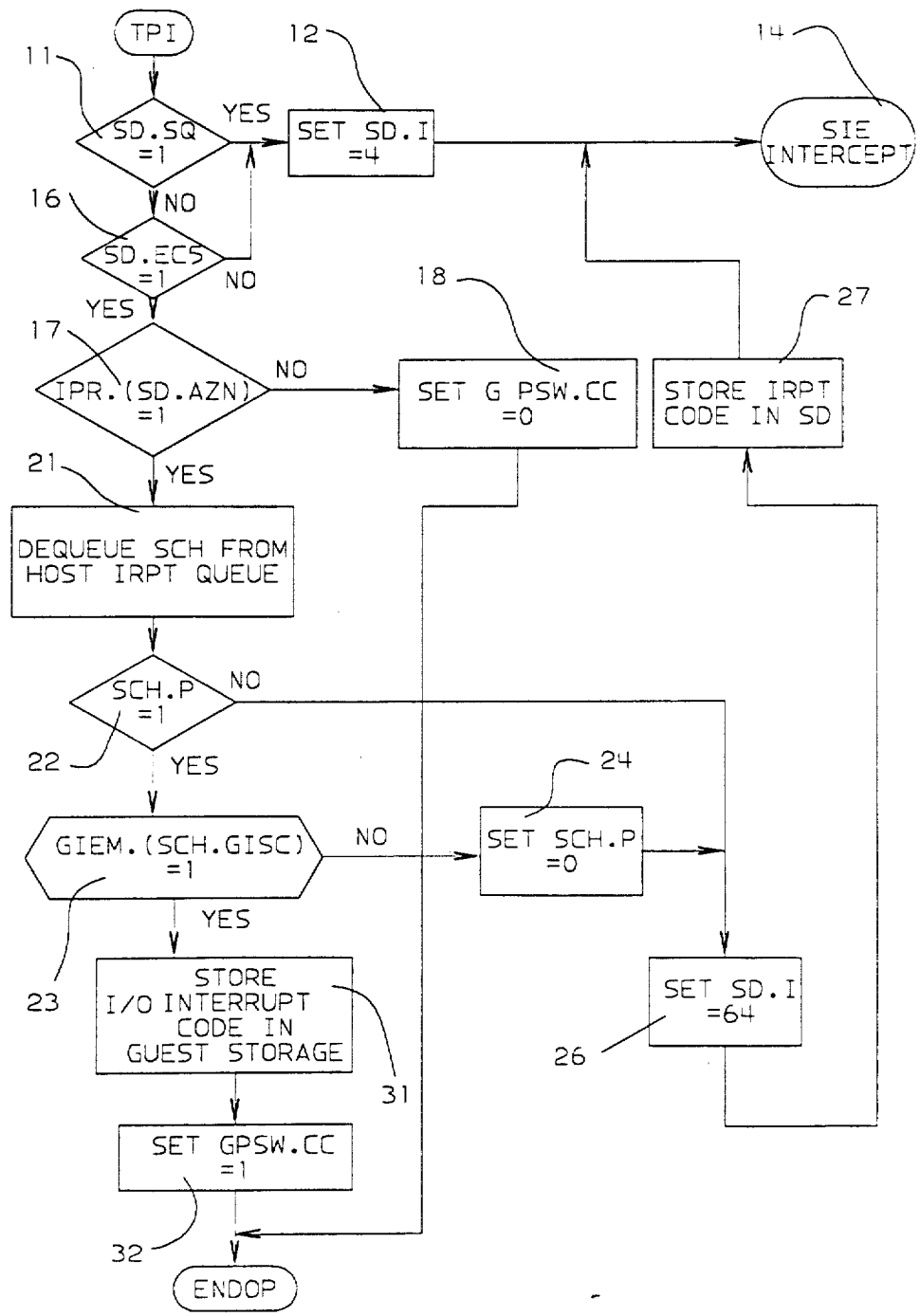
FIG. 16 represents the execution of a TPI (test pending) instruction by a preferred guest operating under the SIE (start interpretive execution) instruction in which the guest handles its own enabled I/O interrupt.
Figure 17:
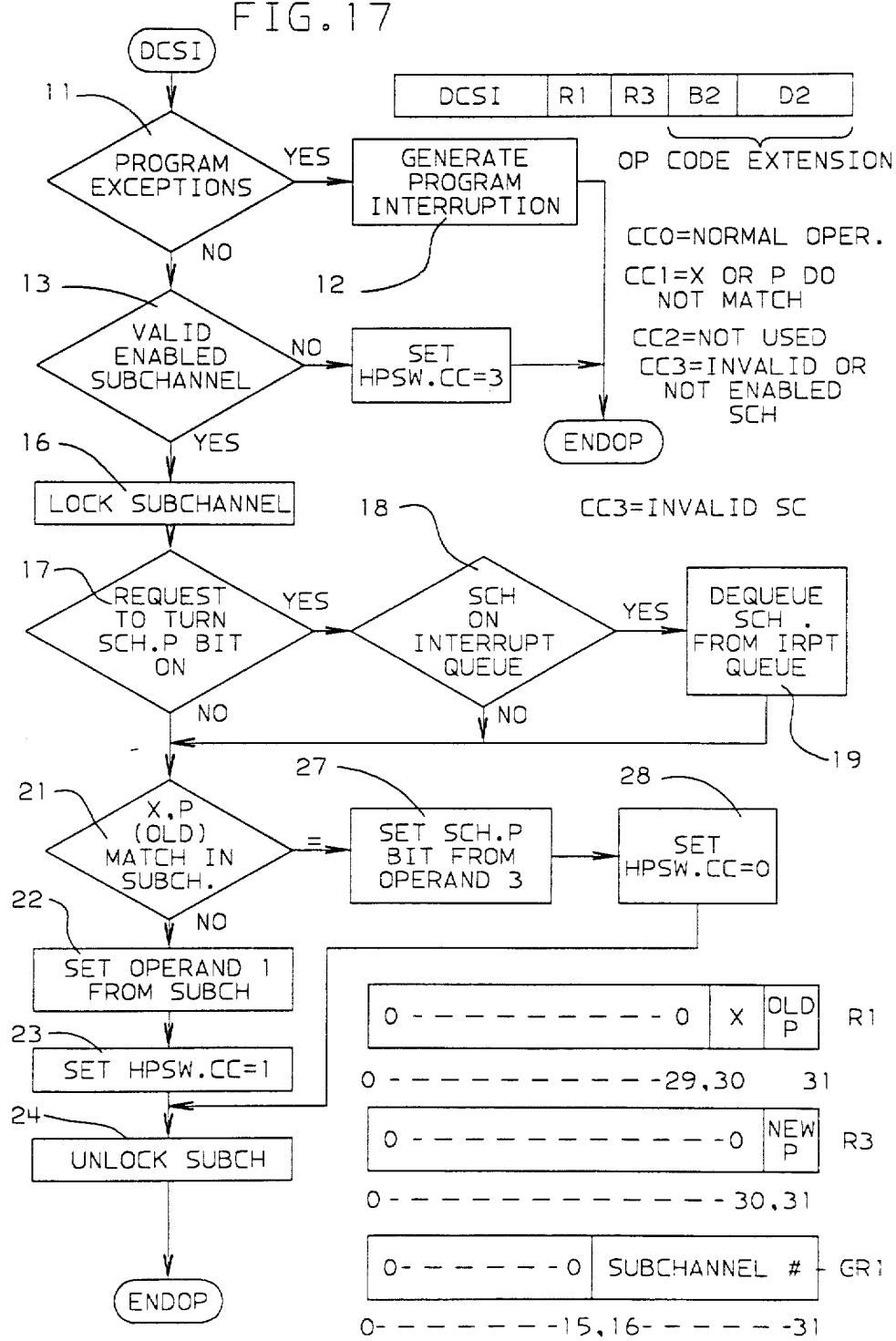
FIG. 17 represents the execution of a DCSI (diagnose compare and swap instruction) by the host to perform an atomic operation on a subchannel to set on its pass through state.
Figure 18:
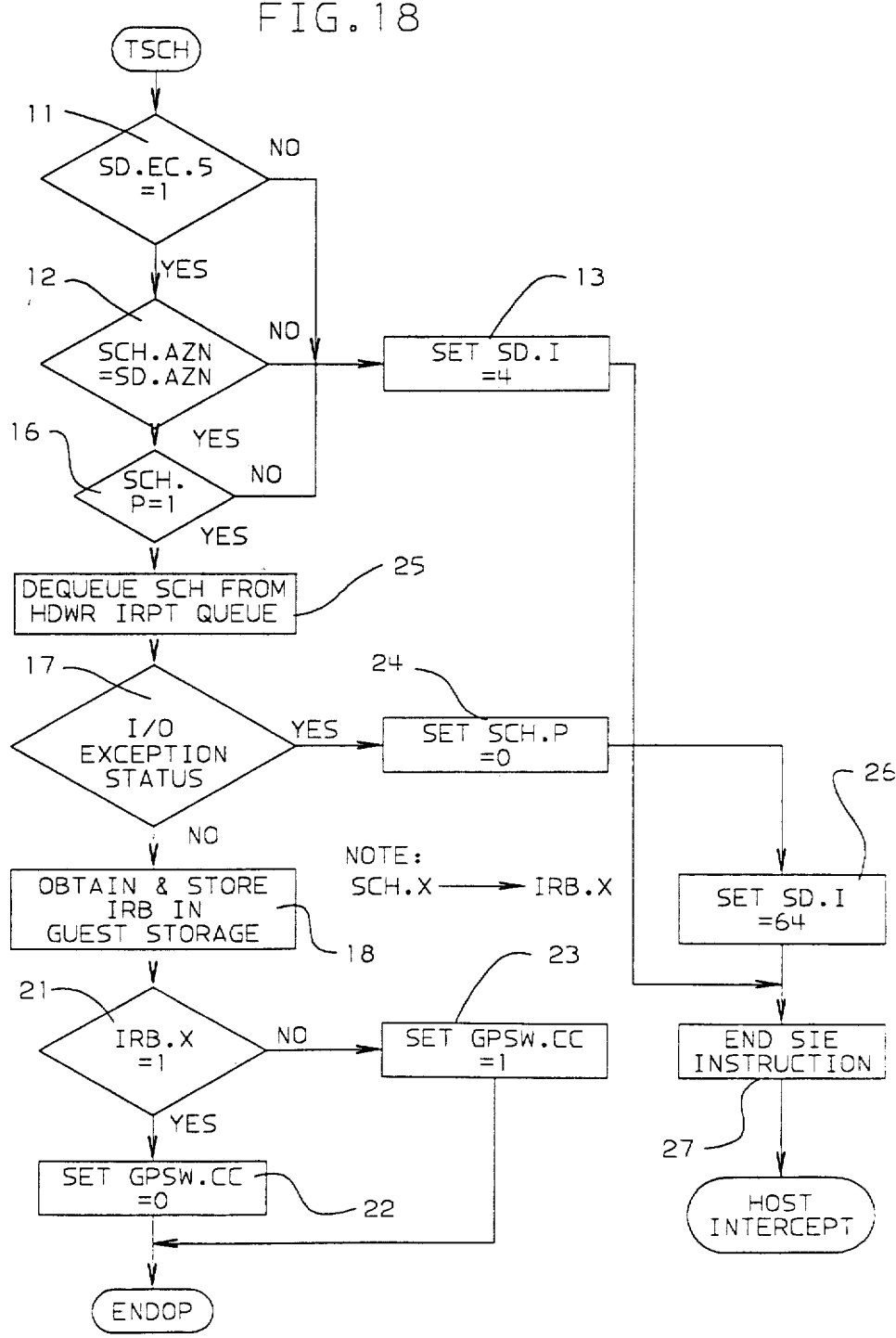
FIG. 18 represents the execution of a TSCH (test subchannel) instruction by a preferred guest operating under the SIE instruction in which the preferred guest monitors the conditions which allow it to handle its own I/O interrupt when the guest is in a selectively enabled state and the subchannel is in pass through state.
Figure 19:
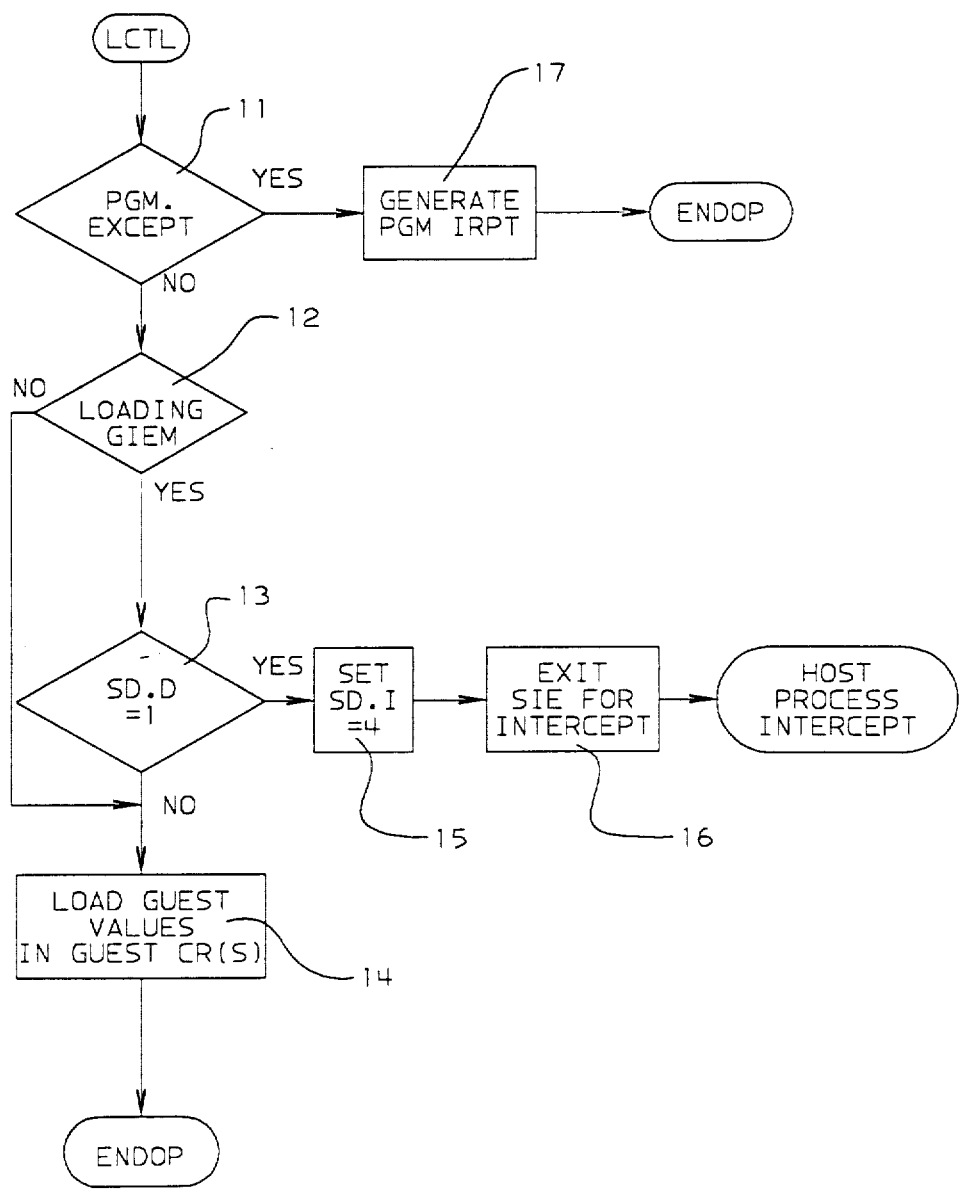
FIG. 19 represents the execution of a LCTL (load control) instruction by a preferred guest operating under the SIE (start interpretive execution) instruction to put the guest in a disabled state when the guest changes its GIEM (guest I/O interrupt enablement mask).
Figure 20:
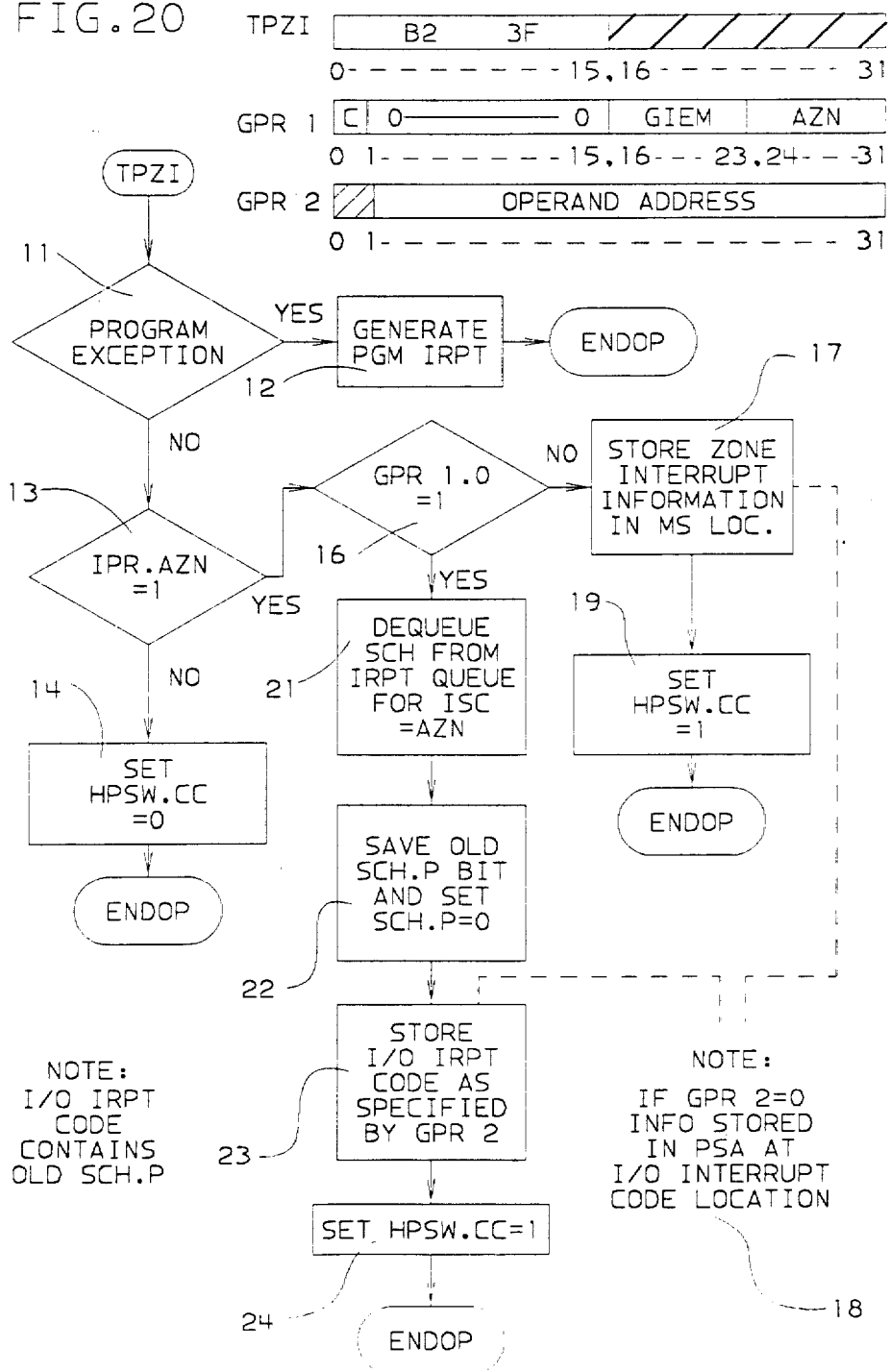
FIG. 20 represents the execution of a TPZI (test pending zone interrupt) instruction by the host to determine if any I/O interrupt is pending for a designated guest, such as an alertable guest.

FIGS. 16, 18, and 19 represent normal processing under the SIE instruction for certain S/370XA instructions which may be found in the instruction streams of preferred guests. FIGS. 17 and 20 describe new instructions provided for the host use in controlling the partitioned environment. These instructions are provided with special execution operations because of their potential involvement with I/O interruptions for I/O programs that may have their addresses automatically relocated by this invention to the respective partitions of preferred guests.

FIGS. 15A through 15G represent abnormal processing for the instructions when they encounter certain I/O related SIE intercept conditions that may occur during the normal processing for the instructions in FIGS. 16 through 20 and for other operations processed in FIGS. 13, 14A or 14B. For example, some of these operations are not permitted to normally execute if while attempting normal processing they find an abnormal condition, such as: an existing disablement of a pending I/O interruption involved in the operation, or that the involved I/O interruption is caused by an I/O device not assigned to the zone of the executing guest.

FIG. 16:

FIG. 16 represents the process for executing the S/370XA TPI instruction for a preferred guest operating under the SIE instruction on any CPU in the system. If any abnormal condition is found during the normal TPI processing the abnormal condition is handled in FIG. 15E. The TPI process in FIG. 16 cheeks the guest's disablement for handling I/O interruptions, and checks if the interruption is owned by this preferred guest before allowing information about the I/O interruption to be made available for this preferred guest. If the TPI processing completes, it returns a corresponding guest PSW (GPSW) that contains the condition code (CC) resulting from this TPI execution.

The TPI processing begins with box 16-11 testing if this guest has I/O interruptions queued in a software queue, i.e. if the SD.SQ bit is in a one state in the guest's SD. If the box 16-11 finds the guest has any I/O interruption software queued, box 16-12 sets SIE intercept 4, and box 16-13 abnormally ends execution for the current SIE instruction by a SIE intercept at box 16-14 in which the host gets control of the CPU to do other execution, e.g. intercept code processing.

If box 16-11 indicates that the guest has no I/O interruption queued, (i.e. SD.SQ=0), then box 16-16 determines if the guest is in zone mode by testing its zone mode state bit SD.EC.5. If box 16-16 takes its no exit, it gives to box 16-12 and takes the interceptions as previously described. If in zone mode, box 16-17 tests whether any pending interrupt is indicated for the guest in its assigned ISC i.e. IPR.AZN=1. If box 16-17 indicates no interrupt exists for this guest, then box 16-18 is entered to set the CC to zero in the guest's PSW. Then an endop operation ends the TPI processing.

However, the yes output of box 16-17 indictes the guest is in zone mode and has a pending I/O interrupt. Then box 16-21 is entered to dequeue the interrupting subchannel from the host I/O interrupt queue of this guest.

The next box 16-22 tests the state of the pass-through bit P in the subchannel (i.e. tests SCH.P). If SCH.P is off, the guest cannot handle the interrupt, and host intervention is obtained by box 16-26 setting the intercept code 64 into the guest's SD intercept field SD.I. Then SIE execution is ended by the SIE intercept of box 16-14.

If SCH.P is on, the guest may be allowed to handle the interrupt, and box 16-23 tests the state of the guest's selective enablement in the guest's GIEM at the bit position determined by the guest ISC assignment in the subchannel, i.e. by testing bit GIEM.(SCH.GISC).

If box 16-23 finds the guest is selectively disabled, it takes its no output to box 16-24 which sets the pass-through bit SCH.P to zero, and enters box 16-26 to set SD.I to 64 to have the SIE execution intercepted. Then box 61-27 stores the interrupt code for the current interrupt into the SD of the guest. Then the SIE interception occurs to give the host control of the CPU.

If box 16-23 finds the guest is selectively enabled, it takes its yes output to box 16-31 which stores the interrupt code for the current interrupt into the guest's storage. The next box 16-32 sets the guest's CC to one, i.e. sets GPSW.CC=1. Then the operation ends for the guest TPI instruction processing.

FIG. 17:

FIG. 17 illustrates the processing of the DCSI (diagnose compare and swap instruction) on subchannel fields. The DCSI is a variation on the prior S/370 compare and swap instruction, which cannot access any subchannel because subchannels are located in system storage hidden from users. The DCSI instruction has three operands in which the second operand is an extension to the diagnose instruction operation code. The first and third operands are general purpose registers (GRs), and there is an additional operand implied in GR1, which contains an identifier of the subchannel being accessed. The operand in R1 has the current values of the subchannel's status bit, X, and its pass-through bit, P, as they exist immediately before execution of the DCSI instruction. If they have not changed when the DCSI instruction is executed, the P bit in the subchannel is replaced by the new P bit in the operand R3, and the resulting condition code of the DCSI is set accordingly.

The DCSI process is entered at box 17-11 to test for any existing program exceptions, since they can prevent proper execution of the DCSI. If any program exceptions exists, the yes output is taken to box 17-12 that generates a program interruption and operation is ended for this DCSI with an endop signal.

If box 17-11 finds that no program exception exists, box 17-13 is entered to test if the subchannel identified in the GR1 operand is valid and enabled. If the subchannel is not valid and enabled, the condition code (HPSW.CC) is set to three to indicate this condition, and processing is ended for the DCSI with an endop.

If box 17-13 finds the subchannel identified in the GR1 operand is valid and enabled, the yes output is taken and the execution continues for DCSI.

Box 17-16 is entered to lock the subchannel by setting on its lock bit SCH.L to warn off any other requestor desiring to change the subchannel.

The next box 17-17 tests if the new P bit in the R3 operand is a one. If yes, box 17-18 makes a test to determine if the subchannel is on any interrupt queue by testing the state of its valid bit V. If V indicates a valid queue pointer does exist, box 17-19 is entered to dequeue the subchannel from its interrupt queue.

However, if either box 17-17 or 17-18 took its no exit, then box 17-21 is entered to perform an atomic operation in regard to bits SCH.X and SCH.P. That is, box 17-21 tests a comparison between the current values of X and P in the subchannel and the old values of X and P stored in operand R1 to determine if the are equal, which indicates the old values have not changed. If they have not changed, box 17-27 is entered to set the SCH.P bit to the new value in operand R3. Then box 17-28 sets the HPSW.CC to zero, and the lock bit L is set off by box 17-24. Then the DCSI operation is ended.

If inequality is found by box 17-21, SCH.P or SCH.X has changed, and box 17-22 is entered to set operand R1 with the current values of X and P in the subchannel, box 17-23 sets the HPSW.CC to one, and the lock bit L is set off by box 17-24. Then the DCSI operation is ended.

FIG. 18

FIG. 18 illustrates the normal processing for a TSCH (test subchannel) instruction in the guest's instruction stream under the SIE instruction operation. The TSCH instruction is defined in S/370XA architecture. This invention adds tests to determine if the I/O interruption belongs to this guest, and if the guest is allowed to process the interruption. FIG. 15F provides the host intercept processing for the TSCH instruction if some unusual condition occurred.

A TSCH instruction is commonly issued to obtain status from the subchannel. The TSCH generates an information response block (IRB) containing the necessary status information, as defined in the S/370XA Principles of Operations.

Thus, box 18-11 is entered to test the SIE execution state indicated by field EC.5 in the guest's SD (i.e. in bit SD.EC.5) to determine if the guest is in zone mode. If not in zone mode, box 18-13 is entered, which sets the intercept code field SD.I in the guest's state descriptor to intercept code 4. If box 18-11 finds the guest SD indicates zone mode, box 18-12 is entered to test if the AZN assigned in the subchannel (i.e. value in SCH.AZN) is equal to the guest's AZN assigned in the guest's SD (i.e. value in SD.AZN). If they are not equal, box 18-13 is entered to set intercept code 4. If they are equal, box 18-16 is entered to test if the pass-through bit P is on (i.e. SCH.P=1). If box 18-16 finds SCH.P is zero, box 18-13 is entered to set intercept code 4.

When box 18-13 sets intercept code 4, the SIE execution state of the guest is ended by entering box 18-27 to reinstate the host operation on this CPU (i.e. SIE intercept). The process described in FIG. 15F will then later be used by the host to handle the intercepted TSCH instruction.

When the host later detects the intercept code 4 in the guest's SD, it operates in the manner explained in regard to FIG. 15F, in which the host examines for special conditions that can occur in the simulation of a TSCH instruction in order to complete the handling of the TSCH instruction for a guest. An intercept continues the TSCH processing by requiring the host: to test the guest's subchannel to determine if there is any pending interruption for the guest, to remove any such pending I/O interruption from the guest queue, to generate an information request block (IRB) for the guest if no current IRB exists, and to set the proper condition code into the guest PSW.

If box 18-16 finds SCH.P is in a one state, then box 18-25 checks for and dequeues SCH from the hardware (host) I/O interrupt queue. Then box 18-17 determines if the guest is permitted to store the IRB by determining if any exception condition exists in the subchannel. If any exist, box 18-24 is entered to set the pass-through bit SCH.P to zero. Then box 18-26 is entered to set the intercept code to 64 in the guest's SD.I. Then box 18-27 is entered to end SIE execution for the guest. Intercept code 64 is set when an exception condition exits for a TSCH instruction, and the process in FIG. 15F is used to handle the exception conditions.

If box 18-17 finds no exception condition exists, the normal execution process continues for the guest's TSCH instruction by entering box 18-18, which obtains and stores an IRB (information response block), which will indicate if any I/O interruption is pending for the guest.

Then box 18-21 tests the state of an I/O status pending bit IRB.X copied into the IRB from the subchannel I/O status pending bit SCH.X along with other information copied into the IRB. The state of an I/O status pending bit IRB.X will indicate if there is any I/O status pending in the tested subchannel for this guest.

If the IRB.X bit is in a one state, it indicates that status is pending in the tested subchannel for this guest, and box 18-22 sets the condition code (CC) in the guest's PSW to a zero state. Then an endop is provided to end the processing of the TSCH instruction.

If box 18-21 finds the state of an I/O status pending bit IRB.X is zero, its no output is taken to box 18-23 to set the guest's CC to one (i.e. set GPSW.CC=1). Then an endop is provided to end the TSCH instruction.

FIG. 19

FIG. 19 illustrates the normal execution of a LCTL (load control) instruction for a preferred guest operating under the SIE instruction. A guest's LCTL instruction is used to load one or more of the guest's sixteen control registers shown in the CPU in FIG. 3B. The LCTL processing initially enters box 19-11 which tests for any initial exceptions conditions that may exist. If any exception exists, a program interruption is generated by box 19-17, and an endop occurs.

If no program exception exists, box 19-12 is entered to test if the CR which must handle the GIEM is loaded (i.e. CR6 in XA or CR2 in 370) by this LCTL. If yes, box 19-13 is entered to test the state of the guest's selective disablement by testing its bit SD.D. If SD.D is in a one state, the guest is disabled from taking a pending I/O interrupt at this time, and box 19-15 is entered to set the guest's intercept code field SD.I to 4, which causes the current SIE operation of the guest to be intercepted by the host which will then execute on the CPU.

Box 19-14 is entered to load the guest's control registers specified in the LCTL instruction. The guest CRs are shown in the CPU example in FIG. 3B.

FIG. 20

FIG. 20 illustrates the operation of the TPZI (test pending zone interruption) instruction which is unique to this invention. The TPZI instruction has two operands, that are stored in general purpose registers, GR1 and GR2. A control bit C in bit position 0 of GR1 controls the TPZI process, as follows: (A) when C=1 any pending I/O interrupt is stored in the address contained in GR2, and (B) when C=0, a determination is made if any I/O interrupt is pending for the zone having the AZN defined in GR1 and if it is enabled by the GIEM in GR1.

The TPZI process enters box 20-11 to test for any existing program exceptions, since they can prevent proper execution of the TPZI. If any program exceptions exists, the yes output is taken to box 20-12 that generates a program interruption, and the TPZI process ends with an endop signal.

If box 20-11 finds that no program exception exists, box 20-13 is entered to test if any I/O interrupt exists for the zone identified in GR1 by testing if the IPR bit assigned to the respective zone is set on (i.e. IPR.AZN=1). If no I/O interrupt is pending, box 20-14 is entered to set the CC in the hosts PSW to zero (i.e. set HPSW.CC=0). If an I/O interrupt is pending, box 20-16 is entered to test the C bit in GR1 to determine the type of processing to be done for the indicated interrupt.

If box 20-16 finds C=0, zone I/O interruption pending information is stored at the MS address in GR2, and box 20-19 sets the HPSW.CC to a one state to indicate this condition. Then the TPZI operation is ended with an endop.

But if box 20-16 finds C=1, box 20-21 dequeues the I/O interruption by dequeuing the interrupting subchannel from the host I/O interruption queue (HIPR.AZN) specified by the AZN in GR1. Box 20-22 saves the value of the current (old) pass-through bit SCH.P in an I/O interrupt code, and then sets SCH.P to zero. Box 20-23 stores the I/O interrupt code at the MS address in GPR2, and box 20-24 sets the HPSW.CC to a one state to indicate the interruption has been stored. Then the TPZI operation is ended with an endop.

An option with the TPZI instruction is to load a zero value in GR2 to cause the operation indicated in box 20-18. This address would be the address in which an XA I/O interrupt code would be stored during an I/O interrupt.

FIG. 15A

Figure 15B:
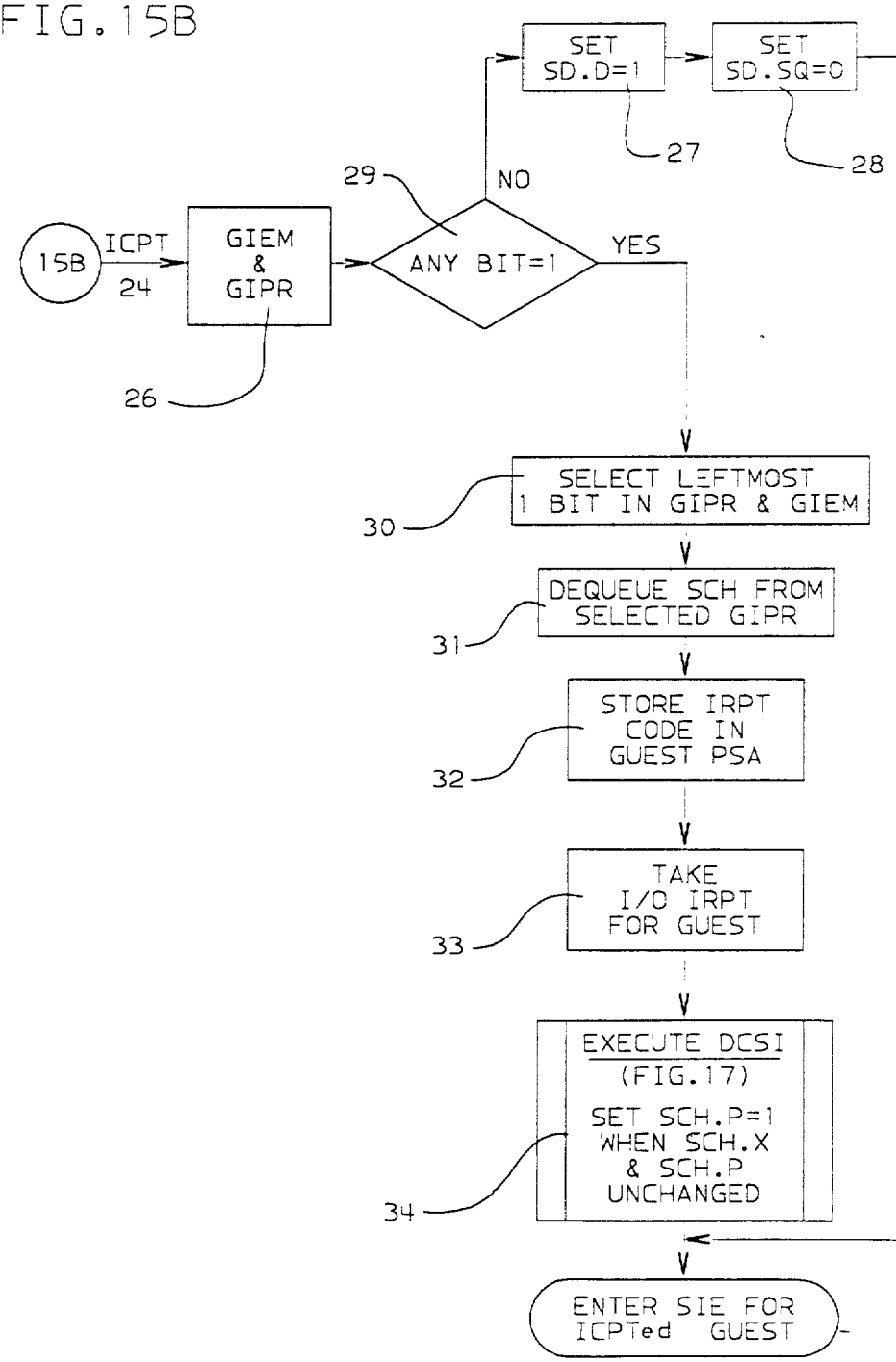
FIG. 15B represents a host intervention process to handle an I/O interruption on one of the guest's software queues.

FIG. 15A is central to FIGS. 15A-G, all of which relate to the host processing of abnormal interceptions previously placed in a guest's interception area SD.I. The interceptions handled in FIGS. 15A-G are related to I/O status or interruptions for preferred guests occurring while operating under the SIE instruction. These interceptions occurred during normal guest processing under the SIE instruction in the manner described in FIGS. 13, 14A, 14B, and 15, 18 and 19. After the host processing of an interception, the host generally reissues the SIE instruction for the intercepted guest to continue its processing, except when an interception code 48 is provided in SD.I for alerting another guest.

Box 15-11 is initially entered in FIG. 15A for the detection of the intercept code in a guest's SD.I. The associated box 15-12 indicates the interception codes handled in FIGS. 15A-G which are shown as intercept codes 4, 24, 48, 60 and 64. The "other" interception code in Box 15-12 represents the detection of interception codes not described in detail in this embodiment.

The interception code 4 in SD.I is provided for an abnormal condition making a guest unable to complete the processing of an instruction attempted to be executed by the intercepted guest. Code 4 connects to boxes 15-21 and 15-22 which determine the intercepted instruction.

Figure 15C:
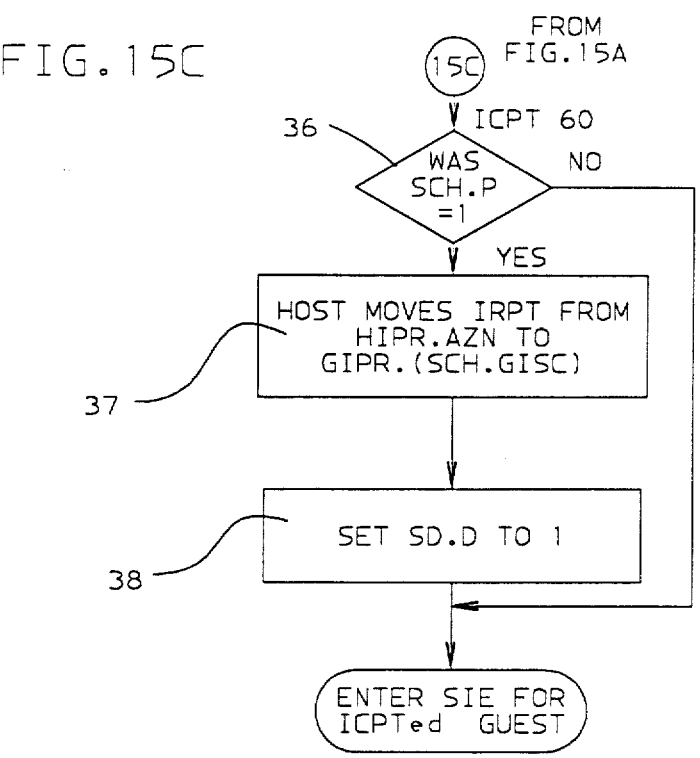
FIG. 15C represents a host intervention process for having the host move an I/O interruption from a host hardware queue to a guest software queue when the guest is unable to handle the I/O interruption.
Figure 15D:
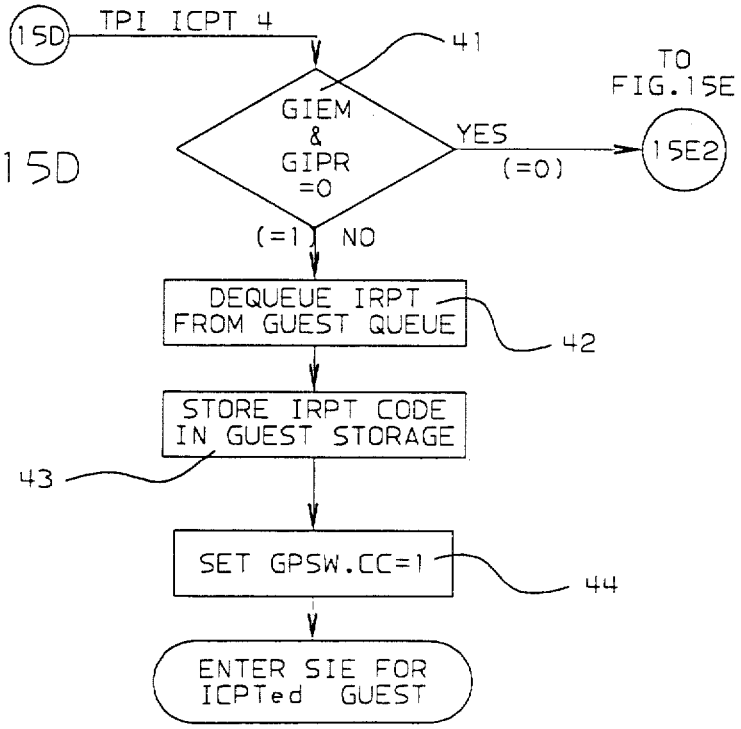
FIG. 15D represents a host intervention process for having the host execute a TPI (test pending interruption) instruction for a guest.

The types of instructions which are processed through box 15-22 in this embodiment are: the test subchannel (TSCH) instruction which takes exit 15F1 to FIG. 15F, the test pending interruption (TPI) instruction which takes exit 15D to FIG. 15D, and the load control (LCTL) instruction which takes exit 15G to FIG. 15G.

The "other" indicated in Box 15-22 represents other types of instructions not specifically discussed in this embodiment, but which require host intervention and processing by box 15-23 before the processing again enters the SIE instruction for the intercepted guest.

The interception code 24 in SD.I indicates that a pending I/O interruption exists on a guest software queue, which could not previously be handled by the intercepted guest. Exit 15B is taken to FIG. 15B to enable the guest to handle it.

The interception code 48 in SD.I indicates to the host that alerting is to be done, and the host must determine if it will dispatch another guest on the alerted CPU. Exit 15H is taken to FIG. 15H.

The interception code 60 in SD.I indicates that a pending I/O interrupt has been dequeued into the SD for the intercepted guest which is not currently able to handle it. The host will enqueue the interrupt information from the SD onto a guest software queue for later handling by the guest, unless it is intended for the host. Exit 15C is taken to FIG. 15C.

The interception code 64 in SD.I may indicate an abnormal condition in executing a TSCH or TPI instruction, which requires the host to issue a corresponding TSCH or TPZI instruction for the guest. Exit 15E1 is taken to FIG. 15E for a TPI, and exit 15F2 to FIG. 15F for a TSCH intercept.

FIG. 15B

Intercept code 24 (which may have been generated in FIG. 13 goes to box 15-26 that determines the existence of any enabled preferred guest's pending I/O interrupt by ANDing the guest's GIEM and GIPR at corresponding bit positions. Box 15-29 tests to determine if any one bit exists from the results of the operation in box 15-26. If no one bit exists, box 15-27 is entered to set SD.D to a one state to indicate the guest is selectively disabled, and box 15-28 sets SD.SQ to a zero state to indicate no interrupt exists on the enabled guest software queues. Then SIE is reentered.

If box 15-29 finds any bit in a one state, then box 15-30 selects the leftmost enabled bit from box 15-26, and then enters box 15-31 which the leftmost enabled guest software queue found by box 15-26.

Box 15-32 then stores the I/O interrupt in the guest's PSA (prefix save area), and box 15-33 represents a PSW swap for the guest. The following box 15-34 represents the execution of the DCSI instruction by the host, which is shown in detail in FIG. 17. The DCSI does the necessary processing to set on the pass-through bit SCH.P to enable the guest to handle following interrupts. Then SIE is redispatched for the guest to allow the guest to handle this interrupt.

FIG. 15C

FIG. 15C is entered upon intercept code 60 being provided for a guest when the guest is unable to handle a pending I/O interrupt in HIPR.AZN for the guest.

If the subchannel's pass-through bit SCH.P was set to zero, an interruption is already queued in a guest software queue, and the process in FIG. 15C is skipped by again entering SIE for this guest.

But if box 15-36 finds the pass-through bit SCH.P was set to a one state, the host moves an interrupt on the guest's software queue GIPR.(SCH. GISC), and then box 15-38 assures that SD.D is set to one. Then the host issues the SIE instruction for this guest to continue its processing on this CPU.

FIG. 15D

FIG. 15D is entered upon a interception 4 being provided during execution of a guest's TPI instruction, due to an I/O interruption enqueued on a guest software queue, i.e. SD.SQ=1. FIG. 15D then has the host execute the TPI instruction for the guest.

Box 15-41 initially tests if this guest has any enabled I/O interrupts by ANDing the corresponding bits of GIEM and GIPR. If the result is 1 for any corresponding bit position, box 15-41 has determined that the guest can handle the interrupt. Then box 15-42 dequeues the interrupt from the guest's queue, and in box 15-43 the host stores the interrupt code in the guest's storage. Then in box 15-44 the host sets the condition code CC to a one state in the guest's PSW (i.e. sets GPSW.CC=1). The host then ends its operations for the guest TPI instruction, and the guest can handle the interrupt when it is later dispatched.

But if box 15-41 found the guest has no enabled I/O interruption, the yes output is taken to FIG. 15E via connector 15E2.

FIG. 15E

Entry 15E1 is taken for a TPI interrupt code 64. Then box 15-50 tests the pass-through bit SCH.P to determine if an interruption for this subchannel is already on the guest's software queue. If SCH.P was one, box 15-51 enqueues the interrupt on the guest software queue from the interrupt information already stored in the SD when the interrupt was dequeued from the hardware queue.

Entry 15E2 is used by a TPI interception 4 that finds no guest enabled I/O interruption in FIG. 15D. Then in box 15-52 the host executes a TPZI instruction to obtain any pending host I/O interruption for this preferred guest, or to obtain information that no host I/O interruption exists for this preferred guest, and to return to the guest a resulting PSW condition code.

The host PSW receives the condition codes (CCs) resulting from the host TPZI of box 15-52. Box 15-53 tests the HPSW.CC value. If the host CC is set to zero, box 15-54 sets the guest's GPSW.CC to zero to indicate for the guest that there was no I/O interruption pending. Then the operation ends for this guest TPI instruction.

However, if box 15-53 indicates HPSW.CC is one, indicating an I/O interruption is pending for the guest, then box 15-56 makes a determination on whether the guest is enabled for this interruption by testing the guest enablement bit GIEM.(SCH.GISC). If not enabled, this process spins by returning to box 15-50 until box 15-53 determines that either the guest is enabled for this interrupt, or there is no interrupt on the hardware queue. If an interrupt enabled by the quest is found, then the yes output is taken to box 15-57 to store the interrupt code for this pending I/O interrupt in the guest's storage, and box 15-58 sets the GPSW.CC to a one state, whereupon the host operation is completed for the guest's TPI instruction, control is returned to the intercepted guest.

FIG. 15F

The (TSCH) instruction is commonly used to obtain subchannel status. It generates an interruption response block (IRB) as defined in the S/370XA Principles of Operations. This invention restricts preferred guest-issued TSCH executions only to the the subset of subchannels owned by that preferred guest. The status of any of the guest's subchannels can be tested at any time by it issuing a "TSCH" instruction.

Entry 15F1 is used for intercept code 4, which indicates a guest-issued test subchannel (TSCH) instruction-was unable to complete its execution. However it is possible that a previous TSCH has been executed by the host and the status has not been presented to the guest. The host intervention here: tests the guest's subchannel to determine if it has a pending interruption, removes any such interruption from the guest software queue, generates an information response block (IRB) for the guest, and sets the proper condition code into the guest PSW.

In more detail, when a preferred guest's subchannel has a pending I/O interrupt, it is found by box 15-60 testing if SCH.V field indicates the valid state for the guest. If set on, an I/O interrupt is pending for the preferred guest in a software queue. Then box 15-61 dequeues the quests SCH from the queue.

Box 15-62 tests if the guest has any IRB (status pending) for this interrupt provided by a prior execution of the TSCH. If status is pending, the yes output is taken to box 15-65 to use the existing IRB. If previous status is not pending, the no output is taken to box 15-63 for the host to issue a TSCH instruction to obtain an IRB.

Then box 15-63 is entered to generate an IRB by host issuing a TSCH instruction. Then the host prepares the IRB for the guest in box 15-64 by deleting information not needed by the guest, and box 15-66 is entered for the host to store the IRB into guest storage.

If box 15-62 found an existing IRB, box 15-66 is entered from box 15-65, skipping boxes 15-63 and 15-64.

Next, the pass-through bit SCH.P is set on by the host issuing a DCSI (diagnose compare and swap instruction described in FIG. 17) to set the SCH.P bit with an atomic operation in relation to the current settings of the X and P bits in the subchannel to assure that no unknown intervention could affect the settings of the SCH.P bit.

Then, box 15-68 checks whether the pass-through bit SCH.P was set on by the DCSI in box 15-67. If SCH.P is off, box 15-71 is entered in which the host queue's an interrupt of the guest on the SCH selected guest queue, and box 15-72 is entered. If P is on, then the yes output of box 15-68 is taken directly to box 15-72.

Box 15-72 tests the state of the IRB.X bit, which was copied from the subchannel into the resulting IRB. If the IRB.X bit is on, box 15-73 has the host set the resulting TSCH condition code into the guest PSW, i.e. into GPSW.CC=0. If the IRB.X bit is off, box 15-74 has the host set the resulting TSCH condition code into the guest PSW, i.e. into GPSW.CC=1. Control is then returned to the guest.

Entry to FIG. 15F is done through connector 15F2 for intercept code 64, which indicates I/O exception status prevented completion of the guest issued TSCH instruction. Then box 15-63 is entered and the host issues a TSCH instruction. The process then goes to the other boxes 15-64, and 15-66 through 15-74 in FIG. 15F, as described above.

FIG. 15G

FIG. 15G illustrates intercept 4 operations caused by a guest use of the LCTL (load control) instruction.

The LCTL interception procesing is entered at box 15-81 which determines if there is any exception condition outstanding against this LCTL. If box 15-81 finds an exception condition, box 15-82 is entered to generate a program interrupt for the guest, and an endop is provided to end the LCTL operation. If box 15-81 finds no exception condition, box 15-83 is entered to copy the data at the operand 2 address in the LCTL instruction, which are the value(s) to be loaded into the control register(s) specified by the R1 and R3 operands of the LCTL instruction being executed from MS to the SD of the guest. For example, control register 2 or 6 may be specified, or be included in the specification with other CRs, resulting in a GIEM change by the CR loading process.

Then box 15-84 is entered to test the state of the GIPR (guest I/O interrupt pending register) to determine if any I/O interrupt is pending for the guest. If any I/O interrupt is pending for the guest, box 15-86 is entered to test if any pending I/O interrupt is enabled (i.e. by ANDing each of the 31 bit positions in the GIPR with its corresponding mask bit in the GIEM). If any enabled pending interrupt is found by box 15-86 (i.e. any bit position AND operation=1), then box 15-87 is entered to set the guest's software queue pending I/O interrupt bit SD.SQ to a one state to indicate the existence of a pending guest I/O interrupt on one of its software queues. Also, box 15-88 is entered to set the guest's selective disablement bit SD.D to zero state to indicate no current disablement of the guest. Then the processing for the intercept of the LCTL instruction is ended, and SIE is entered for the intercepted guest.

But if no guest interrupt is found pending by box 15-84, then box 15-85 is entered to set SD.SQ to a zero state to indicate no pending I/O interruptions for the guest, and box 15-88 is entered to set SD.D to zero. Box 15-89 is entered from box 15-86 if no enabled interrupt is found by box 15-86. Then box 15-89 sets SD.D to a one state to indicate the guest is presently disabled from taking any pending I/O interruption. Then the processing for the intercept of the LCTL instruction is ended and SIE reentered.

FIG. 15H

An alert intercept code 48 in FIG. 15A uses connector 15H to box 15-11 in FIG. 15H, which is entered to save the status of the intercepted guest. The following box 15-12 makes a guest ready for dispatching. Then box 15-13 tests the AZM (alerting zone mask) to find if any other preferred guest is alertable by detecting for another one bit in the AZM. If another one bit is found, its zone number (AZN) is determined by its position in the AZM. Then box 15-16 executes the TPZI instruction for the other AZN found in the AZM to determine if the other guest has any pending I/O interrupt.

Then box 15-17 tests if the TPZI found any I/O interrupt for the other guest. If yes, box 15-12 is entered to have the host make the other guest ready for being dispatched. If no interrupt is found by the TPZI, box 15-13 is entered to test if any other preferred guest has a one bit in the AZM. If box 15-13 finds any other one bit in the AZM, its yes output goes to box 15-16 and the process reiterates. If no other AZM one bit exists, box 15-18 is entered where the host issues the SIE instruction for the highest priority ready guest to dispatch that guest. Hence the alerted guest and each other AZM indicated guests may have a higher dispatching priority than the intercepted guest which received the alert.

FIG. 21

If in this invention, each I/O device is implemented with a single subchannel (i.e. subchannel control block) of the type represented in FIG. 4, the I/O devices assigned to the respective zones are exclusively assigned to their respective partitions and cannot be shared by programming systems in plural partitions. However, this invention also allows I/O devices to be shared by plural partitions when the technique shown in FIG. 21 is used.

Figure 21:
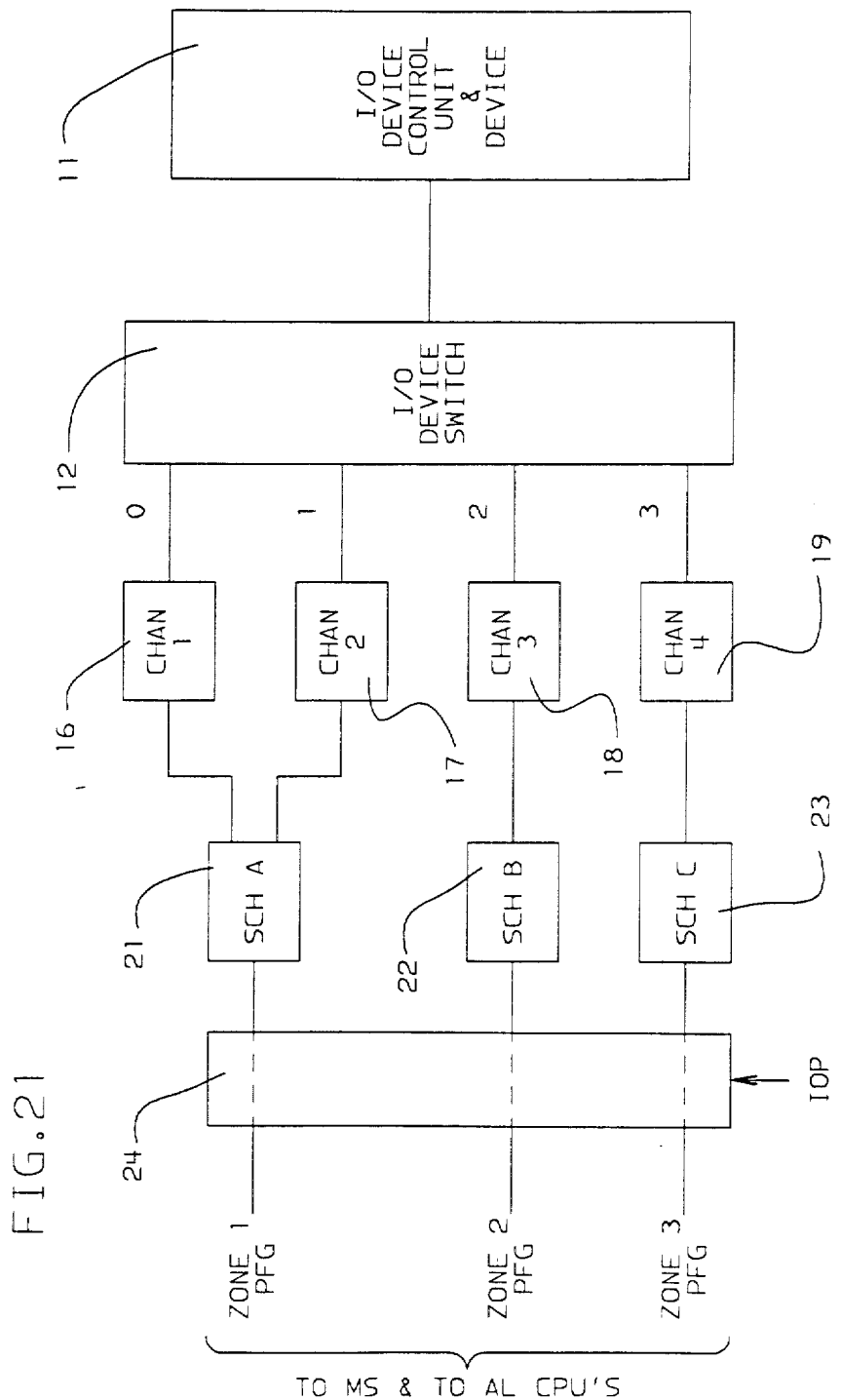
FIG. 21 shows a switching arrangement for enabling an I/O device to be shared by plural preferred guests in the embodiment in which each preferred guest has a copy of the same subchannel for the device.

In FIG. 21, the device 21-11 is connected to a four way I/O device switch 21-12, which allows the I/O device to be used by any of four different channels which can be connected to up to four different partitions. The four channels in the example illustrated in FIG. 21 are connected to three partitions 1, 2 and 3 representing three preferred guests. The trick in FIG. 21 allowing this to provide a separate copy of the subchannel per partition, e.g. subchannel A for partition 1, subchannel B for partition 2, and subchannel C for partition 3. All of the subchannels in FIG. 21 are shown physically connected to an I/O processor (IOP). The IOP is connected to the plural CPUs in the system so that any connected CPU in the system can control any subchannel in the manner defined in the S/370XA architecture.

Channels B and C are shown connected to different subchannels 3 and 4, respectively, but channels 1 and 2 are shown connected to the same subchannel A. The latter case allows different channel paths to be used by the same subchannel and its partition, which maybe useful in increasing the availability of the device or the responsiveness of the device to a single partition.

The connection of a subchannel to plural channels is done in the channel number fields shown in FIG. 4, in which the channel numbers for the two channels 16 and 17 are assigned in two of the channel number fields in the subchannel control block, which contains eight channel number fields allowing up to eight different channels to be assigned to a subchannel.

The guest will choose which of the plural provided channel paths will be used for any data transmission to or from the I/O device.

While the invention has been described with reference to the preferred embodiments thereof, various modifications and changes may be made by those skilled in the art without departing from the true spirit and scope of the invention as defined by the claims hereof.

Having thus described our invention, what we claim as new and desire to secure by Letters Patent is:

1. A method of restricting guest operations in a data processing system to system resources assigned to a guest, the resources in the system including one or more real CPUs, a system main storage (MS), an optional system extended storage (ES), and a plurality of I/O channels using I/O processors for connecting to the system a plurality of I/O device control units with their I/O devices, a host hypervisor (host) which includes software, the host supervising plural software control programs (guests) capable of concurrently and independently operating in the system and the guests may be the same or different types of control programs, subchannels (SCHs) for representing I/O devices to the host and to the guests, each guest being restricted to using an assigned subset (partition) of system resources, the method for restricting guest operations comprising:

providing a plurality of partition sets in system storage for defining partitions of system resources, each partition set defining a particular subset of system resources available to a guest assigned to use the partition, each partition set comprised of a plurality of entries for specifying the system resources assigned to the partition and the items being enterable by a human operator, the items assignable to each partition set including indicators for: a unique partition identifier (AZN), a MS zone of contiguous main sotrage which can be located anywhere in MS and bounded by upper and lower limit MS addresses, none or mone or plural SCHs, and an optional ES zone located anywhere in ES and bounded by upper and lower limit ES addresses, having a control block in system storage for each SCH, each SCH containing an identifier for an I/O interrupt queue assigned to the SCH, each SCH being capable of being assigned to none, one or plural partition sets as indicated by none, one or more AZNs being set into the control block of the SCH, also having a plurality of state description control blocks (SDs) in system storage for representing logical CPUs in the system, each SD containing fields with parameters for defining a logical CPU, binding a logical CPU to a particular partition by entering the AZN of a respective partition set into the SD representing the logical CPU, assigning a logicl CPU to a particular guest by entering parameters of the guest into the SD of the logical CPU, dispatching a logical CPU for a guest on a selected real CPU in the data processing system by the host executing a start interpretive execution (SIE) instruction on the real CPU to start execution of the logical CPU for the guest in the partition assigned by the AZN in the SD of the logical CPU, assigning an I/O device to a guest by setting the AZN assigned to the guest's partition set into an SCH of the I/O device and setting an identifier of the SCH into the guest's partition set and into the SD of each logical CPU which is to use the SCH, setting a pass-through indicator in a SCH of an I/O device assigned to a guest to enable the direct routing of I/O instructions from, and of pending I/O interruptions to the logical CPU of the guest in order to allow each guest to directly control guest assigned I/O devices without host assistance during normal execution of I/O operations by a guest's logical CPU, allowing a guest to directly insruct, and to directly handle I/O interruptions for, an I/O devie assigned to the guest by determining that the SCH of the I/O device is set with the same AZN as is set into the SD of the logical CPU dispatched for the guest to allow the guest to control its assigned I/O devices without host intervention, and to restrict each guest to using only the SCHs having the same AZN identified in both the SCH and the partition set assigned to the guest.

2. A method of restricting guest operations in a data processing system as defined in claim 1, further comprising:

relocating all channel addresses used by a SCH into a MS zone assigned to the partition indicated by the AZN assigned to the SCH, and checking channel accesses to MS in relation to the boundaries of the MS zone assigned to the partition identified by the AZN assigned to the SCH, and indicating any violation by any channel access outside of the assigned MS zone.

3. A method of restricting guest operations in a data processing system as defined in claim 1, further comprising:

providing a partition pointer table for accessing the partition definition sets in any order, and receiving assignments of AZNs for enabling any AZN value to be assigned to any partition definition table, dispatching on a real CPU a highest priority logical CPU of the logical CPUs ready to execute.

4. A method of restricting guest operations in a data processing system as defined in claim 2, further comprising:

enabling a dispatched guest on a real CPU to detect the existence of I/O interruptions for one or more SCHs assigned to another guest which is assigned to another partition and not currently dispatched on a real CPU, alerting the host after the dispatched guest receives an I/O interruption for a SCH assigned to the other guest, and the host making ready for dispatch the other guest having the I/O interruption.

5. A method of restricting guest operations in a data processing system as defined in claim 4, further comprising:

comparing a dispatching priority of the currently dispatched guest with a dispatching priority of any other guest made ready for dispatch by the host to determine which guest is to be dispatched next on the real CPU of the currently dispatched guest, terminating the dispatch of the currently dispatched guest for a dispatch of another guest having a dispatching priority higher than the current guest.

6. A method of restricting guest operations in a data processing system as defined in claim 5, further comprising:

intercepting the execution of the dispatched guest when an I/O interruption becomes pending for a SCH assigned to an alertable other guest when the dispatched guest is enabled for the I/O interruption, invoking host processing on the CPU of the intercepted guest to detect the I/O interruption of the alertable guest and make the alertable guest ready for dispatching.

7. A method of restricting guest operations in a data processing system as defined in claim 6, processing by the host further comprising:

detecting if there are still other pending I/O interruptions for still other guest(s) enabled for alerting by the intercepted guest and having a pending I/O interruption(s), making each of the still other detected guest(s) ready for dispatching, and dispatching the highest-priority of the guests made ready for dispatching.

8. A method of restricting guest operations in a data processing system as defined in claim 1, further comprising:

having indicators in the SCHs of the assignment of the SCHs to hardware and guest I/O interruption queues, providing a guest I/O interruption enablement mask (GIEM) in the SD of each partition-assigned guest for selectively indicating the guest's I/O interruption enablement state for handling pending interruptions on guest I/O interruption queues, providing an effective I/O interruption enablement mask (EIEM) for use by the host and any dispatched partition-assigned guest to selectively indicate the I/O interruption enablement states for the hardware I/O interruption queue(s) usable by the guest including: at least one hardware queue for receiving the I/O interruptions of the dispatched guest and other hardware queue(s) for receiving the I/O interruption(s) of one or more other guests alertable by the dispatched guest, processing and loading the EIEM into a host control register of a real CPU on which the guest is being dispatched, setting on a disabling field in the SD of the guest when the guest is found selectively disabled for handling an I/O interruption by a subchannel assigned to the guest, including setting on the disabling field after the guest makes a change in its GIEM, the on state of the disabling field preventing the guest from handling any I/O interruption for any subchannel asigned to the guest.

9. A method of restricting guest operations in a data processing system as defined in claim 8, further comprising:

alerting the host whenever the dispatched guest receives an I/O interruption for a subchannel assigned to another partition enabled by the EIEM in the CPU of the dispatched guest, even though the SD disabling field of the dispatched guest is set off or the EIEM in the CPU of the dispatched guest is disabling the dispatched guest in order to prevent the dispatched guest from handling its own I/O interruptions.

10. A method of restricting guest operations in a data processing system as defined in claim 8, executing a test pending instruction (TPI) comprising:

testing the state of an SD queuing indicator field for the dispatched guest to determine if the dispatched guest has any I/O pending interruptions for any SCH's assigned to the dispatched guest in any guest queue, intercepting the processing of the TPI instruction if the SD queuing indicator field of the dispatched guest is on, but invoking the host to execute a TPI instruction for the guest to determine if there is any pending I/O interruption for the guest on a hardware I/O interruption queue used for receiving guest I/O interruptions.

11. A method of restricting guest operations in a data processing system as defined in claim 10, further processing the test pending instruction (TPI) comprising:

providing a partition mode field in each SD to indicate if the respective guest is assigned to a partition-assigned guest, providing an I/O interrupt pending register (IPR) in each CPU having IPR bit positions that respectively indicate if any I/O interruption is pending in an associated hardware I/O interrupt queue of which at least one queue is assigned for the use of each partition-assigned guest, setting on a condition code (CC) in a program status word (PSW) of the guest to a first predetermined state when the guest's respective IPR bit position indicates no I/O interruption is pending for the guest, and ending the operation for the TPI instruction.

12. A method of restricting guest operations in a data processing system as defined in claim 11, further processing the test pending instruction (TPI) comprising:

dequeuing an I/O interruption if the guest is in partitioned mode and the guest's IPR bit position indicates an I/O interruption is pending for a subchannel assigned to the guest,

- testing if a pass-through field is set on in the interrupting subchannel, intercepting the processing of the TPI instruction if the pass-through field is set off in the interrupting subchannel, and invoking processing by the host to set on the pass-through field to enable the guest to handle the I/O interruption.

13. A method of restricting guest operation in a data processing system as defined in claim 12, the processing for a test pending instruction (TPI) further comprising:

testing the GIEM of the disptched guest to determine whether the guest is selectively enabled for a pending I/O interruption when the state of the pass-through field indicates the guest may handle the I/O interruption, storing an I/O interruption code in the SD of the dispatched guest when the testing operation finds the guest is selectively enabled, setting on a condition code (CC) in the PSW of the guest to a second predetermined state when the storing operation has stored the I/O interruption, and ending the operation for the TPI instruction.

14. A method of restricting guest operations in a data processing system as defined in claim 13, the processing for a test pending instruction (TPI) further comprising:

intercepting the guest processing of the TPI instruction by storing an intercept code if the testing operation finds the dispatched guest is disabled by its GIEM from handling the I/O interruption, and invoking processing by the guest to enable the GIEM for the guest to handle the I/O interruption.

15. A method of restricting guest operations in a data processing system as defined in claim 8, executing a test subchannel (TSCH) instruction issued by a guest dispatched on a CPU to determine if the subchannel has any I/O interruption pending for the guest, comprising:

testing the state of the partition mode field in the SD of the dispatched guest to determine if the partition mode field indicates the guest is a partition-assigned guest, testing if the I/O interrupting subchannel is partition-assigned to the dispatched guest, and testing a pass-through field in the subchannel to determine if I/O interruptions of the subchannel can be handled by partition-assigned guests, intercepting the processing of the TSCH instruction if any of the testing operations find the SD partition-mode field of the dispatched guest is set off, or the guest I/O interruption queue assignment in the subchannel being tested is not for the partition assigned to the dispatched guest, or if the pass-through field is set off in the subchannel being tested, invoking the host to execute a TSCH instruction for the guest to determine if the subchannel has any pending I/O interruption for the guest.

16. A method of restricting guest operations in a data processing system as defined in claim 15, executing a test subchannel (TSCH) instruction issued by a guest dispatched on a CPU to determine if the subchannel has any I/O interruption pending for the guest, comprising:

dequeuing any I/O interruption found for the subchannel being tested when the testing operations find the SD partition-mode field of the dispatched guest is set on, and the guest I/O interruption queue assignment in the subchannel being tested is for the partition assigned to the dispatched guest, and the pass-through field is set on in the subchannel being tested, testing if any I/O exception condition exists to the execution of the TSCH instruction and if an exception condition is found to exist, setting off the pass-through field and setting a predetermined intercept code in the SD of the dispatched guest, intercepting the processing of the TSCH instruction, and invoking the host to execute a TSCH instruction for the guest.

17. A method of restricting guest operations in a data processing system as defined in claim 16, executing a test subchannel (TSCH) instruction issued by a guest dispatched on a CPU to obtain subchannel status for the guest, comprising:

obtaining and storing an information response block (IRB) containing subchannel status in guest storage if no exception condition is found by the testing operation, providing an I/O status pending field in each subchannel to indicate if any I/O status is pending for the subchannel, and copying the state of the field into the IRB, testing the I/O status pending field in the IRB to determine if any I/O status is pending for the subchannel, setting on a condition code (CC) in a program status word (PSW) of the guest to a first predetermined state when the I/O status pending field indicates an I/O status is pending for the subchannel being tested, setting on a condition code (CC) in the PSW of the guest to a second predetermined state when the I/O status pending field indicates no I/O status is pending for the subchannel being tested, and ending the operation for the TSCH instruction.

18. A method of restricting guest operations in a data processing system as defined in claim 1, further comprising:

providing in the SD of each partition-assigned guest an alerting I/O interruption enablement mask (AZM) for selectively indicating which of plural hardware I/O interrupt queues can be monitored by the guest for alerting other guests, and a guest I/O interruption enablement mask (GIEM) for selectively indicating the enablement state for the guest's I/O interrupt queues, providing an effective I/O interruption enablement mask (EIEM) for use by a dispatched partition-assigned guest to selectively indicate the guest's enablement states: for hardware I/O interruption queue(s) on which I/O interruptions can be handled by the dispatched guest and for hardware I/O interruption queue(s) on which I/O interruption(s) for other guest(s) can cause alerting by the dispatched guest, processing and loading the EIEM into a control register of the real CPU of the guest, selecting a pending I/O interruption on any hardware queue that is enabled by the EIEM for examination by the dispatched guest, testing if the I/O interruption is enabled by the AZM for another guest, identifying the AZN in the SCH providing the I/O interruption if the testing operation finds the I/O interruption is for another guest being alerted, storing the AZN of the alerting guest in the SD of the dispatched guest, setting an intercept code into the SD of the dispatched guest to indicate an alerting intercept condition, and intercepting the guest's dispatch to invoke the host to examine the AZN of the alerting guest in the SD of the dispatched guest to make the alerting guest ready for dispatching.

19. A method of restricting guest operations in a data processing system as defined in claim 18, the host invocation for the alerting guest further comprising:

determining the AZN for any other guest enabled in the AZM in the SD of the dispatched guest, executing a test pending zone interrupt (TPZI) instruction for each other guest's AZN identified by the determining operation to determine if any pending I/O interruption exists for any other guest enabled by the AZM of the dispatched guest, making ready for dispatch each other guest found by the executing operation to have a pending I/O interruption, and dispatching the ready guest having a highest dispatching priority.

20. A method of restricting guest operations in a data processing system as defined in claim 1, executing a test pending zone interrupt (TPZI) instruction for determining if any pending I/O interruption exists for a guest identified by a specified AZN, further comprising:

finding that no exception conditions exist at the beginning of execution of the TPZI that may interfere with its execution, providing in a first general register associated with the TPZI: a control field to indicate whether a first or second type of response is to be provided by the TPZI, an AZN field specifying the AZN of a guest being examined for I/O interruptions, and a GIEM field containing a GIEM (guest I/O interruption enablement mask) for the guest, providing in a second general register associated with the TPZI an address of a storage location where a response to the TPZI is to be stored, having an I/O interrupt pending register (IPR) in each CPU with respective IPR bit positions that respectively indicate whether any I/O interruption is pending in each of respectively associated hardware I/O interrupt queues, at least one assigned IPR bit position being assigned for use by a guest regarding the guest's use of a corresponding hardware queue that receives the guest's I/O interruptions, examining the state of the assigned IPR bit position for the guest to find if any pending I/O interrupt exists for the guest, and setting a condition code in a host program status word (PSW) to a first value to indcate when no pending I/O interruption exists for the guest being examined, storing I/O information about any pending I/O interruption when the first general register indicates a first type response is to be provided, and setting the condition code in the host PSW to a first value to indicate the second type response has been provided, dequeuing any pending I/O interruption when the first general register indicates a second type response is to be provided, saving the state of a pass-through field in the interrupting subchannel, storing an I/O interrupt code for the pending interrupt at the address in the second general register, and setting a condition code in the host PSW to a third value to indicate the second type response has been provided.

21. A method of restricting guest operations in a data processing system as defined in claim 8, further comprising:

a dispatched guest generating an intercept code and putting it into the guest's SD to indicate the guest cannot process its I/O interruption because conditions exist preventing the guest from currently handling the interrupt, intercepting the guest processing by passing control of the CPU to the host in response to the guest indicating an intercept code, and the host processing including:

testing a pass-through field in the interrupting subchannel to find if it is in a state allowing partition-assigned guests to handle the subchannel's interruptions, moving the pending I/O interruption from the hardware queue to a guest queue assigned in the subchannel to receive interruptions of the subchannel for the guest, setting on the dispatched guest's SD disabling field to indicate the guest is currently disabled from handling a pending I/O interruption for a subchannel assigned to the guest and being stored in a guest's I/O interruption queue while the guest is disabled, the host passing control of the CPU back to the guest to continue guest processing when the pass-through field is set to a state allowing partition-assigned guest's to handle the interruptions of the subchannel.

22. A method of restricting guest operations in a data processing system as defined in claim 8, host processing for a diagnose compare and swap instruction (DCSI) for setting a pass-through field in a subchannel, further comprising:

finding that no exception conditions exist at the beginning of execution of the DCSI that may interfere with its execution to continue the execution of the DCSI, setting on a lock field in the subchannel, testing if the pass-through field in a third operand is set on, and if set on testing if the subchannel is on an I/O interruption queue, and dequeuing the subchannel if found on a queue, comparing the status pending field and the pass-through field in the first operand with corresponding status pending and pass-through fields in the subchannel, setting the pass-through field in the subchannel to the new value contained in the third operand of the DCSI if equality is found by the comparing operation, but when inequality is found by the comparing operation, setting the first operand from the current status pending and pass-through fields in the subchannel, generating a condition code in a program status word (PSW) of a guest for which the DCSI is being executed by setting the condition code to a first value when equality is found, and setting the condition code to a second value when inequality is found, and setting off the lock field after the condition code is generated.

23. A method of restricting guest operations in a data processing system as defined in claim 1, chanel address relocation for channel accesses in an assigned zone in MS, further comprising:

providing in each subchannel any AZN assigned to the subchannel and the upper and lower limit MS addresses assigned to the AZN, adding the lower limit address to each channel address to be accessed in MS to obtain a resulting relocation address, and comparing the reslting relocation address to the upper limit address, suppressing the MS access by the resulting relocation address if it is greater than the upper limit address.

24. A method of restricting guest operations in a data processing system as defined in claim 1, CPU address relocation for CPU accesses in assigned zones in MS which can have different sizes, the assignment of MS to a partition comprising:

generating a host segment table and a plurality of guest segment tables, a segment table being provided for each operational guest in the data processing system and a host segment table being provided for the host, setting a guest control register to an MS address of the guest's segment table, and setting a host control register to an MS address of the host segment table, allocating a contiguous set of page frames in MS between the upper and lower limit MS addresses assigned to the respective AZN of each guest, generating at least one host page table for each guest, the host page table(s) for the guest containing a contiguous set of entries corresponding to the page frames allocated to the respective guest, setting the page table entries in a guest's page table(s) to the respective absolute addresses of the page frames in MS allocated to the guest, and setting to a valid state each of the guest's page frame entries, also setting a segment table entry in the host's segment table to the absolute address of each host page table for the guest in MS while maintaining the order of segment table entries for the guest in the host segment table consistent with the order of contiguous page frames in the guest's page tables if there is more than one host segment table entry for the guest, on the dispatch of a guest, loading the host segment table address into the host control register in the CPU and loading the guest segment table address from the guest's SD into a guest control register in a CPU on which the guest is being dispatched, performing address translations for the guest absolute addresses using the host segment table entry(s) and page table(s) for the guest accessed through the host control register in the CPU.

25. A method of restricting guest operations in a data processing system as defined in claim 24, address relocation for a page in an assigned zone in expanded storage (ES) comprising:

adding a guest-provided page number to be access in ES to the lower limit page number obtained from the partition definition set for the respective guest to obtain a resulting relocation page number, comparing the resulting relocation page number to the upper limit page number obtained from the partition definition set, suppressing the ES access by the resulting relocation page number if it is greater than the upper limit page number.

26. A method of restricting guest operations in a data processing system as defined in claim 1, enabling the sharing of an I/O device and its control unit between a plurality of partitions, further comprising:

- having an I/O processor connected to a plurality of I/O subchannels and a plurality of I/O channels, in which the plurality of subchannels need not be equal to the plurality of channels, each channel being capable of controlling a transmission of a stream of data between channel-program designated addresses in MS and the I/O device and its control unit, and each subchannel being capable of controlling the operation of an I/O device, each channel also being capable of providing a separate transmission path between associated I/O devices and MS,
- connecting one side of an N-way switch to the control unit for the I/O device, and connecting another side of the N-way switch to N number of I/O channels for providing N-way switching of the device and its control unit to any selected one of the N number of channels, the device switch operating under manual or program control to connect the I/O device and its control unit to any channel connected to the device switch,
- providing up to C number of copies of a subchannel that controls the operation of the I/O device, in which all C number of the subchannel copies designate the same I/O device,
- selecting C number of different partitions, and assigning each of the C copies of the subchannel to a different one of the partitions, the selected partitions respectively having C number of different zones in MS, and
- further assigning each of the C number of subchannel copies to one or more of the N number of channels connected to the device switch to enable the device switch to operate under manual or program control to connect the I/O device to any of the C number of different zones in MS through a device switch selected channel in order to allow data transmission between the I/O device and any one of the C number of zones as selected by the device switch under manual or program control.

27. A method of restricting guest operations in a data processing system to system resources assigned to a guest, the system resources in the system including one or more real CPUs, a system main storage (MS), an optional system extended storage (ES), and a plurality of I/O channels usng I/O processors for connecting to the system a plurality of I/O device control units with their I/O devices, a host hypervisor (host) which includes software, the host supervising plural software control programs (guests) capable of concurrently and independently operating in the system and the guests may be the same or different types of control programs, subchannels (SCHs) for representing I/O devices to the host and to the guests, each guest being restricted to using an assigned subset (partition) of system resources, the method for restricting guest operations comprising:

- providing a plurality of partition sets in system storage for defining partitions of system resources, each partition set defining a particular subset of system resources available to a guest assigned to use the partition, each partition set comprised of a plurality of items for specifying the system resources assigned to the partition and the items being enterable by a human operator, the items assignable to each partition set including indicators for: a partition identifier unique to each partition set, a MS zone of contiguous main storage which can be located anywhere in MS and bounded by upper and lower limit MS addresses, none or one or plural SCHs, and an optional ES zone located anywhere in ES and bounded by upper and lower limit ES addresses,
- having a control block in system storage for each SCH, each SCH having an identifier for an I/O interruption queue assigned to the SCH, each SCH being capable of being associated with none, one or plural partition sets,
- also having a plurality of state description control blocks (SDs) in system storage for representing logical CPUs in the system, each SD containing fields with parameters for defining a logical CPU,
- binding a logical CPU to a particular partition by associating a respective partition set with the SD representing the logical CPU,
- assigning a logical CPU to a particular guest by entering parameters of the guest into the SD of the logical CPU,
- dispatching a logical CPU for a guest on a selected real CPU in the data processing system by the host executing a start interpretive execution (SIE) isntruction on the real CPU to start execution of the logical CPU for the guest,
- assigning an I/O device to a guest by associating an SCH of the I/O device with the guest's partition set and with the SD of a logical CPU which is to be used by the guest,
- setting a pass-through indicator in the SCH of an I/O device assigned to a guest to enable the direct routing of I/O instructions from, and of pending I/O interruptions to, the logical CPU of the guest in order to allow each guest to directly control guest assigned I/O devices without host assistance during normal exeuction of I/O operations by a guest's logical CPU,
- allowing a guest to directly instruct, and to directly handle I/O interruptions for, an I/O device assigned to the guest by determining that the SCH of the I/O device is associated with the SD of the logical CPU dispatched for the guest to allow the guest to control its assigned I/O devices without host intervention, while restricting each guest to using only the SCHs and other system resources defined in the partition set assigned to the guest.

* * * * *